(12) United States Patent
Yoshii

(10) Patent No.: US 8,700,489 B2
(45) Date of Patent: Apr. 15, 2014

(54) APPARATUSES AND METHOD FOR RECOMMENDING ITEMS BASED ON DETERMINED TREND LEADERS AND TREND FOLLOWERS

(75) Inventor: Shinichiro Yoshii, Tokyo (JP)

(73) Assignee: Scigineer, Inc., Tokyo (JP)

( * ) Notice: Subject to any disclaimer, the term of this patent is extended or adjusted under 35 U.S.C. 154(b) by 81 days.

(21) Appl. No.: 12/926,919

(22) Filed: Dec. 17, 2010

(65) Prior Publication Data

US 2011/0119148 A1 May 19, 2011

Related U.S. Application Data

(63) Continuation of application No. 12/071,858, filed as application No. PCT/JP2008/050405 on Jan. 16, 2008, now abandoned.

(30) Foreign Application Priority Data

| Jan. 17, 2007 | (JP) | 2007-008221 |
| Mar. 2, 2007 | (JP) | 2007-052707 |
| Mar. 2, 2007 | (JP) | 2007-052708 |

(51) Int. Cl.
  *G06Q 30/00* (2012.01)
  *G06Q 30/06* (2012.01)
  *G06Q 30/02* (2012.01)

(52) U.S. Cl.
  CPC ........ *G06Q 30/0631* (2013.01); *G06Q 30/0204* (2013.01)
  USPC .......................... 705/26.7; 705/7.33

(58) Field of Classification Search
  CPC .................. G06Q 30/0631; G06Q 30/0204
  USPC .............................. 705/26.7, 7.33
  See application file for complete search history.

(56) References Cited

U.S. PATENT DOCUMENTS

| 7,536,322 B1 | 5/2009 | Selinger et al. |
| 2002/0065735 A1* | 5/2002 | Hatakama et al. ............... 705/26 |

(Continued)

FOREIGN PATENT DOCUMENTS

| JP | 10-307808 A | 11/1998 |
| JP | 11-219481 A | 8/1999 |

(Continued)

OTHER PUBLICATIONS

M. E. J. Newman et al., "Finding and evaluating community structure in networks", arXiv:cond-mat/0308217 v1, 16 pages, (Aug. 2003).

(Continued)

*Primary Examiner* — Amee A Shah
(74) *Attorney, Agent, or Firm* — Cermak Nakajima LLP; Tomoko Nakajima

(57) ABSTRACT

A server apparatus includes: a trend leader detecting portion that acquires purchaser identifying information for identifying a purchaser who purchased the product at an early stage satisfying a predetermined time condition, from at least two pieces of purchase history information; a recommended product acquiring portion that acquires at least one piece of product identifying information for identifying a product purchased by at least one purchaser identified with at least one piece of purchaser identifying information that has been acquired by the trend leader detecting portion; and a recommended product transmitting portion that transmits the at least one piece of product identifying information that has been acquired by the recommended product acquiring portion, to an information output apparatus. With this server apparatus, recommendation of a product can be provided based on the behavior in which a trend leader purchases a product.

17 Claims, 46 Drawing Sheets

(56) References Cited

U.S. PATENT DOCUMENTS

| | | |
|---|---|---|
| 2002/0128907 A1 | 9/2002 | Sato et al. |
| 2003/0105682 A1* | 6/2003 | Dicker et al. ............... 705/27 |
| 2004/0249700 A1 | 12/2004 | Gross |
| 2004/0260600 A1 | 12/2004 | Gross |
| 2004/0267604 A1 | 12/2004 | Gross |
| 2005/0246358 A1 | 11/2005 | Gross |
| 2005/0246391 A1 | 11/2005 | Gross |
| 2006/0218111 A1* | 9/2006 | Cohen ........................ 706/45 |
| 2007/0265870 A1 | 11/2007 | Song et al. |

FOREIGN PATENT DOCUMENTS

| | | |
|---|---|---|
| JP | 2001-350875 A | 12/2001 |
| JP | 2002-117292 A | 4/2002 |
| JP | 2004-362011 A | 12/2004 |
| JP | 2005-092721 A | 4/2005 |
| JP | 2005-293384 A | 10/2005 |
| JP | 2005-346362 A | 12/2005 |

OTHER PUBLICATIONS

Aaron Clauset, "Finding local community structure in networks", arron@cs.unm.edu, 7 pages, (Feb. 2005).

Aaron Clauset et al., "Finding community structure in very large networks", arXiv:cond-mat/0408187 v2, 6 pages, (Aug. 2004).

International Search Report for PCT/JP2008/050405 mailed on Mar. 4, 2008.

Office Action from Japan Patent Office mailed Feb. 22, 2012 for 2007-052707.

Office Action from Japan Patent Office mailed Feb. 22, 2012 for 2007-052708.

* cited by examiner

FIG.7
| ID | product etc identifying information | product attribute ||||||
|---|---|---|---|---|---|---|---|
| | | product name | product category | size | color | price | ......... | image |
| 1 | Z-001 | trousers X | trousers | 7~13 | black | 8,000 yen | ......... |  |
| 2 | Z-002 | trousers Y | trousers | 7~13 | brown | 9,500 yen | ......... |  |
| ⋮ | ⋮ | ⋮ | ⋮ | ⋮ | ⋮ | ⋮ | ......... | ⋮ |
| 57 | J-001 | J1-XX | jacket | S,M,L | blue/yellow | 35,000 yen | ......... |  |
| 58 | J-002 | J2-XY | jacket | S,M,L | brown | 38,000 yen | ......... |  |
| ⋮ | ⋮ | ⋮ | ⋮ | ⋮ | ⋮ | ⋮ | ......... | ⋮ |
| 99 | S-001 | SS1 | shoes | 21~27 | black | 12,000 yen | ......... |  |
| 100 | S-002 | SS2 | shoes | 21~27 | white | 8,000 yen | ......... |  |
| ⋮ | ⋮ | ⋮ | ⋮ | ⋮ | ⋮ | ⋮ | ......... | ⋮ |

FIG.8

| ID | purchase history information ||||  |
|---|---|---|---|---|---|
|  | purchaser identifying information | product etc. identifying information | number of products | purchase time information | ......... |
| 1 | 090-1111-2234 | Z-001 | 1 | 2006/1/8 13:15 | ......... |
| 2 | 090-2567-1138 | J-002 | 1 | 2006/1/8 13:25 | ......... |
| ⋮ | ⋮ | ⋮ | ⋮ | ⋮ | ......... |
| 328 | 090-1111-2234 | S-002 | 1 | 2006/1/18 11:25 | ......... |
| ⋮ | ⋮ | ⋮ | ⋮ | ⋮ | ......... |
| 526 | 123.202.158.2 | S-001 | 1 | 2006/1/19 18:01 | ......... |
| ⋮ | ⋮ | ⋮ | ⋮ | ⋮ | ......... |
| 1018 | abc@xxx.co.jp | Z-001 | 2 | 2006/2/2 19:38 | ......... |
| ⋮ | ⋮ | ⋮ | ⋮ | ⋮ | ......... |

FIG.10

| ID | purchase history information ||||  |
|---|---|---|---|---|---|
| | purchaser identifying information | product etc. identifying information | number of products | purchase time information | .......... |
| 1 | 090-1111-2234 | Z-001 | 1 | 2006/1/8 13:15 | .......... |
| 2 | 090-2567-1138 | J-002 | 1 | 2006/1/8 13:25 | .......... |
| ⋮ | ⋮ | ⋮ | ⋮ | ⋮ | .......... |
| 328 | 090-1111-2234 | S-002 | 1 | 2006/1/18 11:25 | .......... |
| ⋮ | ⋮ | ⋮ | ⋮ | ⋮ | .......... |
| 526 | 123.202.158.2 | S-001 | 1 | 2006/1/19 18:01 | .......... |
| ⋮ | ⋮ | ⋮ | ⋮ | ⋮ | .......... |
| 1018 | abc@xxx.co.jp | Z-001 | 2 | 2006/2/2 19:38 | .......... |
| ⋮ | ⋮ | ⋮ | ⋮ | ⋮ | .......... |
| 15678 | 12345678 | J-001 | 1 | 2006/11/5 15:40 | .......... |

FIG.12

| ID | purchaser identifying information | point |
|----|-----------------------------------|-------|
| 1  | 090-1111-2234                     | 58    |
| 2  | 123.202.158.2                     | 29    |
| 3  | 090-9876-1122                     | 15    |
| 4  | 25841122                          | 8     |
| 5  | abc@xxx.co.jp                     | 5     |
| ⋮  | ⋮                                 | ⋮     |

FIG.13

| ID | product category 1 | product category 2 |
|---|---|---|
| 1 | trousers | jacket |
| 2 | shoes | socks |
| 3 | bag | suit, accessory |
| ⋮ | ⋮ | ⋮ |

FIG.19

| ID | purchaser identifying information | group identifier |
|---|---|---|
| 1 | 090-1111-2234 | 1 |
| 2 | 090-2567-1138 | 3 |
| 3 | 090-5544-3388 | 7 |
| ⋮ | ⋮ | ⋮ |
| 58 | 123.202.158.2 | 4 |
| 59 | abc@xxx.co.jp | 3 |
| ⋮ | ⋮ | ⋮ |
| 250 | 12345678 | 3 |
| ⋮ | ⋮ | ⋮ |

FIG.20

| ID | trend leader identifying information | group identifier |
|---|---|---|
| 1 | 090-1111-2234 | 1 |
| 2 | 25678765 | 1 |
| 3 | xyz@ppp.ne.jp | 2 |
| 4 | 090-2567-1138 | 3 |
| ⋮ | ⋮ | ⋮ |

FIG.28

| ID | purchase history information |||
|---|---|---|---|
| | purchaser identifying information | product etc. identifying information | purchase time information |
| 1 | A | [1] | 2006/1/18 13:15 |
| 2 | C | [2] | 2006/1/18 13:25 |
| 3 | B | [1] | 2006/1/18 13:28 |
| 4 | B | [3] | ⋮ |
| 5 | B | [4] | ⋮ |
| 6 | A | [3] | ⋮ |
| 7 | B | [5] | ⋮ |
| 8 | D | [2] | ⋮ |
| 9 | E | [5] | ⋮ |
| 10 | C | [1] | ⋮ |
| ⋮ | ⋮ | ⋮ | ⋮ |

FIG.29

| product etc. identifying information | purchaser identifying information |
|---|---|
| [1] | A→B→C→D |
| [2] | C→D→A |
| [3] | B→A |
| [4] | B→D→E |
| [5] | B→E |

FIG.31

$$M = \begin{pmatrix} 0 & 1 & 0 & 1 & 0 \\ 1 & 0 & 0 & 0 & 0 \\ 0 & 1 & 0 & 0 & 0 \\ 0 & 1 & 1 & 0 & 0 \\ 0 & 1 & 0 & 1 & 0 \end{pmatrix}$$

FIG.32

$$(1) \, TF = M \cdot TL = \begin{pmatrix} 0 & 1 & 0 & 1 & 0 \\ 1 & 0 & 0 & 0 & 0 \\ 0 & 1 & 0 & 0 & 0 \\ 0 & 1 & 1 & 0 & 0 \\ 0 & 1 & 0 & 1 & 0 \end{pmatrix} \begin{pmatrix} 1 \\ 1 \\ 1 \\ 1 \\ 1 \end{pmatrix} = \begin{pmatrix} 2 \\ 1 \\ 1 \\ 2 \\ 2 \end{pmatrix}$$

$$(2) \, TL = M^T \cdot TF = \begin{pmatrix} 0 & 1 & 0 & 0 & 0 \\ 1 & 0 & 1 & 1 & 1 \\ 0 & 0 & 0 & 1 & 0 \\ 1 & 0 & 0 & 0 & 1 \\ 0 & 0 & 0 & 0 & 0 \end{pmatrix} \begin{pmatrix} 2 \\ 1 \\ 1 \\ 2 \\ 2 \end{pmatrix} = \begin{pmatrix} 1 \\ 7 \\ 2 \\ 4 \\ 0 \end{pmatrix}$$

$$(3) \, TF = TF/|TF| = \begin{pmatrix} 0.53 \\ 0.27 \\ 0.27 \\ 0.53 \\ 0.53 \end{pmatrix} \quad (4) \, TL = TL/|TL| = \begin{pmatrix} 0.12 \\ 0.84 \\ 0.24 \\ 0.48 \\ 0.0 \end{pmatrix}$$

$$(5) \, TF = M \cdot TL = \begin{pmatrix} 0 & 1 & 0 & 1 & 0 \\ 1 & 0 & 0 & 0 & 0 \\ 0 & 1 & 0 & 0 & 0 \\ 0 & 1 & 1 & 0 & 0 \\ 0 & 1 & 0 & 1 & 0 \end{pmatrix} \begin{pmatrix} 0.12 \\ 0.84 \\ 0.24 \\ 0.48 \\ 0.0 \end{pmatrix} = \begin{pmatrix} 1.32 \\ 0.12 \\ 0.84 \\ 1.08 \\ 1.32 \end{pmatrix}$$

$$(6) \, TL = M^T \cdot TF = \begin{pmatrix} 0 & 1 & 0 & 0 & 0 \\ 1 & 0 & 1 & 1 & 1 \\ 0 & 0 & 0 & 1 & 0 \\ 1 & 0 & 0 & 0 & 1 \\ 0 & 0 & 0 & 0 & 0 \end{pmatrix} \begin{pmatrix} 1.32 \\ 0.12 \\ 0.84 \\ 1.08 \\ 1.32 \end{pmatrix} = \begin{pmatrix} 0.12 \\ 4.56 \\ 1.08 \\ 2.64 \\ 0.0 \end{pmatrix}$$

$$(7) \, TF = TF/|TF| = \begin{pmatrix} 0.57 \\ 0.052 \\ 0.36 \\ 0.47 \\ 0.57 \end{pmatrix} \quad (8) \, TL = TL/|TL| = \begin{pmatrix} 0.022 \\ 0.85 \\ 0.20 \\ 0.49 \\ 0.0 \end{pmatrix}$$

$$(9) \, TF = \begin{pmatrix} 0.58 \\ 6.09 \times 10^{-5} \\ 0.36 \\ 0.45 \\ 0.58 \end{pmatrix} \quad (10) \, TL = \begin{pmatrix} 2.62 \times 10^{-4} \\ 0.85 \\ 0.19 \\ 0.50 \\ 0.0 \end{pmatrix}$$

FIG.33

| purchaser identifying information | trend leader degree | trend follower degree |
|---|---|---|
| A | $2.62 \times 10^{-4}$ | 0.58 |
| B | 0.85 | $6.09 \times 10^{-5}$ |
| C | 0.19 | 0.36 |
| D | 0.50 | 0.45 |
| E | 0.0 | 0.58 |

FIG.40

| user identifying information | target identifying information |
|---|---|
| A | [1]→[3] |
| B | [1]→[3]→[4]→[5] |
| C | [2]→[1]→[3] |
| D | [2]→[3] |
| E | [5]→[4] |

FIG.42

$$M = \begin{pmatrix} 0 & 1 & 0 & 0 & 0 \\ 0 & 0 & 0 & 0 & 0 \\ 1 & 1 & 0 & 0 & 0 \\ 0 & 0 & 1 & 0 & 1 \\ 0 & 0 & 0 & 1 & 0 \end{pmatrix}$$

FIG.43

$$(1)\ DI = M \cdot SI = \begin{pmatrix} 0 & 1 & 0 & 0 & 0 \\ 0 & 0 & 0 & 0 & 0 \\ 1 & 1 & 0 & 0 & 0 \\ 0 & 0 & 1 & 0 & 1 \\ 0 & 0 & 0 & 1 & 0 \end{pmatrix} \begin{pmatrix} 1 \\ 1 \\ 1 \\ 1 \\ 1 \end{pmatrix} = \begin{pmatrix} 1 \\ 0 \\ 2 \\ 2 \\ 1 \end{pmatrix}$$

$$(2)\ SI = M^T \cdot DI = \begin{pmatrix} 0 & 0 & 1 & 0 & 0 \\ 1 & 0 & 1 & 0 & 0 \\ 0 & 0 & 0 & 1 & 0 \\ 0 & 0 & 0 & 0 & 1 \\ 0 & 0 & 0 & 1 & 0 \end{pmatrix} \begin{pmatrix} 1 \\ 0 \\ 2 \\ 2 \\ 1 \end{pmatrix} = \begin{pmatrix} 2 \\ 3 \\ 2 \\ 1 \\ 2 \end{pmatrix}$$

$$(3)\ DI = DI/|DI| = \begin{pmatrix} 0.32 \\ 0.0 \\ 0.63 \\ 0.63 \\ 0.32 \end{pmatrix} \qquad (4)\ SI = SI/|SI| = \begin{pmatrix} 0.43 \\ 0.64 \\ 0.43 \\ 0.21 \\ 0.43 \end{pmatrix}$$

$$(5)\ DI = M \cdot SI = \begin{pmatrix} 0 & 1 & 0 & 0 & 0 \\ 0 & 0 & 0 & 0 & 0 \\ 1 & 1 & 0 & 0 & 0 \\ 0 & 0 & 1 & 0 & 1 \\ 0 & 0 & 0 & 1 & 0 \end{pmatrix} \begin{pmatrix} 0.43 \\ 0.64 \\ 0.43 \\ 0.21 \\ 0.43 \end{pmatrix} = \begin{pmatrix} 0.64 \\ 0.0 \\ 1.07 \\ 0.86 \\ 0.21 \end{pmatrix}$$

$$(6)\ SI = M^T \cdot DI = \begin{pmatrix} 0 & 0 & 1 & 0 & 0 \\ 1 & 0 & 1 & 0 & 0 \\ 0 & 0 & 0 & 1 & 0 \\ 0 & 0 & 0 & 0 & 1 \\ 0 & 0 & 0 & 1 & 0 \end{pmatrix} \begin{pmatrix} 0.64 \\ 0.0 \\ 1.07 \\ 0.86 \\ 0.21 \end{pmatrix} = \begin{pmatrix} 1.07 \\ 1.71 \\ 0.86 \\ 0.21 \\ 0.86 \end{pmatrix}$$

$$(7)\ DI = DI/|DI| = \begin{pmatrix} 0.42 \\ 0.0 \\ 0.70 \\ 0.56 \\ 0.14 \end{pmatrix} \qquad (8)\ SI = SI/|SI| = \begin{pmatrix} 0.45 \\ 0.72 \\ 0.36 \\ 0.089 \\ 0.36 \end{pmatrix}$$

$$(9)\ DI = \begin{pmatrix} 0.53 \\ 0.0 \\ 0.85 \\ 0.0031 \\ 7.50 \times 10^{-10} \end{pmatrix} \qquad (10)\ SI = \begin{pmatrix} 0.53 \\ 0.85 \\ 0.0019 \\ 4.63 \times 10^{-10} \\ 0.0019 \end{pmatrix}$$

FIG.44

| target identifying information | source item degree | derived item degree |
|---|---|---|
| [1] | 0.53 | 0.53 |
| [2] | 0.85 | 0.0 |
| [3] | 0.0019 | 0.85 |
| [4] | $4.63 \times 10^{-10}$ | 0.0031 |
| [5] | 0.0019 | $7.50 \times 10^{-10}$ |

APPARATUSES AND METHOD FOR RECOMMENDING ITEMS BASED ON DETERMINED TREND LEADERS AND TREND FOLLOWERS

This is a continuation of U.S. patent application Ser. No. 12/071,858, with a filing date of Feb. 27, 2008, which is a continuation of International Application No. PCT/JP2008/050405, with an international filing date of Jan. 16, 2008, the entire contents being incorporated by reference. The present application claims priority based on Japanese Patent Application No. 2007-008221, filed Jan. 17, 2007, Japanese Patent Application No. 2007-052707, filed Mar. 2, 2007, and Japanese Patent Application No. 2007-052708, filed Mar. 2, 2007, the entirety of which being incorporated herein by reference.

BACKGROUND OF THE INVENTION

1. Field of the Invention

The present invention relates to information processing systems and the like for recommending products or services for users. The present invention also relates to information processing apparatuses and the like for acquiring information regarding, for example, the leading degree of users or trend shift of products etc., using behavior history information such as product purchase of users.

2. Description of Related Art

Conventionally, there is an information processing system for simultaneously realizing both a content recommendation with more pertinence based on the name and the value of an item that a user is strongly interested in and a content recommendation in consideration of sequentiality of content utilization (see Patent Document 1). This system has a content usage history information storage and management portion in which content usage history information of a user is stored and managed, a content usage shift information calculating portion that calculates content usage shift information based on the content usage history information, a content usage shift information storage and management portion in which the content usage shift information is stored and managed, a content metadata information storage and management portion in which content metadata information is stored and managed, and a content recommendation information generating portion that generates content recommendation information based on the content usage history information, the content usage shift information, and the content metadata information.

Furthermore, there is a system for extracting characteristics of each item name for an individual, and recommending a content based on the characteristics of each item name for the individual (see Patent Document 2). In this system, user's item-categorized preference information of a targeted user is acquired with respect to preset item names. Reference is made to the acquired user's item-categorized preference information, and if an item name appears for the number of times equal to or larger than a threshold value preset for the item name, then its item value is extracted. Then, content information containing this item value as the value of a target item name is acquired, and the acquired content information is recommended for the user.

Furthermore, there is a system for improving the possibility of realizing product purchase and for providing a comprehensive recommendation service (see Patent Document 3). In this system, if a user accesses a server of a music distribution shop A via a network connection service using a mobile phone and purchases, for example, music software, then the server of the shop A transmits the purchase information to a center, and the center searches for concert information of the singer from its recommendation rules, and transmits the recommendation to the mobile phone via a network connection service. Also, in this system, if the user purchases a concert ticket using the mobile phone from a server of a ticket shop B, then the server of the shop B transmits the purchase information to the center, and the center searches for reservation statuses of an airplane and the like on the concert day in this purchase information, from its recommendation rules, and transmits the recommendation to the mobile phone.

Furthermore, as related techniques, there are algorithms for dividing communities (Non-Patent Documents 1, 2, and 3).

Furthermore, conventionally, in order to judge a trend in the market, there is a market information analyzing apparatus for making it possible for keywords indicating values of consumers to be easily found (see Patent Document 4).

[Patent Document 1] JP 2005-293384A (p. 1, FIG. 1 etc.)
[Patent Document 2] JP 2004-362011A (p. 1, FIG. 1 etc.)
[Patent Document 3] JP 2002-117292A (p. 1, FIG. 1 etc.)
[Patent Document 4] JP 2005-92721A (p. 1, FIG. 1 etc.)
[Non-Patent Document 1] M. E. J. Newman and one other, "Finding and evaluating community structure in networks" Aug. 11, 2003
[Non-Patent Document 2] Aaron Clauset, "Finding local community structure in networks" Feb. 21, 2005
[Non-Patent Document 3] Aaron Clauset and two others, "Finding community structure in very large networks" Aug. 30, 2004)

SUMMARY OF THE INVENTION

Problems to be Solved by the Invention

However, in such conventional information processing systems, it is not possible to recommend products etc. in consideration of purchasing behavior of a purchaser who is creating a trend, and thus it is not possible to recommend products etc. that sufficiently satisfy a user, leading to the problem that sales are not sufficiently promoted.

Furthermore, conventionally, it is not possible to acquire information regarding, for example, the leading degree of users or trend shift of products, using behavior history information indicating behaviors performed by users on targets.

Means for Solving the Problems

A first aspect of the present invention is directed to an information processing system provided with a server apparatus and an information output apparatus, wherein the server apparatus comprises: a purchase history information storage portion in which at least two pieces of purchase history information of at least two purchasers are stored, the purchase history information being information indicating purchase history of a product or service that is a product or service, and having purchaser identifying information for identifying a purchaser, product or service identifying information for identifying a product or service, and purchase time information indicating a purchase time of a product or service; a trend leader detecting portion that reads at least two pieces of purchase history information from the purchase history information storage portion, detects purchaser identifying information for identifying a trend leader who purchased at least one product or service at an early stage satisfying a predetermined time condition, from the at least two pieces of product or service identifying information and purchase time information contained in the at least two pieces of purchase history information, acquires the purchaser identifying information from the at least two pieces of purchase history information, and stores the purchaser identifying information in a storage medium; a recommended product or service acquiring portion that acquires at least one piece of product or service identifying information for identifying a product or service purchased by at least one purchaser identified with the at least one piece of purchaser identifying information that has been acquired by the trend leader detecting portion, from the purchase history information storage portion, and stores the product or service identifying information in a storage medium; and a recommended product or service transmitting portion that transmits the at least one piece of product or service identifying information that has been acquired by the recommended product or service acquiring portion, to the information output apparatus, and the information output apparatus comprises: a recommended product or service receiving portion that receives at least one piece of product or service identifying information from the server apparatus; and an output portion that outputs the at least one piece of product or service identifying information that has been received by the recommended product or service receiving portion.

With this configuration, the trend leader can be detected from purchase history of a product, and a product purchased by the trend leader can be recommended. As a result, products etc. that the user wants can be recommended, and sales of products etc. can be promoted.

Furthermore, a second aspect of the present invention is directed to the information processing system according to the first aspect, wherein the server apparatus further comprises a trendy product or service selecting portion that reads the at least two pieces of purchase history information, selects at least one piece of product or service identifying information for identifying a trendy product or service, which is a product or service purchased at a predetermined or higher degree of a trend, and stores the product or service identifying information in a storage medium, and the trend leader detecting portion acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium.

With this configuration, the trend leader who purchased a trendy item at an early stage can be detected, and a product purchased by the trend leader can be recommended. As a result, products etc. that the user wants can be recommended, and sales of products etc. can be promoted.

Furthermore, a third aspect of the present invention is directed to the information processing system according to the first aspect, wherein the trend leader detecting portion comprises: a directed graph information constituting unit that reads at least two pieces of purchase history information from the purchase history information storage portion, acquires the purchaser identifying information and the purchase time information corresponding to the product or service identifying information indicating each of at least one product or service, and constitutes information of a directed graph in which the at least two pieces of purchaser identifying information are linked in the order of the purchase time according to the at least two pieces of purchase time information that have been acquired; a trend leader degree calculating unit that calculates, for each piece of purchaser identifying information, a trend leader degree, which is information indicating a degree of being a link origin and a degree of being a trend source, from the directed graph information that has been constituted by the directed graph information constituting unit, and stores the trend leader degree in a storage medium; and a purchaser identifying information acquiring unit that acquires purchaser identifying information for identifying a trend leader having a high degree of being the trend source, using the trend leader degree of each piece of purchaser identifying information that has been calculated by the trend leader degree calculating unit, from the at least two pieces of purchase history information, and stores the purchaser identifying information in a storage medium.

With this configuration, the trend leader can be precisely detected. As a result, products etc. that the user wants can be recommended as appropriate, and sales of products etc. can be further promoted.

Furthermore, a fourth aspect of the present invention is directed to the information processing system according to the third aspect, wherein the server apparatus further comprises a user identifying information storage portion in which purchaser identifying information for identifying a user of the information output apparatus is stored, the trend leader detecting portion further comprises a trend follower degree calculating unit that calculates, for each piece of purchaser identifying information, a trend follower degree, which is information indicating a degree of following a link origin and a degree of following a trend, from the directed graph information that has been constituted by the directed graph information constituting unit, and stores the trend follower degree in a storage medium, and the purchaser identifying information acquiring unit acquires purchaser identifying information for identifying a trend leader having a high degree of being the trend source, using the trend leader degree of each piece of purchaser identifying information that has been calculated by the trend leader degree calculating unit and the trend follower degree of each piece of purchaser identifying information that has been calculated by the trend follower degree calculating unit, from the at least two pieces of purchase history information, and stores the purchaser identifying information in a storage medium.

With this configuration, the trend leader can be precisely detected. As a result, products etc. that the user wants can be recommended as appropriate, and sales of products etc. can be further promoted.

Furthermore, a fifth aspect of the present invention is directed to the information processing system according to the first aspect, wherein the server apparatus further comprises a user identifying information storage portion in which purchaser identifying information for identifying a user of the information output apparatus is stored, and the recommended product or service acquiring portion reads the purchaser identifying information stored in the user identifying information storage portion, thereby acquiring at least one piece of product or service identifying information for identifying a product or service that has not been purchased by the user identified with the purchaser identifying information, among product or service identifying information for identifying a product or service that has been purchased by at least one purchaser identified with the at least one piece of purchaser identifying information that has been acquired by the trend leader detecting portion, and stores the product or service identifying information in a storage medium.

With this configuration, a product or service that has not been purchased by the person targeted for recommendation can be recommended. As a result, recommendation can be provided more precisely.

Furthermore, a sixth aspect of the present invention is directed to the information processing system according to any one of the first to fifth aspects, wherein the server apparatus further comprises: a product or service information storage portion in which at least two pieces of product or service information having product or service identifying information and at least one attribute value of a product or service identified with the product or service identifying information are stored; a purchase information receiving portion that receives purchase information, which is information indicating a purchase of a product or service by a user of the information output apparatus, and which has purchaser identifying information for identifying the user and product or service identifying information for identifying the product or service, from the information output apparatus; and a purchase history information accumulating portion that constitutes purchase history information, using the purchase information that has been received by the purchase information receiving portion, and accumulates the purchase history information in the purchase history information storage portion, and the recommended product or service acquiring portion acquires at least one attribute value paired with the product or service identifying information contained in the purchase information that has been received by the purchase information receiving portion, and acquires product or service identifying information of a product or service having at least one attribute value having a predetermined relationship with the at least one attribute value, the product or service identifying information being for identifying a product or service purchased by at least one purchaser identified with the at least one piece of purchaser identifying information that has been acquired by the trend leader detecting portion.

With this configuration, a product or service relating to a product purchased by the person targeted for recommendation can be recommended. As a result, products etc. that the user wants more can be recommended, and sales of products etc. can be further promoted. Herein, the product or service relating to a product purchased by the person targeted for recommendation is a product or service having a high possibility of being simultaneously purchased. For example, it may be an accessory in the case where the person targeted for recommendation has purchased clothing.

Furthermore, a seventh aspect of the present invention is directed to the information processing system according to the first aspect, wherein the server apparatus further comprises: an input information receiving portion that receives at least two pairs of input information, which is information input to the information output apparatus by a purchaser, and purchaser identifying information; an input information accumulating portion that accumulates the input information and the purchaser identifying information that have been received by the input information receiving portion, in a storage medium; and a purchaser classifying portion that classifies, using the at least two pieces of input information that have been accumulated by the input information accumulating portion, the purchaser identifying information paired with each piece of input information, and manages the purchaser identifying information in such a manner that a group to which each piece of purchaser identifying information belongs can be identified, and the trend leader detecting portion reads at least two pieces of purchase history information having at least one piece of purchaser identifying information belonging to a group to which the purchaser identifying information stored in the user identifying information storage portion belongs, from the purchase history information storage portion, detects purchaser identifying information for identifying a trend leader who purchased at least one product or service at an early stage satisfying a predetermined time condition, from the at least two pieces of product or service identifying information and purchase time information contained in the at least two pieces of purchase history information, acquires the purchaser identifying information from the at least two pieces of purchase history information, and stores the purchaser identifying information in a storage medium.

With this configuration, the users can be divided into groups, and the trend leader can be determined for a group to which the person targeted for recommendation belongs. As a result, a product purchased by the trend leader who has preference close to the preference of the person targeted for recommendation can be recommended. Accordingly, products etc. that the users want more can be recommended, and sales of products etc. can be further promoted.

Furthermore, an eighth aspect of the present invention is directed to the information processing system according to the seventh aspect, wherein the purchaser classifying portion reads the input information and the purchaser identifying information that have been accumulated by the input information accumulating portion, analyzes preference of each purchaser using the input information and the purchaser identifying information, classifies at least two pieces of purchaser identifying information based on the preference, and manages the purchaser identifying information in such a manner that a group to which each piece of purchaser identifying information belongs can be identified.

With this configuration, the users can be divided into groups, using behavior of the users (including purchase history and browsing history of website/webpage). Thus, the users can be divided into groups more precisely. As a result, products etc. that the users want more can be recommended, and sales of products etc. can be further promoted.

Furthermore, a ninth aspect of the present invention is directed to the information processing system according to the eighth aspect, wherein the input information that has been received by the input information receiving portion has product or service identifying information for identifying a product or service purchased by a purchaser identified with the purchaser identifying information, the input information accumulating portion accumulates the purchase history information having the product or service identifying information that has been received by the input information receiving portion, the purchaser identifying information, and the purchase time information, in the purchase history information storage portion, and the purchaser classifying portion classifies at least two pieces of purchaser identifying information, using the at least two pieces of purchase history information that have been accumulated by the input information accumulating portion, and manages the purchaser identifying information in such a manner that a group to which each piece of purchaser identifying information belongs can be identified.

With this configuration, the users can be divided into groups, using the purchase history information of the users.

Furthermore, a tenth aspect of the present invention is directed to an information processing system provided with a server apparatus and an information output apparatus, wherein the server apparatus comprises: a purchase history information storage portion in which at least two pieces of purchase history information of at least two purchasers are stored, the purchase history information being information indicating purchase history of a product or service that is a product or service, and having purchaser identifying information for identifying a purchaser, product or service identifying information for identifying a product or service, and purchase time information indicating a purchase time of a product or service; a trendy product or service selecting portion that reads the at least two pieces of purchase history information, selects at least one piece of product or service identifying information for identifying a trendy product or service, which is a product or service purchased at a predetermined or higher degree of a trend, and stores the product or service identifying information in a storage medium; a trend leader detecting portion that acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium; a recommended product or service acquiring portion that acquires product or service identifying information paired with the purchaser identifying information that has been acquired by the trend leader detecting portion, from the purchase history information storage portion; a purchase information receiving portion that receives purchase information, which is information indicating a purchase of a product or service by a user of the information output apparatus, and which has purchaser identifying information for identifying the user and product or service identifying information for identifying the product or service, from the information output apparatus; a judging portion that judges whether or not the purchaser identifying information that has been received by the purchase information receiving portion is contained in the purchaser identifying information that has been acquired by the trend leader detecting portion; and a recommended product or service transmitting portion that transmits the product or service identifying information that has been received by the purchase information receiving portion, if the judging portion judges that the purchaser identifying information that has been received by the purchase information receiving portion is contained in the purchaser identifying information that has been acquired by the trend leader detecting portion, and the information output apparatus comprises: a recommended product or service receiving portion that receives at least one piece of product or service identifying information from the server apparatus; and an output portion that outputs the at least one piece of product or service identifying information that has been received by the recommended product or service receiving portion.

With this configuration, when the trend leader purchases a product or service, the user can be immediately notified of information of the product or service As a result, sales of products etc. can be further promoted.

Furthermore, an eleventh aspect of the present invention is directed to the information processing system according to any one of the first to tenth aspects, wherein the server apparatus further comprises a trend leader output portion that outputs information to the effect that a purchaser identified with the purchaser identifying information that has been acquired by the trend leader detecting portion is the trend leader.

With this configuration, the trend leader can be provided with remuneration. As a result, the user wants to become the trend leader. As a result, sales of products etc. can be further promoted.

Furthermore, a twelfth aspect of the present invention is directed to an information processing apparatus, comprising: a behavior information storage portion in which at least two pieces of behavior information are stored, the behavior information being information indicating a history of events in which a target is processed by a user performing a behavior on the target, and having user identifying information for identifying a user, target identifying information for identifying a target, and time information indicating when a behavior occurred; a behavior order information acquiring portion that reads at least two pieces of behavior information from the behavior information storage portion, and acquires, from the target identifying information and the time information contained in the at least two pieces of behavior information, behavior order information, which is information regarding the order of a behavior performed by at least two users on a target identified with the target identifying information; a leading degree information calculating portion that calculates leading degree information, which is information regarding a leading degree or delaying degree of a user, using the behavior order information that has been acquired by the behavior order information acquiring portion; and a leading degree information output portion that outputs the leading degree information.

With this configuration, the leading degree information can be calculated from the behavior history (the behavior information) of multiple users.

Furthermore, a thirteenth aspect of the present invention is directed to the information processing apparatus according to the twelfth aspect, wherein the leading degree information calculating portion comprises: a trend leader degree calculating unit that calculates, for each of at least two users, trend leader degree, which is information indicating a degree of being an origin of a behavior performed on the same target by multiple users and a degree of being a trend source, from at least two pieces of behavior order information that have been acquired by the behavior order information acquiring portion; and a trend follower degree calculating unit that calculates, for each of at least two users, trend follower degree, which is information indicating a degree of following an origin of a behavior performed on the same target by multiple users and a degree of following a trend, from at least two pieces of behavior order information that have been acquired by the behavior order information acquiring portion, and the leading degree information output portion outputs at least one of the trend leader degree and the trend follower degree.

With this configuration, the trend leader degree and the trend follower degree can be calculated from the behavior history (the behavior information) of multiple users.

Furthermore, a fourteenth aspect of the present invention is directed to the information processing apparatus according to the twelfth or thirteenth aspect, further comprising: a trend leader acquiring portion that accepts the leading degree information that has been output by the leading degree information output portion, and acquires user identifying information for identifying a trend leader, which is a user who performs a behavior at an early stage satisfying a predetermined time condition, using the leading degree information; and a trend leader output portion that outputs the user identifying information that has been acquired by the trend leader acquiring portion.

With this configuration, the trend leader can be acquired.

Effect of the Invention

According to the information processing system of the present invention, the purchasing behavior of purchasers is considered, a trend leader who is creating a trend is determined, and recommendation of a product or service can be provided based on the behavior in which the trend leader purchases a product or service Furthermore, according to the information processing apparatus of the present invention, information regarding, for example, the leading degree of users or trend shift of products can be acquired.

BRIEF DESCRIPTION OF THE DRAWINGS

FIG. 7 is a diagram showing a product or service information management table in the information processing system;

FIG. 8 is a diagram showing a purchase history information management table in the information processing system;

FIG. 10 is a diagram showing the purchase history information management table;

FIG. 12 is a diagram showing a point management table in the information processing system;

FIG. 13 is a diagram showing a related product or service management table in the information processing system;

FIG. 19 is a diagram showing a group identifier management table in the information processing system;

FIG. 20 is a diagram showing a trend leader management table in the information processing system;

FIG. 26 is a flowchart illustrating an algorithm for calculating the trend leader degree and the like;

FIG. 28 is a diagram showing a purchase history information management table in the information processing system;

FIG. 29 is a conceptual diagram of a network of purchaser identifying information obtained by a directed graph information constituting unit in the information processing system;

FIG. 31 is a diagram showing an example of directed graph information in the information processing system;

FIG. 32 is a diagram illustrating the procedure for calculating the trend leader degree and the like;

FIG. 33 is a diagram showing the acquired trend leader degree and trend follower degree in the information processing system;

FIG. 40 is a diagram showing an information example focusing on the order of purchase of products etc. in the information processing system;

FIG. 42 is a diagram showing an example of directed graph information in the information processing system;

FIG. 43 is a diagram illustrating the procedure for calculating target leading degree information;

FIG. 44 is a diagram showing the acquired source item degree and derived item degree in the information processing system;

DETAILED DESCRIPTION OF THE INVENTION

Figure 1:
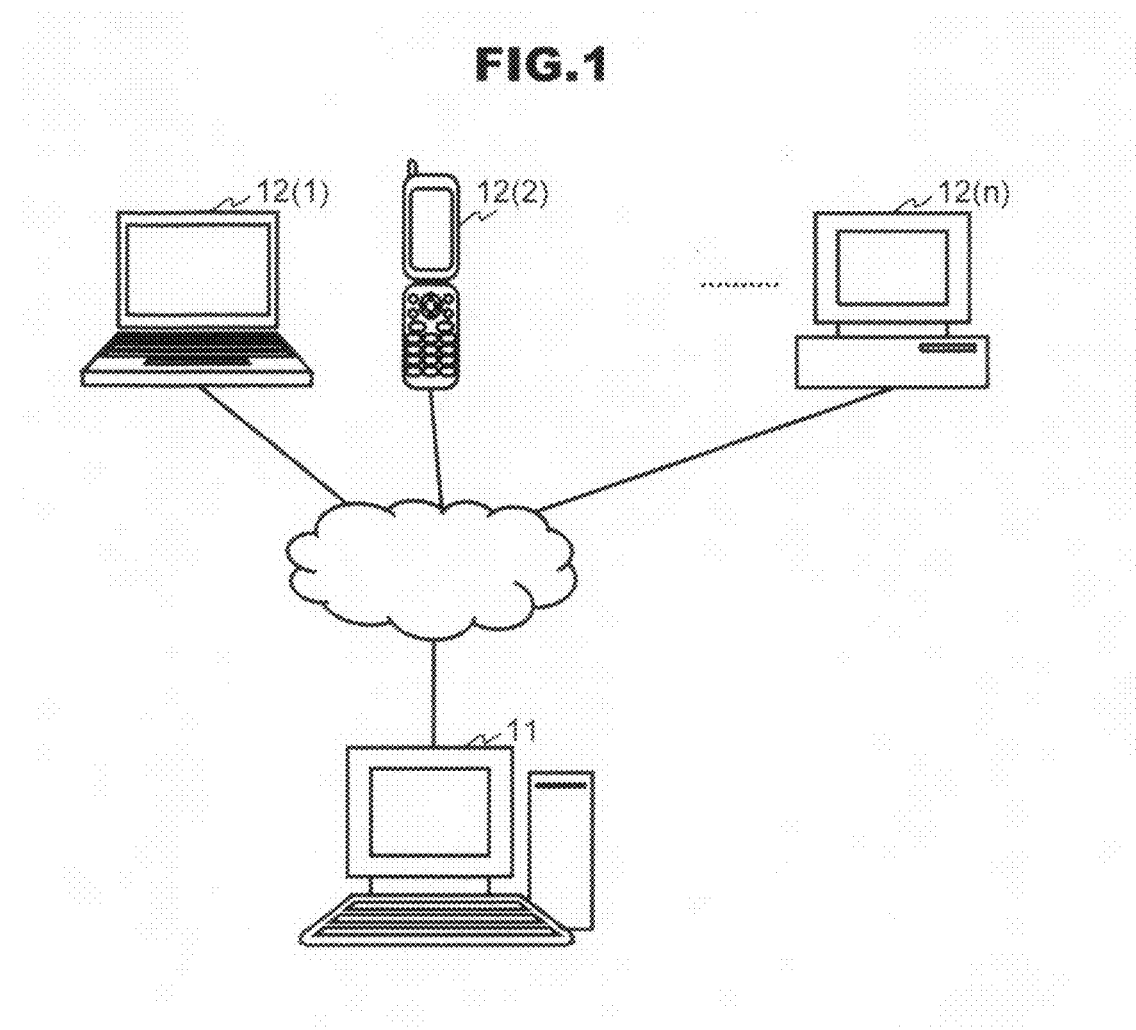
FIG. 1 is a conceptual diagram of an information processing system in Embodiment 1.

Hereinafter, embodiments of an information processing system and the like will be described with reference to the drawings. It should be noted that components denoted by the same reference numerals in the embodiments perform similar operations, and thus a description thereof may not be repeated.

Embodiment 1

In this embodiment, an information processing system for detecting a trend leader who purchased a trendy item at an early stage, and recommending a product purchased by the trend leader will be described. Herein, as the recommended product, typically, a product or service that has not been purchased by a person targeted for recommendation is recommended. Also, as the recommended product, a product or service relating to a product or service that has been purchased by a person targeted for recommendation is recommended. The product or service relating to the product or service is a product or service having the same or similar attributes of the product or service More specifically, for example, in this information processing system, if the person targeted for recommendation has purchased a skirt, then a jacket that is to be combined with the skirt is recommended. At that time, for example, a product type "skirt" and a product type "jacket" are associated with each other.

FIG. 1 is a conceptual diagram of the information processing system. The information processing system is provided with a server apparatus 11 and one or more information output apparatuses 12 (12(1), 12(2), . . . , 12(n)). The server apparatus 11 and the one or more information output apparatuses 12 can exchange information via a network. The server apparatus 11 and the one or more information output apparatuses 12 are connected to each other typically via a network such as the Internet, a wireless communication network, a telephone network, or a dedicated line.

Figure 2:
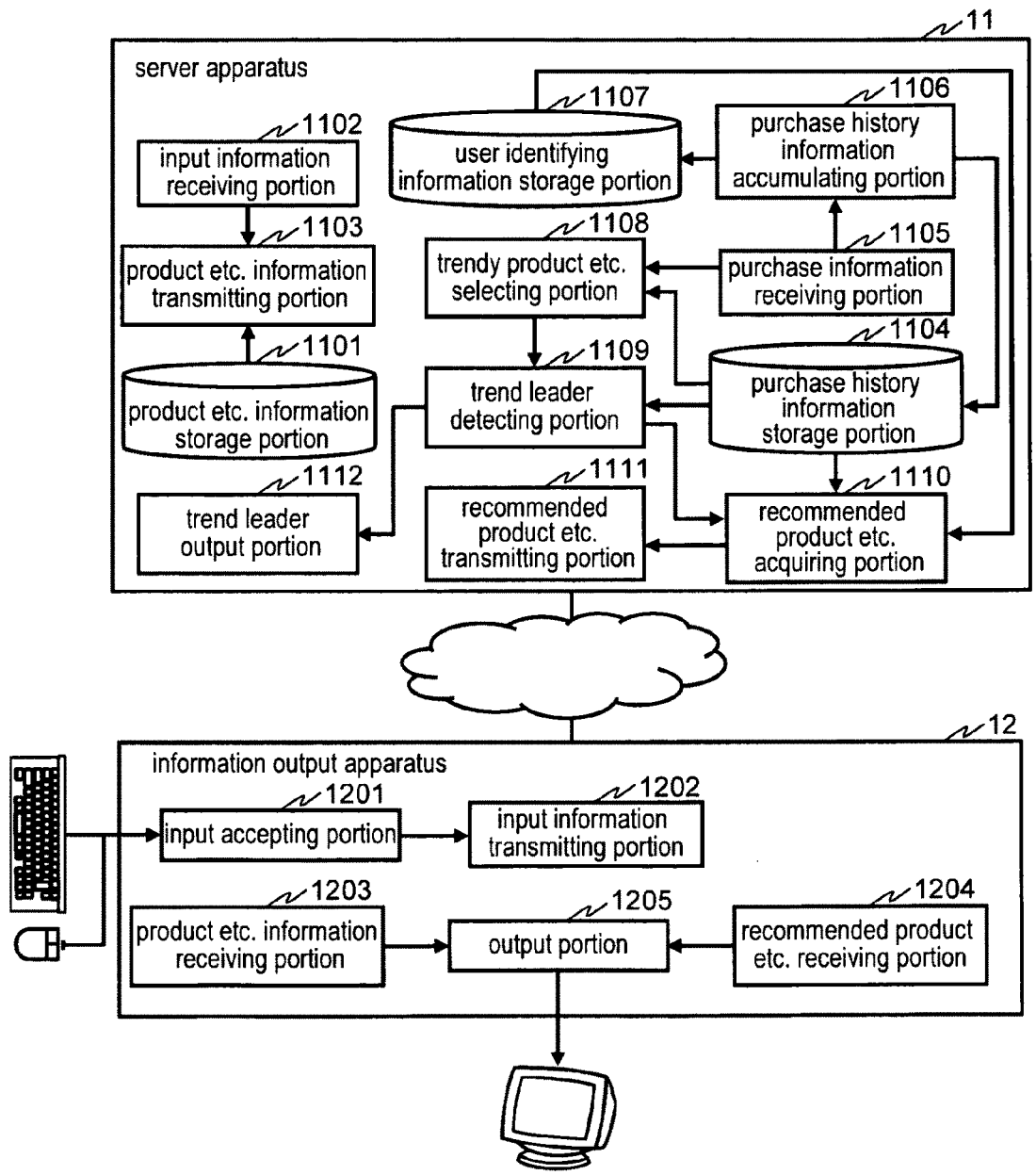
FIG. 2 is a block diagram of the information processing system.

FIG. 2 is a block diagram of the information processing system in this embodiment. The server apparatus 11 is provided with a product or service information storage portion 1101, an input information receiving portion 1102, a product or service information transmitting portion 1103, a purchase history information storage portion 1104, a purchase information receiving portion 1105, a purchase history information accumulating portion 1106, a user identifying information storage portion 1107, a trendy product or service selecting portion 1108, a trend leader detecting portion 1109, a recommended product or service acquiring portion 1110, a recommended product or service transmitting portion 1111, and a trend leader output portion 1112.

The information output apparatus 12 is provided with an input accepting portion 1201, an input information transmitting portion 1202, a product or service information receiving portion 1203, a recommended product or service receiving portion 1204, and an output portion 1205.

In the product or service information storage portion 1101, two or more pieces of product or service information are stored. The product or service information has product or service identifying information, and one or more attribute values of a product or service identified with the product or service identifying information. The product or service is, for example, a product or service that is to be purchased or lent. The product or service may be tangibles such as clothing or electronic equipment, or may be intangibles such as music, movies, or some rights. Furthermore, the product or service may be personal estate, or may be real estate. More specifically, the product or service may be anything for a commercial transaction. The product or service identifying information may be any information with which the product or service can be identified. The product or service identifying information is, for example, the identification ID of the product or service or the name of the product or service The attribute values of the product or service are, for example, the price, shape, color, size, data format, or genre, category, or type of the product or service Herein, the product or service identifying information may contain the attribute values (the price, the shape, the color, the size, etc.) of the product or service The product or service information storage portion 1101 is preferably a non-volatile storage medium, but can be implemented also as a volatile storage medium.

The input information receiving portion 1102 receives input information, which is information that has been input by a user of the information output apparatus 12 to the information output apparatus 12. The input information is, for example, a command to display a website for purchasing the product or service, or the user ID or password for purchasing the product or service In addition to the above, the input information is other information that has been input to the information output apparatus 12 by the user. The input information receiving portion 1102 may receive a pair of input information and purchaser identifying information. The input information receiving portion 1102 can be implemented, for example, as a wireless or wired communication unit.

When the input information receiving portion 1102 receives a command to display a website for purchasing the product or service, the product or service information transmitting portion 1103 reads the product or service information, which is information of the product or service that is to be displayed on the website (requested by the user), from the product or service information storage portion 1101, and transmits the read product or service information to the information output apparatus 12. The product or service information transmitting portion 1103 transmits, for example, a website containing one or more pieces of product or service information to the information output apparatus 12. The product or service information transmitting portion 1103 can be implemented, for example, as a wireless or wired communication unit.

In the purchase history information storage portion 1104, two or more pieces of purchase history information are stored. The purchase history information is information indicating purchase history of a product or service that is a product or service purchased by a purchaser. The purchase history information has purchaser identifying information for identifying a purchaser, product or service identifying information for identifying a product or service, and purchase time information indicating a purchase time of a product or service The purchaser identifying information is, for example, the ID of the purchaser or the ID (such as the IP address, the MAC address, the telephone number, etc.) of the information output apparatus 12. The purchase time information is information relating to the time at which the product or service was purchased, such as the date (may be the year, month and day, or may be the month and day), or the time and date (may be the year, month, day, hour, and minute) when the product or service was purchased. The purchase history information storage portion 1104 is preferably a non-volatile storage medium, but can be implemented also as a volatile storage medium.

The purchase information receiving portion 1105 receives purchase information from the information output apparatus 12. The purchase information is information indicating a purchase of the product or service by the user of the information output apparatus 12, and has purchaser identifying information for identifying the user and product or service identifying information for identifying the product or service The purchase information receiving portion 1105 can be implemented, for example, as a wireless or wired communication unit.

The purchase history information accumulating portion 1106 constitutes purchase history information, using the purchase information that has been received by the purchase information receiving portion 1105, and accumulates the purchase history information in the purchase history information storage portion 1104. The purchase history information accumulating portion 1106 may acquire the current time from its clock, and take it as the purchase time information constituting the purchase history information. Also, the purchase information receiving portion 1105 may receive the purchase time information from the information output apparatus 12, and the purchase history information accumulating portion 1106 may constitute the purchase history information also using the received purchase time information. Typically, the purchase history information accumulating portion 1106 can be implemented, for example, as an MPU or a memory. Typically, the processing procedure of the purchase history information accumulating portion 1106 is implemented by software, and the software is stored in a storage medium such as a ROM. Note that the processing procedure also may be implemented by hardware (dedicated circuit).

In the user identifying information storage portion 1107, purchaser identifying information for identifying the user of the information output apparatus 12 is stored. The purchaser identifying information for identifying the user of the information output apparatus 12 is contained typically in the purchase information that has been received by the purchase information receiving portion 1105. Herein, before the purchase information receiving portion 1105 receives the purchase information, this purchaser identifying information may be received by the input information receiving portion 1102. Typically, the purchaser identifying information is temporarily held in the user identifying information storage portion 1107. The user identifying information storage portion 1107 may be a non-volatile storage medium, or may be a volatile storage medium.

The trendy product or service selecting portion 1108 reads two or more pieces of purchase history information, selects one or more pieces of product or service identifying information for identifying a trendy product or service, which is a product or service purchased at a predetermined or higher degree of a trend, and stores the information in a storage medium (may be a volatile medium such as a memory, or may be a non-volatile medium such as a hard disk). The trendy product or service is a product or service that is judged to be a trendy product or service according to the purchase history information in the purchase history information storage portion 1104. More specifically, the predetermined or higher degree of a trend refers to a case in which the number of purchasers is a threshold value (for example, 50000 etc.) or more stored in advance, or a case in which the ratio of purchases is a threshold value or more (such as a case in which the ratio is 5% or more of the entire sales figure, or a case in which 5% or more of target users have made the purchase), for example. Also, the predetermined or higher degree of a trend refers to a case in which a predetermined number (for example, 1000) or more of purchasers have made the purchase in a predetermined short period (for example, one month), or a case in which the product or service is a long-selling product (such as a case in which a predetermined number or more of the products etc. are selling for five years), for example. More specifically, in the trendy product or service selecting portion 1108, trendy product or service condition information, which indicates a condition for judging whether or not a product or service is a trendy product or service, is stored. The trendy product or service selecting portion 1108 reads the trendy product or service condition information, selects one or more pieces of product or service identifying information of products etc. that satisfy the trendy product or service condition information, and stores the information in a storage medium. The trendy product or service condition information is, for example, "sales figure >50000", "number of purchasers ≥1000", "ratio of purchasers ≥5%", or the like, as described above. The predetermined or higher degree of a trend refers to a case in which a condition specified with the trendy product or service condition information is satisfied. Typically, the trendy product or service selecting portion 1108 can be implemented, for example, as an MPU or a memory. Typically, the processing procedure of the trendy product or service selecting portion 1108 is implemented by software, and the software is stored in a storage medium such as a ROM. Note that the processing procedure also may be implemented by hardware (dedicated circuit).

The trend leader detecting portion 1109 acquires purchaser identifying information for identifying a purchaser who purchased the trendy product or service identified with the one or more pieces of product or service identifying information that have been selected by the trendy product or service selecting portion 1108 and who made the purchase at an early stage satisfying a predetermined time condition, from the two or more pieces of purchase history information, and stores the information in a storage medium (may be a volatile medium such as a memory, or may be a non-volatile medium such as a hard disk). The purchaser who made the purchase at an early stage satisfying the predetermined time condition is, for example, a purchaser specified with the purchaser identifying information contained in the purchase history information having the purchase time information that indicates the earliest time or date. Also, the purchaser who made the purchase at an early stage satisfying the predetermined time condition is, for example, a purchaser who purchased two or more trendy products etc. and who is specified with the purchaser identifying information contained in the purchase history information having the purchase time information that indicates the fifth earliest or earlier time or date with respect to each of the two or more trendy products etc. Hereinafter, such a purchaser is referred to as a trend leader as appropriate. Herein, an algorithm for determining the trend leader is not limited to the above-described example. That is to say, the trend leader refers to a person who purchased the trendy product or service at an early stage. Various algorithms are conceivable as to how early the person has to make the purchase in order to be the trend leader. Typically, the trend leader detecting portion 1109 can be implemented, for example, as an MPU or a memory. Typically, the processing procedure of the trend leader detecting portion is implemented by software, and the software is stored in a storage medium such as a ROM. Note that the processing procedure also may be implemented by hardware (dedicated circuit).

The recommended product or service acquiring portion 1110 acquires the product or service identifying information of a product or service that is to be recommended for the user of the information output apparatus 12. Furthermore, the product or service identifying information of the recommended product or service is one or more pieces of product or service identifying information for identifying a product or service purchased by one or more purchasers identified with the one or more pieces of purchaser identifying information that have been acquired by the trend leader detecting portion 1109. More specifically, the recommended product or service acquiring portion 1110 reads one or more pieces of purchase history information having one or more pieces of purchaser identifying information that have been acquired by the trend leader detecting portion 1109, from the purchase history information storage portion 1104, and acquires one piece or one or more pieces of product or service identifying information from the one or more pieces of purchase history information. Then, the recommended product or service acquiring portion 1110 stores the acquired product or service identifying information in a storage medium (may be a volatile medium such as a memory, or may be a non-volatile medium such as a hard disk). Furthermore, it is preferable that the recommended product or service acquiring portion 1110 reads the purchaser identifying information stored in the user identifying information storage portion 1107, thereby acquiring one or more pieces of product or service identifying information for identifying a product or service that has not been purchased by the user identified with the purchaser identifying information (the product or service identifying information in the purchase history information not containing that purchaser identifying information), among the product or service identifying information for identifying a product or service that has been purchased by one or more purchasers identified with the one or more pieces of purchaser identifying information that have been acquired by the trend leader detecting portion 1109, and stores the information in a storage medium. More specifically, it is preferable to exclude products etc. that have been already purchased by the user of the information output apparatus 12, from the recommended products etc. Furthermore, it is preferable that the recommended product or service acquiring portion 1110 acquires one or more attribute values paired with the product or service identifying information contained in the purchase information that has been received by the purchase information receiving portion 1105, and acquires the product or service identifying information of a product or service having one or more attribute values having a predetermined relationship with the above-described one or more attribute values. More specifically, it is preferable that the recommended product or service acquiring portion 1110 acquires the product or service identifying information of a product or service (such as a jacket etc. that is to be worn together with trousers) relating to a product or service (such as trousers) that has been purchased by the trend leader and that has been purchased by the user of the information output apparatus 12. In this case, for example, the attribute value "product type (trousers)" and the attribute value "product type (jacket)" are managed in association with each other as related products etc. The recommended product or service acquiring portion 1110 may acquire, not only the product or service identifying information (such as the ID or the name of the product or service), but also an attribute value (the synoptic photograph, the price, the sales company, the manufacturer, etc.) of the product. Moreover, it is preferable that if the recommended product or service acquiring portion 1110 reads one or more pieces of purchase history information having one or more pieces of purchaser identifying information that have been acquired by the trend leader detecting portion 1109, from the purchase history information storage portion 1104, and acquires one piece or one or more pieces of product or service identifying information from the one or more pieces of purchase history information, then, for example, only one piece of product or service identifying information regarding the product or service most recently purchased or only product or service identifying information regarding a predetermined number (for example, three) of products etc. recently purchased. Typically, the recommended product or service acquiring portion 1110 can be implemented, for example, as an MPU or a memory. Typically, the processing procedure of the recommended product or service acquiring portion 1110 is implemented by software, and the software is stored in a storage medium such as a ROM. Note that the processing procedure also may be implemented by hardware (dedicated circuit).

The recommended product or service transmitting portion 1111 transmits the one or more pieces of product or service identifying information that have been acquired by the recommended product or service acquiring portion 1110, to the information output apparatus 12. It is preferable that the recommended product or service transmitting portion 1111 transmits, not only the product or service identifying information, but also an attribute value (the synoptic photograph, the price, the sales company, the manufacturer, etc.) of the product identified with the product or service identifying information. In this case, the attribute value of the product may be searched for by the recommended product or service transmitting portion 1111 from the product or service information storage portion 1101, using the product or service identifying information as a key, or may be acquired by the recommended product or service acquiring portion 1110. Furthermore, herein, the product or service identifying information that is transmitted by the recommended product or service transmitting portion 1111 does not have to match the product or service identifying information that has been acquired by the recommended product or service acquiring portion 1110. More specifically, the product or service identifying information that has been acquired by the recommended product or service acquiring portion 1110 may be the ID, and an attribute value of a product or service extracted using the ID may be the product or service identifying information that is transmitted by the recommended product or service transmitting portion 1111. More specifically, the product or service identifying information may be any information with which the user can identify a product or service There is no limitation on the timing at which the recommended product or service transmitting portion 1111 transmits the product or service identifying information to the information output apparatus 12. The transmission may be performed immediately after a certain user purchased a product or service, at a time when a certain user accesses the server apparatus 11 and a screen of an electronic commercial transaction is transmitted, or immediately after the trend leader purchased a product or service as described in Embodiment 3. The recommended product or service transmitting portion 1111 can be implemented, for example, as a wireless or wired communication unit.

The trend leader output portion 1112 outputs information to the effect that a purchaser identified with the purchaser identifying information that has been acquired by the trend leader detecting portion 1109 is the trend leader. Herein, the term "output" has a concept that includes displaying on a display screen, printing in a printer, outputting a sound, transmission to an external apparatus (such as the information output apparatus 12 of the trend leader), and accumulation in a storage medium. Furthermore, the trend leader output portion 1112 may provide a purchaser selected as the trend leader with points for providing some remuneration, and the points may be accumulated so as to be paired with the purchaser identifying information for identifying the trend leader, in an unshown storage unit. It is preferable that the trend leader is notified of the points, for example, with transmission to the information output apparatus 12 of the trend leader, and benefits (discount etc.) are provided in subsequent purchase of a product or service by the number of the points. Alternatively, the trend leader output portion 1112 may provide a purchaser selected as the trend leader with points for providing some remuneration, the points may be accumulated so as to be paired with the purchaser identifying information for identifying the trend leader, in an unshown storage unit, the purchaser may be ranked according to the number of the points, and information of the ranking may be output. Herein, output of the information of the ranking refers to, for example, transmission to the information output apparatus 12 or a mail address indicated in the stored purchaser identifying information. In this manner, when ranking is performed according to a trend leader degree indicating the degree of being the trend leader, users compete with each other, and thus the effect of contributing to sales promotion of products etc. is obtained. The trend leader output portion 1112 may or may not include an output device such as a display screen. The trend leader output portion 1112 can be implemented as driver software for an output device, or a combination of driver software for an output device and the output device, for example.

The input accepting portion 1201 accepts, for example, input of information or commands from the user of the information output apparatus 12. The user can use any input unit, such as a numeric keypad, a keyboard, a mouse, or a menu screen. The input accepting portion 1201 can be implemented as a device driver of an input unit such as a numeric keypad or a keyboard, or control software for a menu screen, for example.

The input information transmitting portion 1202 constitutes input information from the information that has been accepted by the input accepting portion 1201, and transmits the input information to the server apparatus 11. The input information is, for example, a command to display a website on which products etc. for an electronic commercial transaction can be browsed. There is no limitation on the data structure of the input information. The input information transmitting portion 1202 can be implemented, for example, as a wireless or wired communication unit.

The product or service information receiving portion 1203 receives information of a product or service that is to be purchased. The product or service information receiving portion 1203 receives, for example, a website for an electronic commercial transaction (a file described in, for example, HTML or XML for constituting a screen). The product or service information receiving portion 1203 can be implemented as a wireless or wired communication unit.

The recommended product or service receiving portion 1204 receives one or more pieces of product or service identifying information for recommendation, from the server apparatus 11. The recommended product or service receiving portion 1204 receives, typically, not only the product or service identifying information, but also an attribute value of the product or service (such as the photograph, the price, the size, the specification of the product). The recommended product or service receiving portion 1204 can be implemented, for example, as a wireless or wired communication unit.

The output portion 1205 outputs the information of a product or service that has been received by the product or service information receiving portion 1203. More specifically, the output portion 1205 outputs information for purchasing a product or service with an electronic commercial transaction (such as website etc. on which products etc. for a transaction can be browsed and purchased). Furthermore, the output portion 1205 outputs the one or more pieces of product or service identifying information that have been received by the recommended product or service receiving portion 1204. More specifically, the output portion 1205 outputs information of a product or service that is recommended for the user. Furthermore, typically, the user of the information output apparatus 12 can purchase a recommended product or service in the information that has been output by the output portion 1205. More specifically, the input accepting portion 1201 also accepts, for example, a command for purchasing the recommended product or service Herein, the term "output" has a concept that includes displaying on a display screen, outputting a sound, transmission to an external apparatus (such as a display apparatus), and accumulation in a storage medium. The output portion 1205 may or may not include an output device such as a display screen and a loudspeaker. The output portion 1205 can be implemented as driver software for an output device, or a combination of driver software for an output device and the output device, for example.

Next, the operation of the information processing system will be described. First, the operation of the server apparatus 11 will be described with reference to the flowcharts in FIGS. 3 to 5.

(Step S301) The input information receiving portion 1102 judges whether or not the input information has been received from the information output apparatus 12. If the input information has been received, the procedure proceeds to step S302. If the input information has not been received, the procedure proceeds to step S307.

(Step S302) The product or service information transmitting portion 1103 judges whether or not the input information that has been received in step S301 is an instruction to transmit the product or service information. If the input information is an instruction to transmit the product or service information, the procedure proceeds to step S303. If the input information is not an instruction to transmit the product or service information, the procedure proceeds to step S306.

(Step S303) The product or service information transmitting portion 1103 reads one or more pieces of product or service information corresponding to the instruction to transmit the product or service information, from the product or service information storage portion 1101.

(Step S304) The product or service information transmitting portion 1103 constitutes information that is to be transmitted, from the one or more pieces of product or service information that have been read in step S303.

(Step S305) The product or service information transmitting portion 1103 transmits the information that has been constituted in step S304. Herein, the processing from step S302 to step S305 is processing in which an instruction to transmit screen information for an electronic commercial transaction is received from the information output apparatus 12, and the screen information is transmitted to the information output apparatus 12 following the instruction, and is well known. Furthermore, the processing from step S302 to step S305 may be processing following other procedures.

(Step S306) An unshown unit performs processing according to the input information that has been received in step S301. For example, if the input information is the user ID (one of the purchaser identifying information) and the password of the user of the information output apparatus 12, the unshown unit performs authentication processing, and only if the user is accepted with respect to the authentication, for example, subsequent processing is continued. Furthermore, if the input information is an instruction to browse another page within the server apparatus 11, the unshown unit reads the instructed other page (it is assumed that a large number of pages for an electronic commercial transaction are stored in a storage medium within the server apparatus 11), and transmits the page.

(Step S307) The purchase information receiving portion 1105 judges whether or not the purchase information has been received. If the purchase information has been received, the procedure proceeds to step S308. If the purchase information has not been received, the procedure returns to step S301. The purchase information is, for example, a command "purchase product or service identifying information, 1, purchaser identifying information". In the command "purchase product or service identifying information, 1, purchaser identifying information", "purchase" refers to a command name, and "1" refers to the number of products etc. that are purchased.

(Step S308) The purchase history information accumulating portion 1106 acquires the current time (such as the year, month, day, hour, and minute, in this example) from an unshown clock. This current time is the purchase time information. Then, the purchase history information accumulating portion 1106 constitutes purchase history information having "purchaser identifying information, product or service identifying information, purchase time information". Then, the purchase history information accumulating portion 1106 accumulates the purchase history information in the purchase history information storage portion 1104. Herein, the purchase time information may be contained in the purchase information that has been received by the purchase information receiving portion 1105. In this case, the purchase history information accumulating portion 1106 does not have to acquire the purchase time information. Note that in consideration of the consistency of the time, it is preferable that the server apparatus 11 acquires the purchase time information.

(Step S309) The purchase history information accumulating portion 1106 acquires the purchaser identifying information, from the purchase information that has been received by the purchase information receiving portion 1105, and temporarily stores the purchaser identifying information in the user identifying information storage portion 1107.

(Step S310) The recommended product or service acquiring portion 1110 and the like perform recommendation processing. The recommendation processing will be described in detail with reference to the flowcharts in FIGS. 4 and 5.

(Step S311) The trend leader output portion 1112 performs trend leader processing. The trend leader processing is, for example, processing of outputting information to the effect that a purchaser identified with the purchaser identifying information that has been acquired by the trend leader detecting portion 1109 is the trend leader. Also, the trend leader processing is processing in which the points corresponding to the purchaser identifying information that has been acquired by the trend leader detecting portion 1109 are incremented by 1. Also, the trend leader processing is, for example, processing in which from the purchaser identifying information for identifying the trend leader, an attribute value (such as the name, the photograph, etc.) of the trend leader is added to information of a recommendation target. In this case, the purchaser identifying information and the attribute value of the trend leader are managed in association with each other.

(Step S312) The recommended product or service transmitting portion 1111 constitutes information that is to be transmitted, using the product or service identifying information (the identifying information of the recommended product or service) that has been acquired in step S310.

(Step S313) The recommended product or service transmitting portion 1111 transmits the information that has been constituted in step S312, to the information output apparatus 12. The procedure returns to step S301.

Figure 3:
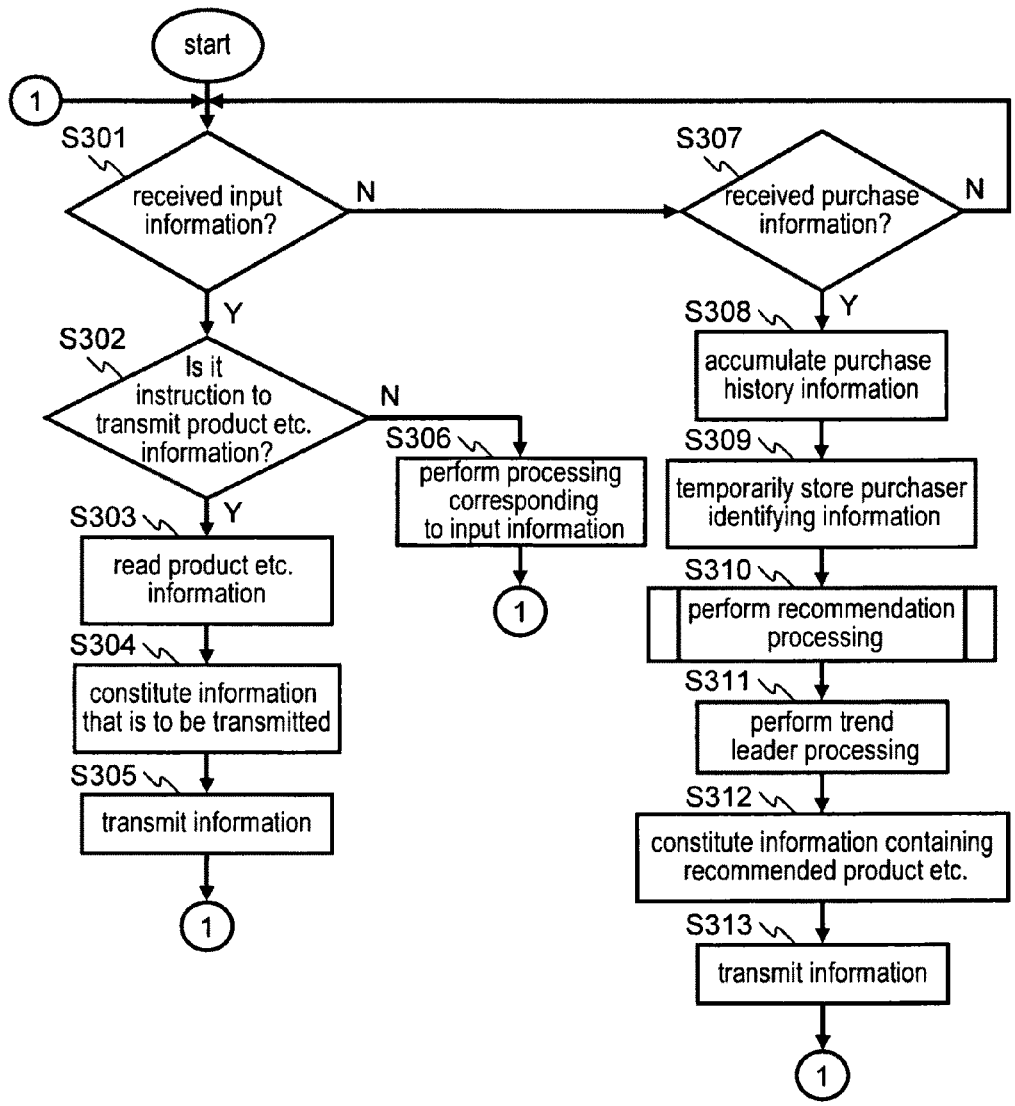
FIG. 3 is a flowchart illustrating the operation of a server apparatus in the information processing system.

Herein, in the flowchart in FIG. 3, if the user of the information output apparatus 12 inputs information for purchasing the product or service, with respect to the recommended product or service information, then the recommended product or service information may be recursively transmitted to the information output apparatus 12, or the recommendation may be performed only once.

Furthermore, in the flowchart in FIG. 3, the processing of the trend leader output portion 1112 may be performed last.

Note that the processing is ended by powering off or interruption for aborting the processing in the flowchart in FIG. 3.

Next, the recommendation processing in step S310 will be described with reference to the flowcharts in FIGS. 4 and 5.

(Step S401) The recommended product or service acquiring portion 1110 reads the purchaser identifying information that has been stored in the user identifying information storage portion 1107 in step S309, from the user identifying information storage portion 1107, and arranges the information on the memory. Herein, if the user identifying information storage portion 1107 is the memory, this processing is not necessary.

(Step S402) The trendy product or service selecting portion 1108 reads the trendy product or service condition information, which indicates a condition for judging whether or not a product or service is a trendy product or service, and arranges the information on the memory.

(Step S403) The trendy product or service selecting portion 1108 substitutes 1 for the counter i.

(Step S404) The trendy product or service selecting portion 1108 judges whether or not the $i^{th}$ product or service identifying information is present in the purchase history information in the purchase history information storage portion 1104. Herein, it is preferable that one or more pieces of purchase history information in the purchase history information storage portion 1104 have been sorted using the product or service identifying information as a key. If the $i^{th}$ product or service identifying information is present, the procedure proceeds to step S405. If the $i^{th}$ product or service identifying information is not present, the procedure proceeds to step S410.

(Step S405) The trendy product or service selecting portion 1108 reads all the purchase history information containing the $i^{th}$ product or service identifying information, from the purchase history information storage portion 1104, and arranges the information on the memory.

(Step S406) The trendy product or service selecting portion 1108 judges whether or not the $i^{th}$ product or service identifying information matches the condition indicated by the trendy product or service condition information that has been read in step S402, based on all the purchase history information containing the $i^{th}$ product or service identifying information that has been read in step S405. If the trendy product or service condition information is "sales figure ≥1000", the trendy product or service selecting portion 1108 judges whether or not the $i^{th}$ product or service identifying information matches the condition indicated by the trendy product or service condition information, based on whether or not 1000 or more pieces of purchase history information containing the $i^{th}$ product or service identifying information are present. Then, the trendy product or service selecting portion 1108 temporarily stores the judgment results on the memory.

(Step S407) If the judgment results in step S406 indicate that the $i^{th}$ product or service identifying information matches the condition, the procedure of the trendy product or service selecting portion 1108 proceeds to step S408. If the judgment results indicate that the $i^{th}$ product or service identifying information does not match the condition, the procedure proceeds to step S409.

(Step S408) The trendy product or service selecting portion 1108 additionally writes the $i^{th}$ product or service identifying information on the memory. The $i^{th}$ product or service identifying information is trendy product or service identifying information.

(Step S409) The trendy product or service selecting portion 1108 increments the counter i by 1. The procedure returns to step S404.

(Step S410) The trend leader detecting portion 1109 substitutes 1 for a counter j.

(Step S411) The trend leader detecting portion 1109 judges whether or not the $j^{th}$ product or service identifying information is present in the product or service identifying information that has been additionally written in step S408. If the $j^{th}$ product or service identifying information is present, the procedure proceeds to step S412. If the $j^{th}$ product or service identifying information is not present, the procedure proceeds to step S414.

(Step S412) The trend leader detecting portion 1109 acquires the purchaser identifying information of a purchaser who purchased the trendy product or service identified with the $j^{th}$ product or service identifying information at the earliest stage, from the purchase history information that has been read in step S405, and arranges the information on the memory. The trend leader detecting portion 1109, for example, sorts the purchase history information that has been read in step S405, using the purchase time information as a key, in ascending order (the older time indicated by the purchase time information is higher in order), acquires the purchaser identifying information in the purchase history information of the highest order, and arranges the information on the memory. Herein, the thus acquired purchaser identifying information is information for identifying the trend leader. Herein, the purchaser identifying information that has been thus arranged on the memory is also referred to as trend leader identifying information.

(Step S413) The trend leader detecting portion 1109 increments the counter j by 1.

(Step S414) The recommended product or service acquiring portion 1110 performs processing of determining a recommended product or service The recommended product or service determination processing will be described in detail with reference to the flowchart in FIG. 5.

Figure 4:
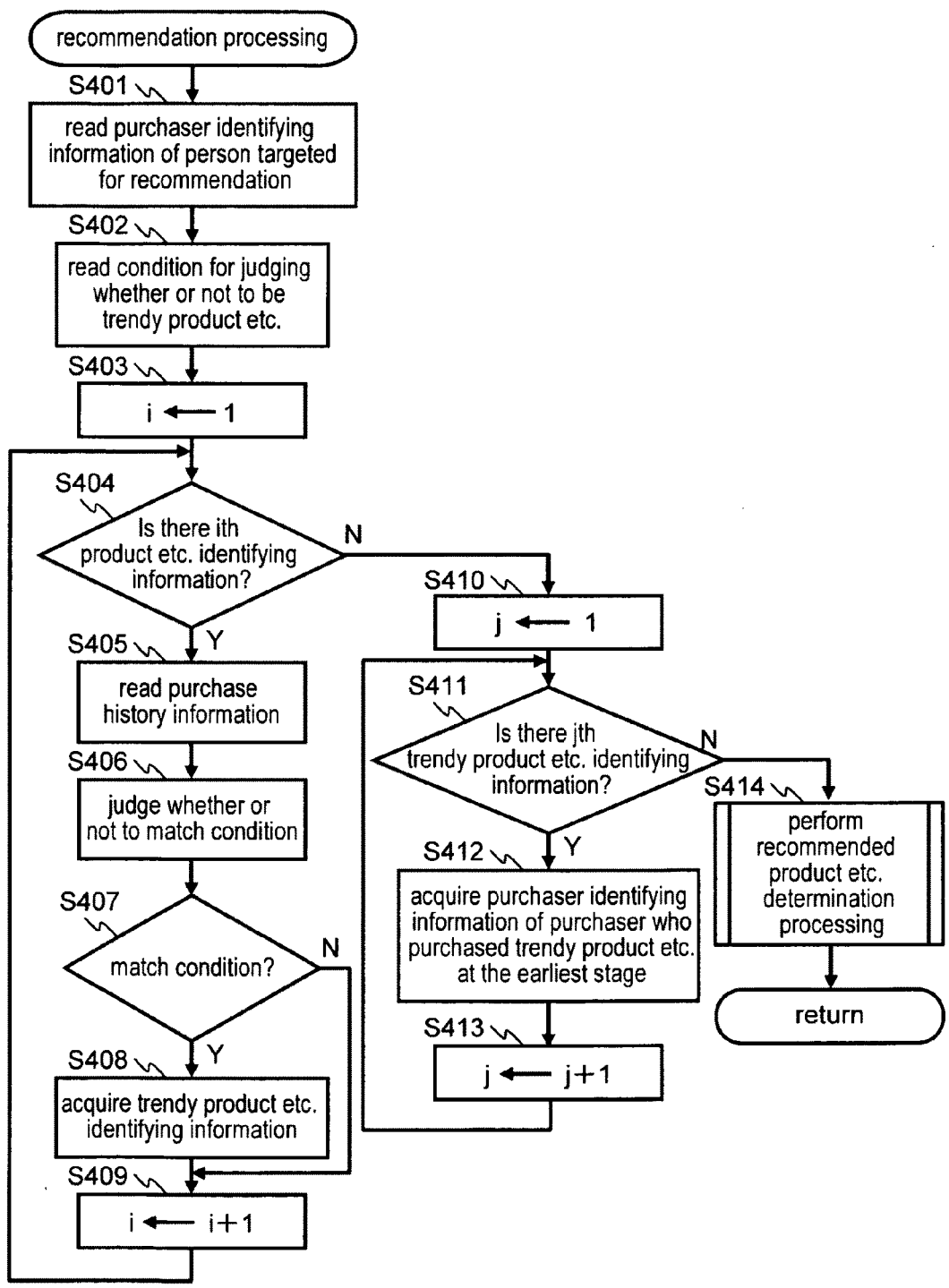
FIG. 4 is a flowchart illustrating the operation in recommendation processing in the information processing system.

Herein, in step S412 in the flowchart in FIG. 4, the information for identifying the trend leader was acquired by one algorithm. However, as the algorithm for acquiring the information for identifying the trend leader, other algorithms also may be used. That it to say, for example, the product or service identifying information of one product or service having the largest sales figure or selling for the longest time among the trendy products etc. may be determined from the purchase history information, a purchaser who purchased the product or service in this one piece of product or service identifying information at the earliest stage may be taken as the trend leader, and the purchaser identifying information of the purchaser may be acquired.

Furthermore, a person identified with the purchaser identifying information acquired for the largest number of times in step S412 may be taken as the trend leader, and the purchaser identifying information of the trend leader may be acquired. Furthermore, as described in Embodiment 2, purchasers may be divided into groups, and the trend leader may be selected in the group. In addition to the above, there are various methods for determining the trend leader.

Next, the recommended product or service determination processing in step S414 will be described in detail with reference to the flowchart in FIG. 5.

(Step S501) The recommended product or service acquiring portion 1110 substitutes 1 for the counter i.

(Step S502) The recommended product or service acquiring portion 1110 judges whether or not the purchaser identifying information indicating the $i^{th}$ trend leader is present. If the purchaser identifying information indicating the $i^{th}$ trend leader is present, the procedure proceeds to step S503. If the purchaser identifying information indicating the $i^{th}$ trend leader is not present, the procedure returns to the upper processing.

(Step S503) The recommended product or service acquiring portion 1110 acquires all the product or service identifying information of the products etc. that have been purchased by the $i^{th}$ trend leader, and arranges the information on the memory.

(Step S504) The recommended product or service acquiring portion 1110 acquires the identifying information of a product or service that has not been purchased by a person targeted for recommendation and that is best selling, from the product or service identifying information that has been acquired in step S503, and arranges the information on the memory. More specifically, the recommended product or service acquiring portion 1110 reads the purchase history information containing the purchaser identifying information for identifying the person targeted for recommendation, from the purchase history information storage portion 1104. Then, the recommended product or service acquiring portion 1110 selects the product or service identifying information that is not contained in the purchase history information and that has been acquired in step S503, and arranges the information on the memory. Then, the recommended product or service acquiring portion 1110 acquires the product or service identifying information of the best-selling product or service among the products etc. specified with the selected product or service identifying information (that is, acquires the product or service identifying information corresponding to the purchase history information having the largest number of records).

(Step S505) The recommended product or service acquiring portion 1110 increments the counter i by 1. The procedure returns to step S502.

Figure 5:
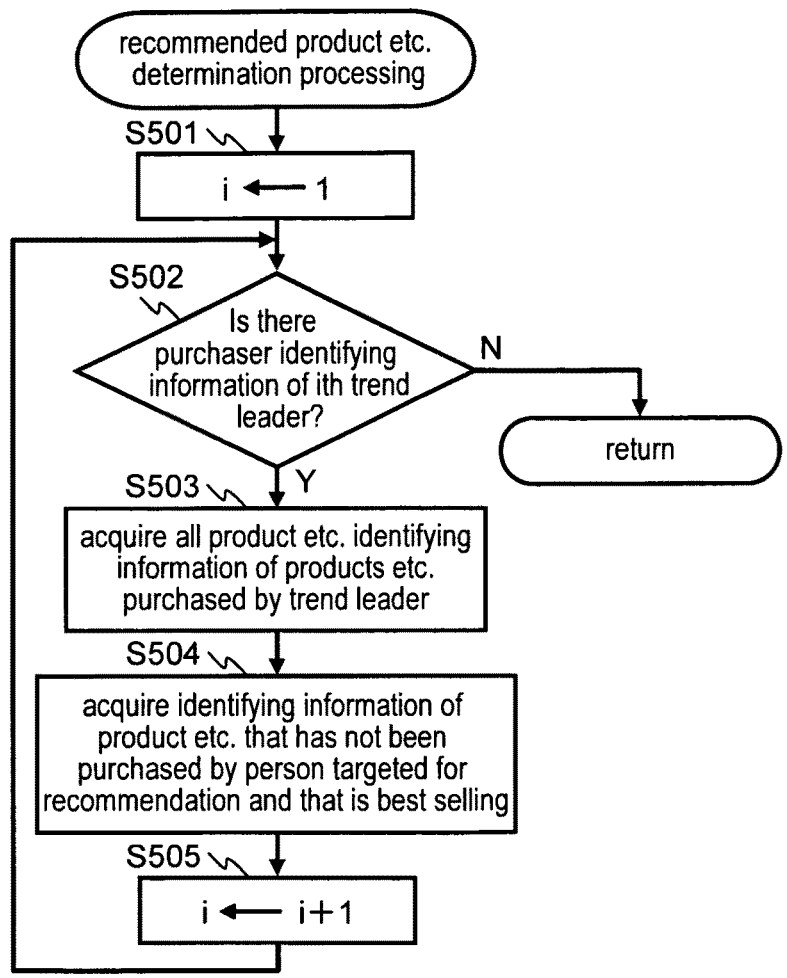
FIG. 5 is a flowchart illustrating the operation in the recommendation processing.

Herein, in the flowchart in FIG. 5, as the algorithm for selecting the recommended product or service, other algorithms also may be used. That it to say, in step S504, the recommended product or service acquiring portion 1110 selected the identifying information of a product or service that has not been purchased by the person targeted for recommendation, but the identifying information may be selected regardless of whether the product or service has been or has not been purchased. In this case, the effect of the recommendation is reduced, but the processing is performed at higher speed. Furthermore, in step S504, the identifying information of the best-selling product or service was acquired, but, for example, the identifying information of the top three selling products etc. may be acquired. Also, the recommended product or service acquiring portion 1110 may select the identifying information of the product or service most recently purchased by the trend leader. In addition to the above, various algorithms for selecting the recommended product or service are conceivable.

Next, the operation of the information output apparatus 12 will be described in detail with reference to the flowchart in FIG. 6.

(Step S601) The input accepting portion 1201 judges whether or not the input has been accepted from the user of the information output apparatus 12. If the input has been accepted, the procedure proceeds to step S602. If the input has not been accepted, the procedure proceeds to step S606.

(Step S602) The input information transmitting portion 1202 judges whether or not the input that has been accepted in step S601 is an instruction to transmit the input information. If the input is an instruction to transmit the input information, the procedure proceeds to step S603. If the input is not an instruction to transmit the input information, the procedure proceeds to step S605.

(Step S603) The input information transmitting portion 1202 constitutes input information, from the input that has been accepted in step S601.

(Step S604) The input information transmitting portion 1202 transmits the input information that has been constituted in step S603, to the server apparatus 11. Herein, information for communicating with the server apparatus 11 (such as URI, URL, IP address, telephone number, etc.) is accepted in step S601. The procedure returns to step S601.

(Step S605) An unshown unit performs processing corresponding to the input that has been accepted in step S601.

(Step S606) The product or service information receiving portion 1203 judges whether or not the product or service information has been received from the server apparatus 11. If the product or service information has been received, the procedure proceeds to step S607. If the product or service information has not been received, the procedure proceeds to step S609.

(Step S607) The output portion 1205 constitutes a screen that is to be output, from the received information (such as information of a website containing the product or service information). The output portion 1205 interprets, for example, the website containing the product or service information (for example, described in HTML), and constitutes the screen. This technique is a so-called web browser technique, and is well known.

(Step S608) The output portion 1205 outputs the screen that has been constituted in step S607.

(Step S609) The recommended product or service receiving portion 1204 judges whether or not, for example, the product or service identifying information indicating the recommended product or service has been received. If the information has been received, the procedure proceeds to step S607. If the information has not been received, the procedure returns to step S601.

Figure 6:
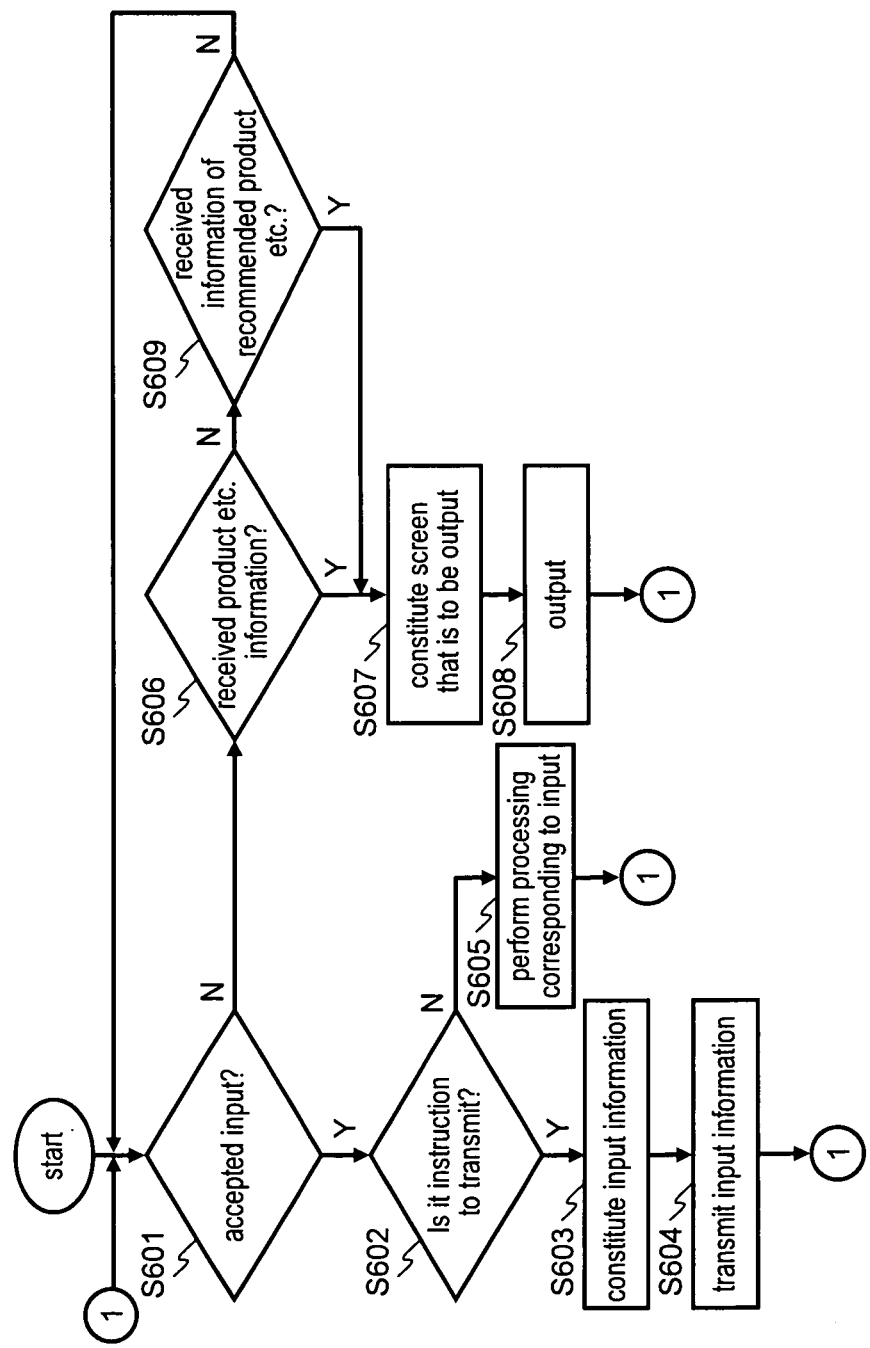
FIG. 6 is a flowchart illustrating the operation of an information output apparatus in the information processing system.

Herein, in the flowchart in FIG. 6, the product or service information receiving portion 1203 and the recommended product or service receiving portion 1204 may receive the information of the recommended product or service and the information of ordinary products etc. in one file. In this case, for example, a page in which the information of the recommended product or service is at a predetermined position such as an upper portion of the page is displayed on the information output apparatus 12.

Note that the processing is ended by powering off or interruption for aborting the processing in the flowchart in FIG. 6.

Hereinafter, a specific operation of the information processing system in this embodiment will be described. FIG. 1 is a conceptual diagram of the information processing system.

It is herein assumed that a product or service information management table shown in FIG. 7 is stored in the product or service information storage portion 1101. The product or service information management table is a table in which one or more pieces of product or service information, which is information of a product or service for an electronic commercial transaction, are stored. The product or service information management table has "ID", "product or service identifying information", and "product attribute". Herein, "ID" is information for identifying records in the table, and is for managing the table. Furthermore, "product or service identifying information" is information for identifying products etc., and refers to product IDs in this example. Note that "product or service identifying information" may be, for example, a product name, or may be information containing a product attribute described later. In "product attribute", one or more attribute values of a product or service are stored. The attribute value is "product name", "product category", or "size", for example. Herein, "product category" refers to a product type.

Furthermore, in the purchase history information storage portion 1104, a purchase history information management table shown in FIG. 8 is stored. In the purchase history information management table, the purchase history information, which is information indicating information of the purchase history of a previously purchased product or service, is stored. In the purchase history information management table, one or more records having "ID" and "purchase history information" are stored. Herein, "purchase history information" has "purchaser identifying information", "product or service identifying information", "the number of products", and "purchase time information".

In this case, it is assumed that the user of the information output apparatus 12 inputs the URL "http://Dcompany-E-shopping.com/" of a site for an electronic commercial transaction administered by D company, and inputs a command to call the website of this site. Then, the information output apparatus 12 accesses the server apparatus 11 specified with "http://Dcompany-E-shopping.com/", receives a page for an electronic commercial transaction (such as an HTML file) from the server apparatus 11, interprets the page (for example, interprets with an HTML parser), and displays the screen for an electronic commercial transaction shown in FIG. 9. The method for inputting the command and the processing from the acceptance of the command to the displaying of the screen are well known (for example, a so-called web browser technique), and thus a detailed description thereof has been omitted.

Next, it is assumed that the user of the information output apparatus 12 inputs purchaser identifying information "12345678" (this information is the ID provided for the user), checks "J1-XX" for "35000 yen", inputs necessary information such as the number of products "1" and the size "M", and then presses the button "add to shopping cart", and thus settlement processing has been performed.

Accordingly, the input accepting portion 1201 accepts the purchase information "12345678, J-001, 1, M". Herein, "12345678" is the purchaser identifying information, "J-001" is the product or service identifying information, and both of them are information that has been received by the product or service information receiving portion 1203 from the server apparatus 11. Furthermore, "1" is the number of products that are to be purchased, and "M" is the size.

Next, the input information transmitting portion 1202 transmits the purchase information "12345678, J-001, 1, M", to the server apparatus 11.

Next, the purchase information receiving portion 1105 of the server apparatus 11 receives the purchase information "12345678, J-001, 1, M". Then, the purchase history information accumulating portion 1106 acquires the current time "2006 Nov. 5 15:40" from its clock. Then, the purchase history information accumulating portion 1106 constitutes purchase history information "12345678, J-001, 1, 2006 Nov. 5 15:40, M". Then, the purchase history information accumulating portion 1106 additionally writes the constituted purchase history information "12345678, J-001, 1, 2006 Nov. 5 15:40, M" in the purchase history information management table, and thus the purchase history information management table shown in FIG. 10 is obtained. Herein, "ID" in the purchase history information management table is automatically incremented and provided.

Next, the purchase history information accumulating portion 1106 temporarily stores the purchaser identifying information "12345678" in the user identifying information storage portion 1107.

Next, the recommended product or service acquiring portion 1110 recommends a product or service for the purchaser identified with the purchaser identifying information "12345678", in the following manner. That is to say, the recommended product or service acquiring portion 1110 reads the purchaser identifying information "12345678" that has been stored in the user identifying information storage portion 1107, and arranges the information on the memory.

Next, the trendy product or service selecting portion 1108 reads the trendy product or service condition information (herein, a conditional expression "sales figure ≥500" indicating a sales figure of 500 or more), which indicates a condition for judging whether or not a product or service is a trendy product or service, and arranges the information on the memory. Then, the trendy product or service selecting portion 1108 confirms whether or not a product or service that satisfies "sales figure ≥500" is present in the purchase history information in the purchase history information storage portion 1104. More specifically, the trendy product or service selecting portion 1108 sorts the purchase history information management table in FIG. 8, using the product or service identifying information as a key, and acquires the product or service identifying information contained in records in which the number of the records containing the same product or service identifying information is 500 or more. It is herein assumed that the trendy product or service selecting portion 1108 acquires product or service identifying information "Z-001" and "S-001", and temporarily stores the information on the memory. The processing of selecting the product or service identifying information can be performed as well known search processing in database.

Next, the trend leader detecting portion 1109 reads a record in which the purchase time information indicates the earliest stage (herein, the record with "ID=1"), among all the purchase history information containing the product or service identifying information "Z-001". Then, the trend leader detecting portion 1109 acquires the purchaser identifying information "090-1111-2234" indicating the trend leader, and arranges the information on the memory.

Next, the trend leader detecting portion 1109 reads a record in which the purchase time information indicates the earliest stage (herein, the record with "ID=526"), among all the purchase history information containing the product or service identifying information "S-001". Then, the trend leader detecting portion 1109 acquires the purchaser identifying information "123.202.158.2" indicating the trend leader, and arranges the information on the memory.

In the above-described processing, the trend leader detecting portion 1109 has determined two trend leaders identified with the purchaser identifying information "090-1111-2234" and the purchaser identifying information "123.202.158.2".

Next, the recommended product or service acquiring portion 1110 determines a recommended product or service, following the processing below. That is to say, the recommended product or service acquiring portion 1110 reads all the product or service identifying information of the products etc. that have been purchased by the first trend leader identified with the purchaser identifying information "090-1111-2234", from the purchase history information management table in FIG. 10, and arranges the information on the memory. It is herein assumed that the recommended product or service acquiring portion 1110 acquires product or service identifying information (S-002, F-001), and arranges the information on the memory. Then, the recommended product or service acquiring portion 1110 judges whether or not the person targeted for recommendation identified with "12345678" has not purchased the two products etc. identified with the product or service identifying information (S-002, F-001). More specifically, the recommended product or service acquiring portion 1110 judges whether or not a record containing the purchaser identifying information "12345678" and the product or service identifying information "S-002" is present in the purchase history information management table in FIG. 10. It is herein assumed that this record is not present in the purchase history information management table in FIG. 10. Furthermore, the recommended product or service acquiring portion 1110 judges whether or not a record containing the purchaser identifying information "12345678" and the product or service identifying information "F-001" is present in the purchase history information management table in FIG. 10. It is herein assumed that this record is not present in the purchase history information management table in FIG. 10.

Next, the recommended product or service acquiring portion 1110 acquires the product or service identifying information of the best-selling product or service, among the products etc. specified with the selected product or service identifying information (S-002, F-001). More specifically, the recommended product or service acquiring portion 1110 acquires the number of the records containing the product or service identifying information "S-002" and the number of the records containing the product or service identifying information "F-001", from the purchase history information management table in FIG. 10. It is herein assumed that the number of the records containing the product or service identifying information "S-002" is "361", and the number of the records containing the product or service identifying information "F-001" is "121". Then, the recommended product or service acquiring portion 1110 determines the product or service identifying information "S-002" for a recommended product or service.

Next, all the product or service identifying information of the products etc. that have been purchased by the second trend leader identified with the purchaser identifying information "123.202.158.2" is read from the purchase history information management table in FIG. 10, and arranged on the memory. It is assumed herein that the recommended product or service acquiring portion 1110 acquires the product or service identifying information (Z-001, S-001, J-001), and arranges the information on the memory. Then, the recommended product or service acquiring portion 1110 judges whether or not the person targeted for recommendation identified with "12345678" has not purchased the three products etc. identified with the product or service identifying information (Z-001, S-005, J-001). Herein, the person targeted for recommendation identified with "12345678" has already purchased the product or service identified with the product or service identifying information "J-001", and thus this product or service is excluded from recommended products etc.

Next, the recommended product or service acquiring portion 1110 acquires the product or service identifying information "Z-001" of the best-selling product or service, among the products etc. identified with the product or service identifying information "Z-001", "S-005". The product or service identified with the product or service identifying information "Z-001" is also the recommended product or service It is herein assumed that, for example, the number of pieces of the purchase history information having the product or service identifying information "Z-001" is 289, and the number of pieces of the purchase history information having the product or service identifying information "S-005" is 123.

Next, the recommended product or service transmitting portion 1111 constitutes information that is to be transmitted, from the acquired product or service identifying information "S-002" and "Z-001" for recommendation. More specifically, for example, the recommended product or service transmitting portion 1111 searches for attribute values (the price, the image, etc.) of the products etc. from the product or service information management table in FIG. 7, using the product or service identifying information "S-002" and "Z-001" as a key, and constitutes information (an HTML file) of a page that is to be displayed. Then, the recommended product or service transmitting portion 1111 transmits the constituted information, to the information output apparatus 12. Herein, the technique for constituting such a page is well known, and thus a detailed description thereof has been omitted.

Figure 11:
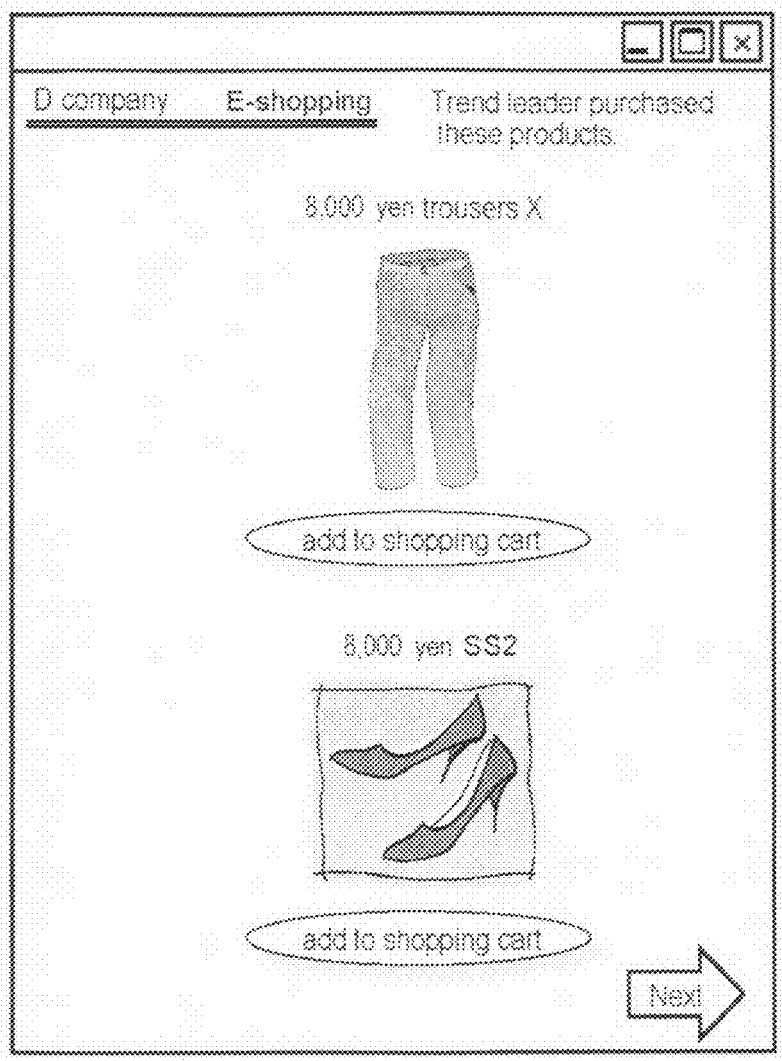
FIG. 11 is a view showing an example of the constituted screen.

Next, the recommended product or service receiving portion 1204 receives the product or service identifying information "S-002" and "Z-001" indicating the recommended products etc., attribute values (the product name, the price, the image, etc.) of these products etc., and the like from the server apparatus 11. Then, the output portion 1205 constitutes a screen that is to be output, from the received information (such as information of a website containing the product or service information). The output portion 1205 outputs the constituted screen, for example, as in FIG. 11.

Furthermore, the trend leader output portion 1112 provides the purchasers (people identified with the purchaser identifying information "090-1111-2234" and the purchaser identifying information "123.202.158.2") selected as the trend leaders with points for providing some remuneration, and accumulates the points in an unshown storage unit such that the points are paired with the purchaser identifying information for identifying the trend leader. FIG. 12 is a point management table for managing such points. The point management table has attributes "ID", "purchaser identifying information", and "point".

It is preferable that the trend leader is notified of the points, for example, with transmission to the information output apparatus 12 of the trend leader, and benefits (discount etc.) are provided in subsequent purchase of a product or service by the number of the points. Alternatively, the trend leader output portion 1112 may provide a purchaser selected as the trend leader with points for providing some remuneration, the points may be accumulated so as to be paired with the purchaser identifying information for identifying the trend leader, in an unshown storage unit, the purchaser may be ranked according to the number of the points, and information of the ranking may be output.

As described above, according to this embodiment, the purchasing behavior of purchasers is considered, a trend leader who is creating a trend is determined, and recommendation of a product or service is provided based on the behavior in which the trend leader purchases a product or service More specifically, according to this embodiment, a trend leader who purchased a trendy item at an early stage can be detected, and a product purchased by the trend leader can be recommended. Thus, the user may come across unexpected nice products etc.

Furthermore, according to this embodiment, regarding the recommended product, typically, a product or service that has not been purchased by a person targeted for recommendation is recommended. Thus, the precision of the recommendation is improved.

Herein, in this embodiment, a recommended product may be a product or service relating to a product or service that has purchased by a person targeted for recommendation. The same is applied to other embodiments. Herein, the product or service relating to the product or service is a product or service having the same or similar attributes of the product or service More specifically, for example, in this information processing system, if a person targeted for recommendation has purchased trousers, then a jacket that is to be combined with the trousers is recommended. At that time, for example, a product type "trousers" and a product type "jacket" are associated with each other. More specifically, in the recommended product or service acquiring portion 1110, a related product or service management table shown in FIG. 13 is held. In the related product or service management table, one or more records having attributes "ID", "product category 1", and "product category 2" are stored. In this embodiment, it is preferable that if a product in a product category identified with the attribute value of "product category 1" or "product category 2" has been purchased, only products in the product category identified with the attribute value of "product category 1" or "product category 2" are recommended. More specifically, as described above, if the user of the information output apparatus 12 has purchased a "jacket" identified with "J1-XX" for "35000 yen", "trousers" paired with the "jacket" are selected from the related product or service management table, and arranged on the memory.

Next, the recommended product or service acquiring portion 1110 acquires the product or service identifying information for identifying products etc. that are "trousers" and that have been purchased by one or more purchasers identified with the one or more pieces of purchaser identifying information that have been acquired by the trend leader detecting portion 1109. The recommended product or service acquiring portion 1110 acquires only the product or service identifying information "Z-001".

Herein, the trendy product or service selecting portion 1108 may determine the trendy product or service only from products in the product category of "trousers" searched for from the related product or service management table, and the trend leader detecting portion 1109 may determine the trend leader using the product or service identifying information identified with the trendy product or service Furthermore, according to this embodiment, the server apparatus 11 included the product or service information storage portion 1101, and transmitted information for an electronic commercial transaction to the information output apparatus 12. However, as the apparatus for transmitting information for an electronic commercial transaction to the information output apparatus 12, other unshown apparatuses also may be used. The same is applied to other embodiments. In this case, the server apparatus 11 is an apparatus provided with: a purchase history information storage portion in which at least two pieces of purchase history information of at least two purchasers are stored, the purchase history information being information indicating purchase history of a product or service that is a product or service, and having purchaser identifying information for identifying a purchaser, product or service identifying information for identifying a product or service, and purchase time information indicating a purchase time of a product or service; a trendy product or service selecting portion that reads the at least two pieces of purchase history information, selects at least one piece of product or service identifying information for identifying a trendy product or service, which is a product or service purchased at a predetermined or higher degree of a trend, and stores the product or service identifying information in a storage medium; a trend leader detecting portion that acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium; a recommended product or service acquiring portion that acquires at least one piece of product or service identifying information for identifying a product or service purchased by at least one purchaser identified with the at least one piece of purchaser identifying information that has been acquired by the trend leader detecting portion, and stores the product or service identifying information in a storage medium; and a recommended product or service transmitting portion that transmits the at least one piece of product or service identifying information that has been acquired by the recommended product or service acquiring portion, to an information output apparatus.

Furthermore, according to this embodiment, the recommended product or service was limited to a product or service that has not been purchased by a user. However, the recommended product or service may be determined without judging whether or not the product or service has not been purchased by a user. The same is applied to other embodiments.

Furthermore, according to this embodiment, specific examples of the recommended product or service and the product or service for an electronic commercial transaction were clothing and the like. However, it would be appreciated that the products etc. are not limited to clothing and the like. The products etc. may be tangibles such as furniture, books, or electronic equipment, may be contents, movies, or music, or may be intangibles such as rights. The same is applied to other embodiments.

The processing in this embodiment may be implemented by software. The software may be distributed by software downloading or the like. The software may be distributed in the form where the software is stored in a storage medium such as a CD-ROM. Note that the same is applied to the other embodiments described in this specification. The software that implements the information processing apparatus in this embodiment may be a following program. Specifically, this program is a program for causing a computer to function as: a trendy product or service selecting portion that reads, at least two pieces of purchase history information having purchaser identifying information, product or service identifying information, and purchase time information, from a storage medium, selects at least one piece of product or service identifying information for identifying a trendy product or service, which is a product or service purchased at a predetermined or higher degree of a trend, and stores the product or service identifying information in a storage medium; a trend leader detecting portion that acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium; a recommended product or service acquiring portion that acquires at least one piece of product or service identifying information for identifying a product or service purchased by at least one purchaser identified with the at least one piece of purchaser identifying information that has been acquired by the trend leader detecting portion, and stores the product or service identifying information in a storage medium; and a recommended product or service transmitting portion that transmits the at least one piece of product or service identifying information that has been acquired by the recommended product or service acquiring portion, to an information output apparatus.

Furthermore, in the above-described program, it is preferable that the recommended product or service acquiring portion reads the purchaser identifying information of the purchaser, thereby acquiring at least one piece of product or service identifying information for identifying a product or service that has not been purchased by the user identified with the purchaser identifying information, among product or service identifying information for identifying a product or service that has been purchased by at least one purchaser identified with the at least one piece of purchaser identifying information that has been acquired by the trend leader detecting portion, and stores the product or service identifying information in a storage medium.

Furthermore, in the above-described program, it is preferable that the computer functions further as: a purchase information receiving portion that receives purchase information, which is information indicating a purchase of a product or service by a user of the information output apparatus, and which has purchaser identifying information for identifying the user and product or service identifying information for identifying the product or service, from the information output apparatus; and a purchase history information accumulating portion that constitutes purchase history information, using the purchase information that has been received by the purchase information receiving portion, and accumulates the purchase history information in the purchase history information storage portion, wherein the recommended product or service acquiring portion acquires at least one attribute value paired with the product or service identifying information contained in the purchase information that has been received by the purchase information receiving portion, and acquires product or service identifying information of a product or service having at least one attribute value having a predetermined relationship with the at least one attribute value, the product or service identifying information being for identifying a product or service purchased by at least one purchaser identified with the at least one piece of purchaser identifying information that has been acquired by the trend leader detecting portion.

Furthermore, in the above-described program, it is preferable that the computer functions further as a trend leader output portion that outputs information to the effect that a purchaser identified with the purchaser identifying information that has been acquired by the trend leader detecting portion is the trend leader.

Embodiment 2

In this embodiment, an information processing system for dividing users into groups, determining a trend leader for a group to which a person targeted for recommendation belongs, and recommending a product purchased by the trend leader will be described. Furthermore, a group is constituted by users having the same or similar preference according to, for example, behavior of the users (such as purchase history of products etc., or browsing status of websites). Also, a group may be constituted, for example, according to attributes of users (such as age, sex, or occupation).

Figure 14:
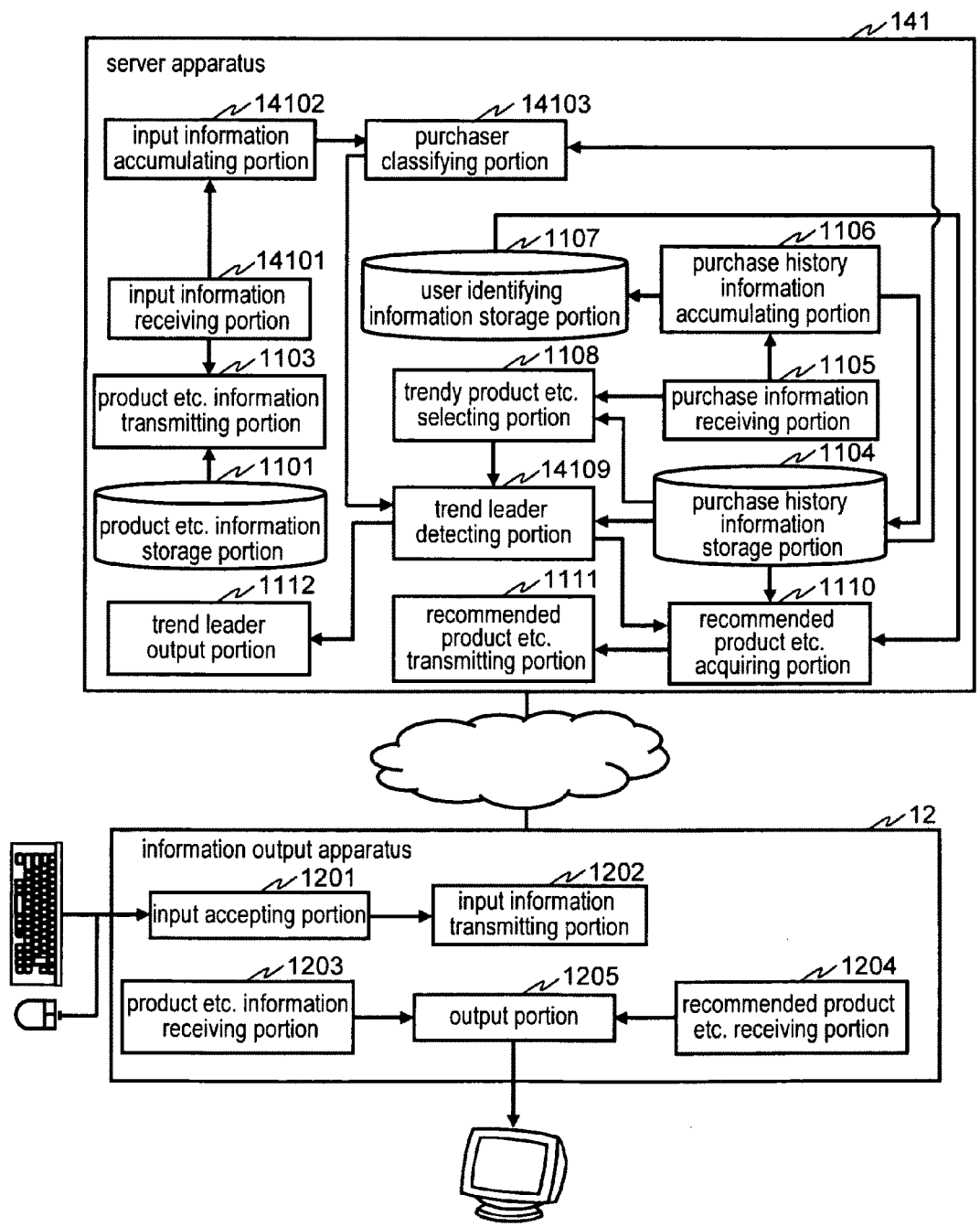
FIG. 14 is a block diagram of an information processing system in Embodiment 2.

Hereinafter, the information processing system in this embodiment will be described. FIG. 1 is a conceptual diagram of the information processing system. FIG. 14 is a block diagram of the information processing system in this embodiment. The information processing system is provided with a server apparatus and the one or more information output apparatuses 12 (12(1), 12(2), ..., 12(*n*)).

A server apparatus 141 is provided with the product or service information storage portion 1101, an input information receiving portion 14101, an input information accumulating portion 14102, the product or service information transmitting portion 1103, the purchase history information storage portion 1104, the purchase information receiving portion 1105, the purchase history information accumulating portion 1106, the user identifying information storage portion 1107, the trendy product or service selecting portion 1108, a purchaser classifying portion 14103, a trend leader detecting portion 14109, the recommended product or service acquiring portion 1110, the recommended product or service transmitting portion 1111, and the trend leader output portion 1112.

The input information receiving portion 14101 receives two or more pairs of input information and purchaser identifying information. The input information is information that has been input to the information output apparatus 12 by a purchaser. Herein, the input information receiving portion 14101 does not have to simultaneously receive the two or more pairs of input information and purchaser identifying information. The input information is, for example, profile information of a purchaser identified with the purchaser identifying information. The profile information has, for example, full name, age, sex, hobby, occupation, annual income, address, telephone number, etc. The input information may be, for example, the purchase information having the product or service identifying information for identifying a product or service The purchase information described in this example typically does not have the purchaser identifying information. Herein, is the input information receiving portion 14101 receives the purchase information, the purchase information receiving portion 1105 and the purchase history information accumulating portion 1106 are not necessary. In this case, the input information accumulating portion 14102 described later constitutes purchase history information, using the purchase information that has been received by the input information receiving portion 14101, and accumulates the purchase history information in the purchase history information storage portion 1104. The input information receiving portion 14101 can be implemented, for example, as a wireless or wired communication unit.

The input information accumulating portion 14102 accumulates the input information and the purchaser identifying information that have been received by the input information receiving portion 14101, in an unshown storage medium (preferably a non-volatile storage medium, but also may be a volatile storage medium). Furthermore, the input information accumulating portion 14102 may accumulate the purchase history information having the product or service identifying information that has been received by the input information receiving portion 14101, the purchaser identifying information, and, the purchase time information, in the purchase history information storage portion 1104. Typically, the input information accumulating portion 14102 can be implemented, for example, as an MPU or a memory. Typically, the processing procedure of the input information accumulating portion 14102 is implemented by software, and the software is stored in a storage medium such as a ROM. Note that the processing procedure also may be implemented by hardware (dedicated circuit).

The purchaser classifying portion 14103 classifies two or more purchasers identified with the purchaser identifying information. More specifically, using the two or more pieces of input information that have been accumulated by the input information accumulating portion 14102, the purchaser classifying portion 14103 classifies the purchaser identifying information paired with each piece of input information, and manages the purchaser identifying information in such a manner that a group to which each piece of purchaser identifying information belongs can be identified. The purchaser classifying portion 14103 provides, for example, a group identifier for identifying a group so as to be paired with the purchaser identifying information. If the input information is, for example, sex and age, the purchaser classifying portion 14103 classifies purchasers according to the sex and age information, and provides a corresponding group identifier to the purchaser identifying information. For example, it is assumed that "male" is taken as "0", "female" as "1", the age "19 years old or younger" as "1", "20 to 29 years old" as "2", "30 to 39 years old" as "3", "40 to 49 years old" as "4", "50 to 59 years old" as "5", and "60 years old or older" as "6". For example, a 35-year-old female is provided with the group identifier "31", and a 21-year-old male is provided with "20". In this case, in the purchaser classifying portion 14103, correspondence information between the sex/age information and the group identifier is held.

Furthermore, the purchaser classifying portion 14103 may read the input information and the purchaser identifying information that have been accumulated by the input information accumulating portion 14102, analyze preference of each purchaser using the input information and the purchaser identifying information, classify the two or more pieces of purchaser identifying information based on the preference, and manage the purchaser identifying information in such a manner that a group to which each piece of purchaser identifying information belongs can be identified. More specifically, if the input information is a URL of a browsed website or a URL of a bookmarked website, the purchaser classifying portion 14103 may provide the purchaser identifying information for identifying purchasers who have browsed the same website or bookmarked the same website, with the same group identifier. Furthermore, the purchaser classifying portion 14103 may acquire an attribute value of the browsed website or the bookmarked website, classify the two or more pieces of purchaser identifying information according to the attribute value, and manage the purchaser identifying information in such a manner that a group to which each piece of purchaser identifying information belongs can be identified. Herein, the phrase "analyze preference of each purchaser, and classify the two or more pieces of purchaser identifying information based on the preference" refers to, for example, processing in which data indicating whether or not purchasers have browsed each website in a large number of websites, or have bookmarked each website is acquired as vector data (for example, (1, 0, 1, 1, 0, 0, 0)), vector data corresponding to two or more purchasers are compared (cosine values are calculated and their difference is obtained), and purchasers having vector data with predetermined or higher similarity (with the difference within a threshold value) are taken as purchasers belonging to the same group.

Furthermore, the purchaser classifying portion 14103 may classify the two or more pieces of purchaser identifying information, using the product or service identifying information in the purchase history information, using the two or more pieces of purchase history information that have been accumulated by the input information accumulating portion 14102, and manage the purchaser identifying information in such a manner that a group to which each piece of purchaser identifying information belongs can be identified. More specifically, the purchaser classifying portion 14103 constitutes vector data (for example, (1, 0, 1, 1, 0, 1, ...)), by substituting "1" for an element corresponding to a product or service that has been purchased, and "0" for an element corresponding to a product or service that has not been purchased, among multiple products etc., with respect to each purchaser. Then, the purchaser classifying portion 14103 compares vector data corresponding to two or more purchasers (calculates cosine values and obtains their difference), and takes purchasers having vector data with predetermined or higher similarity (with the difference within a threshold value) as purchasers belonging to the same group. Also, using the two or more pieces of purchase history information that have been accumulated by the input information accumulating portion 14102, the purchaser classifying portion 14103 may read the product or service information (such as the price, the product color, the size, the shape, the material, etc.) of a product or service identified with the product or service identifying information in the purchase history information, from the product or service information storage portion 1101, analyze preference of each purchaser from the read product or service information, classify the two or more pieces of purchaser identifying information based on the preference, and manage the purchaser identifying information in such a manner that a group to which each piece of purchaser identifying information belongs can be identified. Furthermore, the purchaser classifying portion 14103 may use a classifying algorithm as described in Embodiment 4. Various algorithms are conceivable with which the purchaser classifying portion 14103 classifies the two or more pieces of purchaser identifying information. Typically, the purchaser classifying portion 14103 can be implemented, for example, as an MPU or a memory. Typically, the processing procedure of the purchaser classifying portion 14103 is implemented by software, and the software is stored in a storage medium such as a ROM. Note that the processing procedure also may be implemented by hardware (dedicated circuit).

The trend leader detecting portion 14109 acquires the purchaser identifying information (the trend leader identifying information) for identifying a purchaser who is referred to as the trend leader, and stores the information in a storage medium. More specifically, the trend leader detecting portion 14109 acquires the purchaser identifying information for identifying a purchaser who purchased the trendy product or service identified with the one or more pieces of product or service identifying information that have been selected by the trendy product or service selecting portion 1108 and who made the purchase at an early stage satisfying a predetermined time condition, from the two or more pieces of purchase history information, and stores the information in a storage medium. Moreover, the trend leader detecting portion 14109 acquires one or more pieces of purchaser identifying information for identifying a purchaser who purchased the trendy product or service identified with the one or more pieces of product or service identifying information that have been selected by the trendy product or service selecting portion 1108 and who made the purchase at an early stage satisfying a predetermined time condition, from one or more pieces of purchaser identifying information belonging to a group to which the purchaser identifying information stored in the user identifying information storage portion 1107 belongs, and stores the information in a storage medium. Typically, the trend leader detecting portion 14109 can be implemented, for example, as an MPU or a memory. Typically, the processing procedure of the trend leader detecting portion 14109 is implemented by software, and the software is stored in a storage medium such as a ROM. Note that the processing procedure also may be implemented by hardware (dedicated circuit).

Next, the operation of the information processing system will be described. First, the operation of the server apparatus 141 will be described with reference to the flowcharts in FIGS. 15 to 17. In the flowchart in FIG. 15, only steps that are different from those in the flowchart in FIG. 3 will be described.

(Step S1501) The input information accumulating portion 14102 accumulates the input information that has been received by the input information receiving portion 14101 in step S301 and the purchaser identifying information, in an unshown storage medium. Furthermore, if the input information is the purchase information, the input information accumulating portion 14102 accumulates the input information and the purchaser identifying information in the purchase history information storage portion 1104 instead of the unshown storage medium.

(Step S1502) The recommended product or service acquiring portion 1110, the trend leader detecting portion 14109, and the like perform recommendation processing. The recommendation processing will be described in detail with reference to the flowchart in FIG. 16.

Figure 15:
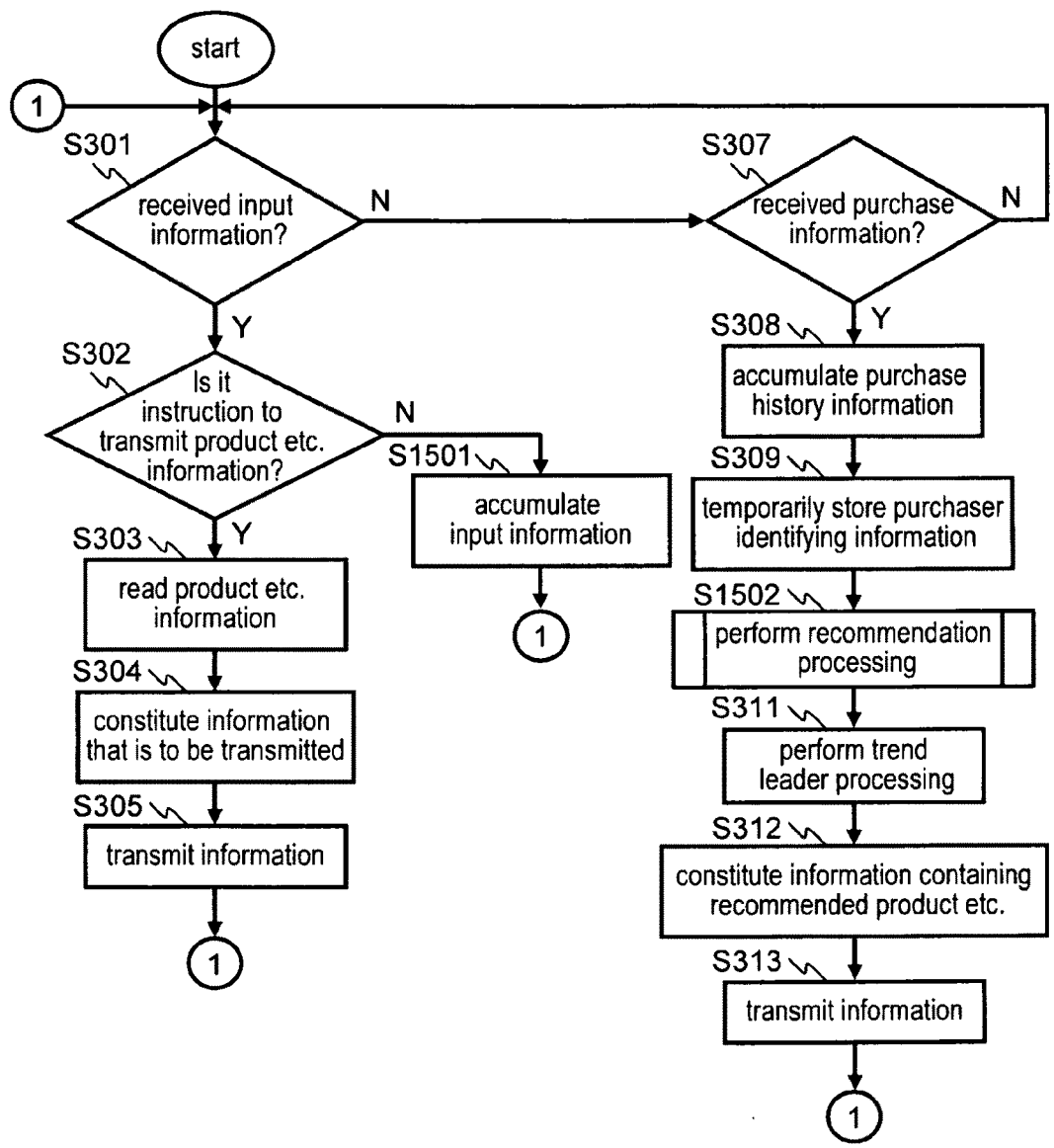
FIG. 15 is a flowchart illustrating the operation of a server apparatus in the information processing system.

Note that the processing is ended by powering off or interruption for aborting the processing in the flowchart in FIG. 15.

Figure 16:
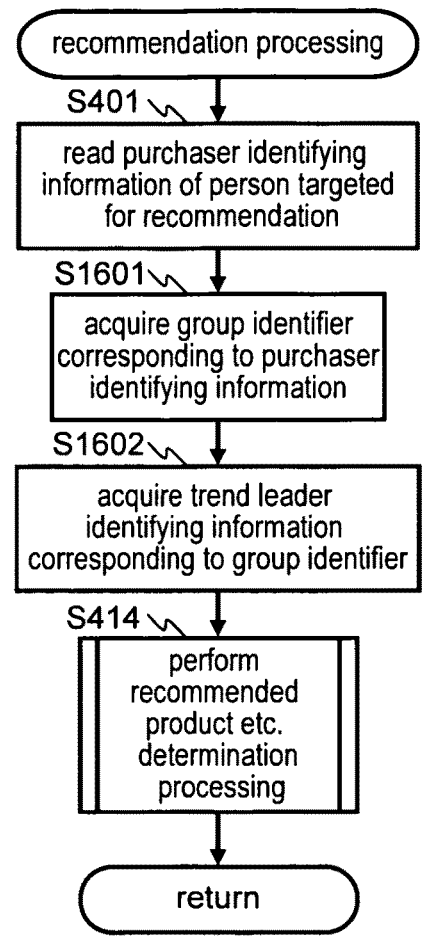
FIG. 16 is a flowchart illustrating the operation in recommendation processing in the information processing system.

Next, the recommendation processing will be described in detail with reference to the flowchart in FIG. 16. In the flowchart in FIG. 16, only steps that are different from those in the flowchart in FIG. 4 will be described.

(Step S1601) The recommended product or service acquiring portion 1110 reads a group identifier corresponding to the purchaser identifying information. It is herein assumed that the purchaser classifying portion 14103 stores the group identifier in a storage medium such that the group identifier is paired with the purchaser identifying information, using the input information that has been accumulated by the input information accumulating portion 14102 and the purchase history information. This processing of the purchaser classifying portion 14103 will be described with reference to the flowchart in FIG. 17.

(Step S1602) The recommended product or service acquiring portion 1110 acquires one or more pieces of trend leader identifying information paired with the group identifiers that have been read in step S1601, and arranges the information on the memory. It is herein assumed that the trend leader detecting portion 14109 has already stored the purchaser identifying information of a purchaser who is referred to as the trend leader according to the purchase history information in the purchase history information storage portion 1104, in the storage medium. This purchaser identifying information is referred to as the trend leader identifying information. The processing of acquiring the trend leader identifying information will be described with reference to the flowchart in FIG. 18.

Next, the processing in which the purchaser classifying portion 14103 classifies purchasers identified with the purchaser identifying information into groups will be described with reference to the flowchart in FIG. 17.

(Step S1701) The purchaser classifying portion 14103 substitutes 1 for a counter i.

(Step S1702) The purchaser classifying portion 14103 reads the $i^{th}$ purchaser identifying information, from the purchase history information storage portion 1104 or the information that has been accumulated by the input information accumulating portion 14102, and arranges the information on the memory. Herein, it is preferable that the purchaser identifying information is received in advance by the input information receiving portion 14101 of the server apparatus 141, accumulated by the input information accumulating portion 14102 in a storage medium, and held in the storage medium.

(Step S1703) The purchaser classifying portion 14103 reads all the product or service identifying information of products etc. purchased by the $i^{th}$ purchaser identified with the $i^{th}$ purchaser identifying information (also may be the product or service identifying information of products etc. purchased within a predetermined period), from the purchase history information storage portion 1104, and arranges the information on the memory. Herein, the product or service identifying information that is acquired is the product or service identifying information contained in the purchase history information having the $i^{th}$ purchaser identifying information.

(Step S1704) The purchaser classifying portion 14103 constitutes vector data of the $i^{th}$ purchaser, from all the product or service identifying information that has been acquired in step S1703. More specifically, if a purchaser α has purchased four products identified with product or service identifying information (A, B, F, G), the purchaser classifying portion 14103 constitutes vector data (1, 1, 0, 0, 0, 1, 1, 0, . . . , 0). Furthermore, if a purchaser β has purchased three products identified with product or service identifying information (C, D, G), the purchaser classifying portion 14103 constitutes vector data (0, 0, 1, 1, 0, 0, 1, 0, . . . , 0). Moreover, if the purchaser β has purchased three products identified with product or service identifying information (A, H, Z), the purchaser classifying portion 14103 constitutes vector data (1, 0, 0, 0, 0, 0, 0, 1, . . . , 1). Herein, elements constituting vector data are 26 elements A to Z, and the vector data indicates that the purchaser has purchased a product or service in which the element of the vector data corresponds to the value "1".

(Step S1705) The purchaser classifying portion 14103 determines the group identifier for identifying a group corresponding to the $i^{th}$ purchaser, from the vector data that has been constituted in step S1704, and arranges the information on the memory. The purchaser classifying portion 14103, for example, acquires a cosine value of the vector data by calculation. Then, the purchaser classifying portion 14103 refers to the group identifier management table (a table that is held in advance by the purchaser classifying portion 14103) in which the correspondence between the range of cosine values and the group identifier is managed, and reads a group identifier corresponding to the acquired cosine value, from the group identifier management table.

(Step S1706) The purchaser classifying portion 14103 accumulates the group identifier that has been read in step S1705 in a storage medium such that the group identifier is paired with the $i^{th}$ purchaser identifying information.

(Step S1707) The purchaser classifying portion 14103 increments the counter i by 1. The procedure proceeds to step S1702.

Figure 17:
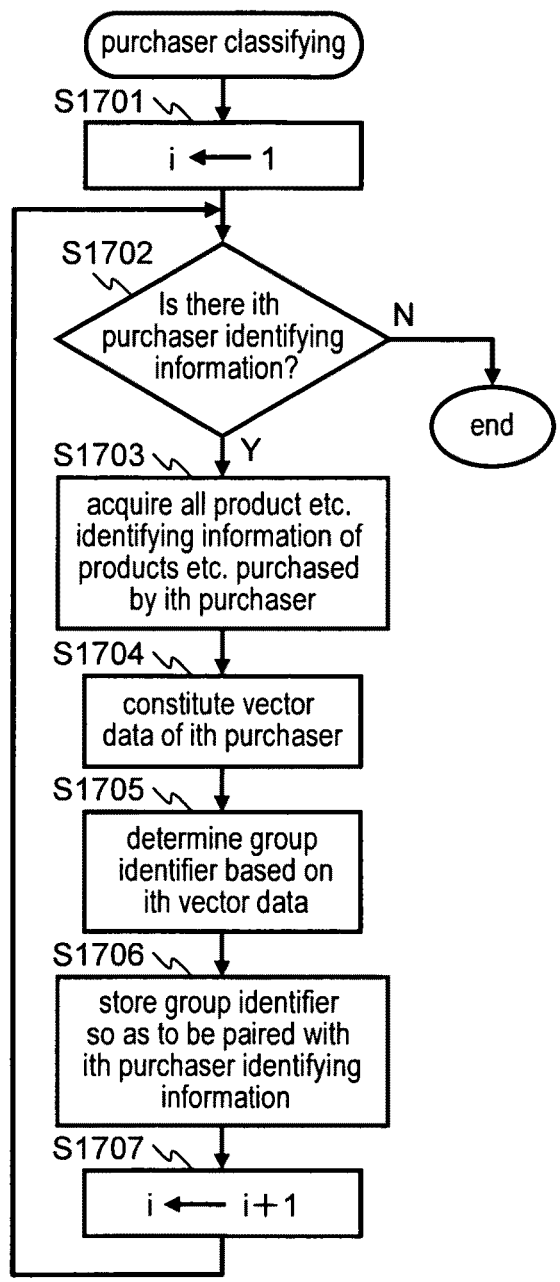
FIG. 17 is a flowchart illustrating the operation in processing of classifying purchasers in the information processing system.

Herein, in the flowchart in FIG. 17, purchasers were divided into groups using the purchase history information, but the purchasers may be divided into groups using information of websites browsed by the purchasers. More specifically, each time the purchaser browses a website, the input information receiving portion 14101 receives URL information of the website browsed by a purchaser, and the input information accumulating portion 14102 accumulates the information. Then, in step S1703, the purchaser classifying portion 14103 constitutes vector data, from information of websites that have been browsed by the $i^{th}$ purchaser and websites that have not been browsed by the $i^{th}$ purchaser. If the purchaser classifying portion 14103 determines vector data as (1, 0, 0), for example, the vector data indicates that the purchaser has browsed only page A, among pages A, B, and C. Then, the purchaser classifying portion 14103 performs similar processing in step S1705 and thereafter.

Furthermore, in the flowchart in FIG. 17, the purchasers may be divided into groups, using profile information (such as sex, age, hobby, occupation, address, or annual income) of the purchasers that has been input by the purchasers. More specifically, the input information receiving portion 14101 has received in advance the purchaser identifying information and the profile information (one of the input information), and the input information accumulating portion 14102 has accumulated the purchaser identifying information and the profile information. Then, the purchaser classifying portion 14103 determines the group identifier for identifying a group corresponding to the $i^{th}$ purchaser, from the profile information, and arranges the information on the memory. The purchaser classifying portion 14103 determines the group identifier, for example, according to sex and age. More specifically, the purchaser classifying portion 14103 refers to the group identifier management table (a table that is held in advance by the purchaser classifying portion 14103) in which the correspondence between the range of sex and age and the group identifier is managed, and reads a group identifier corresponding to the sex and age of the purchaser, from the group identifier management table. Then, the purchaser classifying portion 14103 accumulates the read group identifier in a storage medium such that the group identifier is paired with the purchaser identifying information.

Next, the processing of acquiring the trend leader identifying information will be described with reference to the flowchart in FIG. 18.

Figure 18:
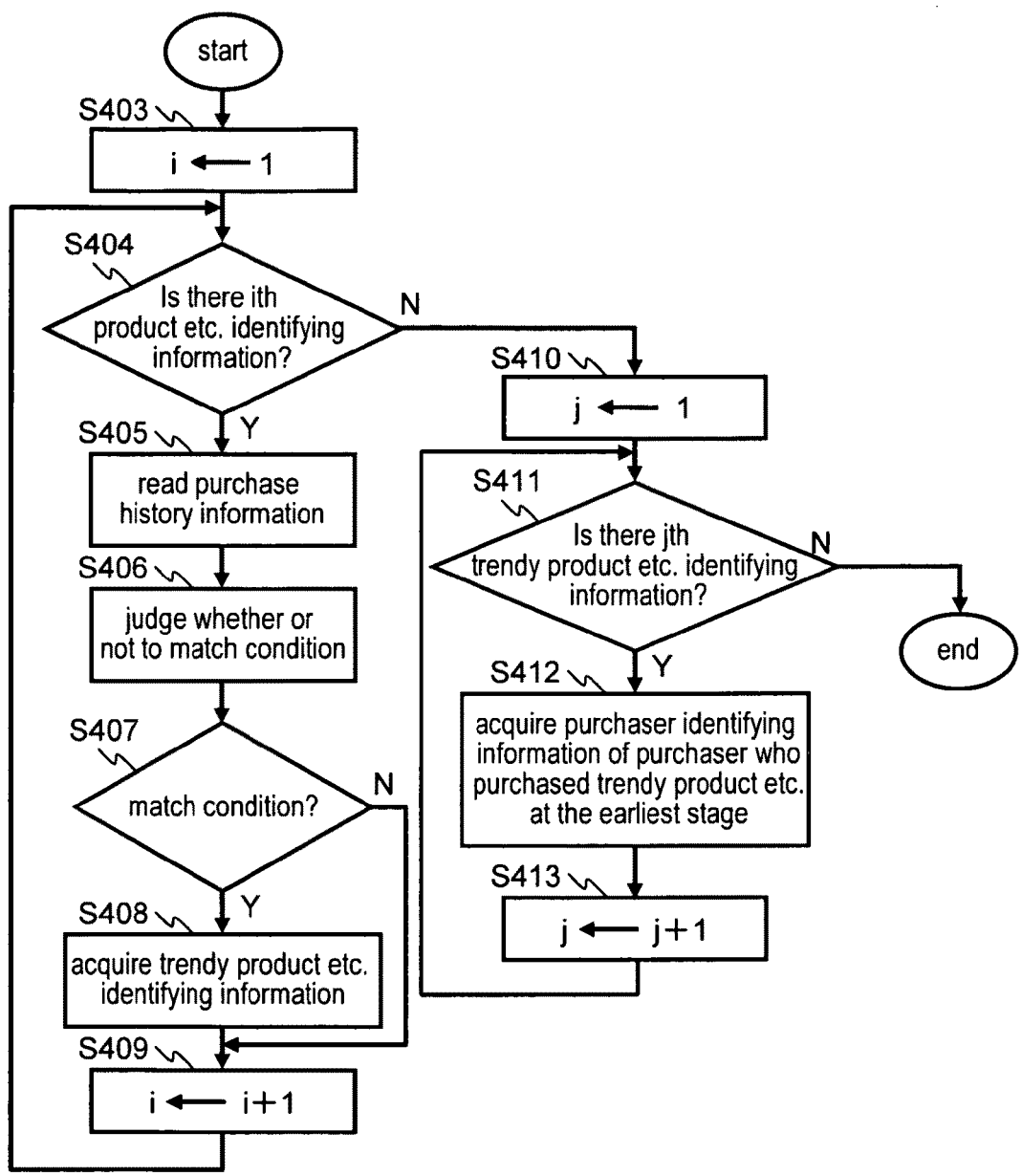
FIG. 18 is a flowchart illustrating processing of acquiring trend leader identifying information in the information processing system.

The processing of acquiring the trend leader identifying information can be implemented by the processing from step S403 to step S413, as shown in FIG. 18. The one or more pieces of purchaser identifying information that have been acquired by the trend leader detecting portion 1109 in step S412 are the trend leader identifying information. In step S412, the trend leader detecting portion 1109 may accumulate the trend leader identifying information, in a non-volatile storage medium such as a hard disk, or in a volatile storage medium such as a memory.

Hereinafter, a specific operation of the information processing system in this embodiment will be described. FIG. 1 is a conceptual diagram of the information processing system.

It is herein assumed that the product or service information management table shown in FIG. 7 is stored in the product or service information storage portion 1101. Furthermore, the purchase history information management table shown in FIG. 8 is stored in the purchase history information storage portion 1104.

FIG. 19 is an example of the group identifier management table. The group identifier management table has attributes "ID", "purchaser identifying information", and "group identifier". Herein, "ID" is information for identifying records in the table. The purchaser classifying portion 14103 constitutes the group identifier management table shown in FIG. 19, using the purchase history information shown in FIG. 8 regarding products etc. purchased by each purchaser. That is to say, the purchaser classifying portion 14103 constitutes the group identifier management table shown in FIG. 19, through the processing described with reference to the flowchart in FIG. 17.

FIG. 20 is a trend leader management table. The trend leader management table has "ID", "trend leader identifying information", and "group identifier". Regarding "trend leader identifying information" in the trend leader management table in FIG. 20, the trend leader detecting portion 14109 acquires the trend leader identifying information using the purchase history information in the purchase history information storage portion 1104, as described with reference to FIG. 18. Furthermore, the value of "group identifier" corresponding to "trend leader identifying information" is acquired from the group identifier management table in FIG. 19, using the trend leader identifying information as a key, and written. Herein, the trend leader management table in FIG. 20 does not have to include "group identifier".

In this case, it is assumed that the user of the information output apparatus 12 inputs the URL "http://Dcompany-E-shopping.com/" of a site for an electronic commercial transaction administered by D company, and inputs a command to call the website of this site. Then, the information output apparatus 12 accesses the server apparatus 141 specified with "http://Dcompany-E-shopping.com/", receives a page for an electronic commercial transaction (such as an HTML file) from the server apparatus 141, interprets the page (for example, interprets with an HTML parser), and displays the screen for an electronic commercial transaction shown in FIG. 9.

Next, it is assumed that the user of the information output apparatus 12 inputs purchaser identifying information "12345678" (this information is the ID provided for the user), checks "J1-XX" for "35000 yen", inputs necessary information such as the number of products "1" and the size "M", and then presses the button "add to shopping cart", and thus settlement processing has been performed.

Accordingly, the input accepting portion 1201 accepts the purchase information "12345678, J-001, 1, M". Herein, "12345678" is the purchaser identifying information, "J-001" is the product or service identifying information, and both of them are information that has been received by the product or service information receiving portion 1203 from the server apparatus 141. Furthermore, "1" is the number of products that are to be purchased, and "M" is the size.

Next, the input information transmitting portion 1202 transmits the purchase information "12345678, J-001, 1, M", to the server apparatus 141.

Next, the purchase information receiving portion 1105 of the server apparatus 141 receives the purchase information "12345678, J-001, 1, M". Then, the purchase history information accumulating portion 1106 acquires the current time "2006 Nov. 5 15:40" from its clock. Then, the purchase history information accumulating portion 1106 constitutes purchase history information "12345678, J-001, 1, 2006 Nov. 5 15:40, M". Then, the purchase history information accumulating portion 1106 additionally writes the constituted purchase history information "12345678, J-001, 1, 2006 Nov. 5 15:40, M" in the purchase history information management table, and thus the purchase history information management table shown in FIG. 10 is obtained.

Next, the purchase history information accumulating portion 1106 temporarily stores the purchaser identifying information "12345678" in the user identifying information storage portion 1107.

Next, the recommended product or service acquiring portion 1110 recommends a product or service for the purchaser identified with the purchaser identifying information "12345678", in the following manner. That is to say, the recommended product or service acquiring portion 1110 reads the purchaser identifying information "12345678" that has been stored in the user identifying information storage portion 1107, and arranges the information on the memory.

Next, the recommended product or service acquiring portion 1110 reads the group identifier "3" corresponding to the purchaser identifying information "12345678", from the group identifier management table in FIG. 19.

The recommended product or service acquiring portion 1110 acquires one or more pieces of trend leader identifying information (only "090-2567-1138", in this example) paired with the group identifier that has been read in step S1601, and arranges the information on the memory.

Next, the recommended product or service acquiring portion 1110 determines a recommended product or service, following the processing below. That is to say, the recommended product or service acquiring portion 1110 reads all the product or service identifying information of the products etc. that have been purchased by the first trend leader identified with the purchaser identifying information "090-2567-1138", from the purchase history information management table in FIG. 10, and arranges the information on the memory. It is herein assumed that the recommended product or service acquiring portion 1110 acquires product or service identifying information (J-002, S-0017), and arranges the information on the memory. Then, the recommended product or service acquiring portion 1110 judges whether or not the person targeted for recommendation identified with "12345678" has not purchased the two products etc. identified with the product or service identifying information (J-002, S-0017). More specifically, the recommended product or service acquiring portion 1110 judges whether or not a record containing the purchaser identifying information "12345678" and the product or service identifying information "J-002" is present in the purchase history information management table in FIG. 10. It is herein assumed that this record is not present in the purchase history information management table in FIG. 10. Furthermore, the recommended product or service acquiring portion 1110 judges whether or not a record containing the purchaser identifying information "12345678" and the product or service identifying information "S-0017" is present in the purchase history information management table in FIG. 10. It is herein assumed that this record is present in the purchase history information management table in FIG. 10.

Herein, since the number of products etc. that are to be recommended is one, the recommended product or service acquiring portion 1110 determines the product or service specified with the selected product or service identifying information (J-002), as a recommended product or service Next, the recommended product or service transmitting portion 1111 constitutes information that is to be transmitted, from the acquired product or service identifying information "J-002" for recommendation. Then, the recommended product or service transmitting portion 1111 transmits the constituted information, to the information output apparatus 12.

Figure 21:
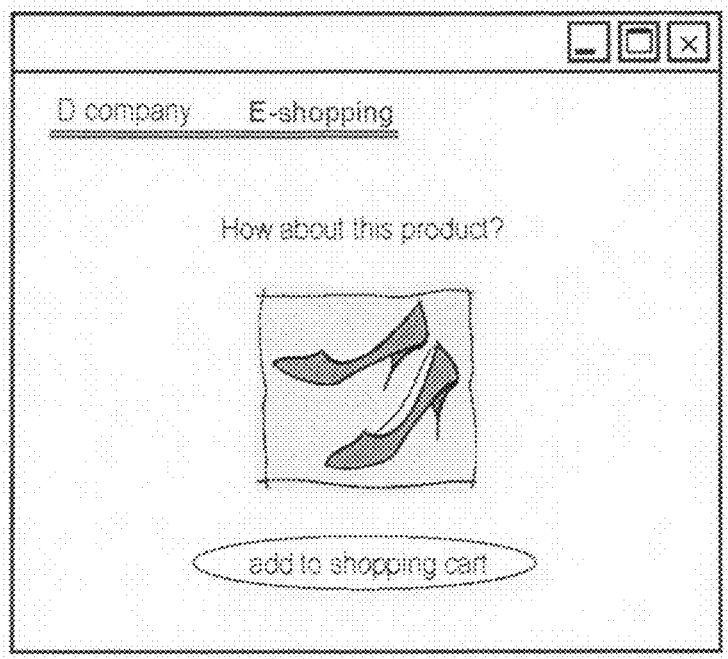
FIG. 21 is a view showing an example of a screen for recommending a product or service in the information processing system.

Next, the recommended product or service receiving portion 1204 receives the product or service identifying information "J-002" indicating the recommended product or service, an attribute value (the product name, the price, the image, etc.) of this product or service, and the like from the server apparatus 141. Then, the output portion 1205 constitutes a screen that is to be output, from the received information (such as information of a website containing the product or service information). The output portion 1205 outputs the constituted screen, for example, as in FIG. 21.

As described above, according to this embodiment, users are divided into groups, a trend leader is determined for a group to which a person targeted for recommendation belongs, and a product purchased by the trend leader is recommended. Thus, recommendation of a product or service that matches preference of the user more closely can be provided.

Software that implements the information processing apparatus in this embodiment may be a following program. Specifically, this program is a program for causing a computer to function as: a trendy product or service selecting portion that reads at least two pieces of purchase history information having purchaser identifying information, product or service identifying information, and purchase time information, from a storage medium, selects at least one piece of product or service identifying information for identifying a trendy product or service, which is a product or service purchased at a predetermined or higher degree of a trend, and stores the product or service identifying information in a storage medium; a trend leader detecting portion that acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium; a recommended product or service acquiring portion that acquires at least one piece of product or service identifying information for identifying a product or service purchased by at least one purchaser identified with the at least one piece of purchaser identifying information that has been acquired by the trend leader detecting portion, and stores the product or service identifying information in a storage medium; and a recommended product or service transmitting portion that transmits the at least one piece of product or service identifying information that has been acquired by the recommended product or service acquiring portion, to an information output apparatus.

Furthermore, in the above-described program, it is preferable that the computer functions further as: an input information receiving portion that receives at least two pairs of input information, which is information input to the information output apparatus by a purchaser, and purchaser identifying information; an input information accumulating portion that accumulates the input information and the purchaser identifying information that have been received by the input information receiving portion, in a storage medium; and a purchaser classifying portion that classifies, using the at least two pieces of input information that have been accumulated by the input information accumulating portion, the purchaser identifying information paired with each piece of input information, and manages the purchaser identifying information in such a manner that a group to which each piece of purchaser identifying information belongs can be identified, wherein the trend leader detecting portion acquires at least one piece of purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from at least one piece of purchaser identifying information belonging to a group corresponding to the purchaser identifying information for identifying the purchaser targeted for recommendation.

Furthermore, in the above-described program, it is preferable that the purchaser classifying portion reads the input information and the purchaser identifying information that have been accumulated by the input information accumulating portion, analyzes preference of each purchaser using the input information and the purchaser identifying information, classifies at least two pieces of purchaser identifying information based on the preference, and manages the purchaser identifying information in such a manner that a group to which each piece of purchaser identifying information belongs can be identified.

Furthermore, in the above-described program, it is preferable that the input information that has been received by the input information receiving portion has product or service identifying information for identifying a product or service purchased by a purchaser identified with the purchaser identifying information, the input information accumulating portion accumulates the purchase history information having the product or service identifying information that has been received by the input information receiving portion, the purchaser identifying information, and the purchase time information, in the purchase history information storage portion, and the purchaser classifying portion classifies at least two pieces of purchaser identifying information, using the at least two pieces of purchase history information that have been accumulated by the input information accumulating portion, and manages the purchaser identifying information in such a manner that a group to which each piece of purchaser identifying information belongs can be identified.

Furthermore, in the above-described program, it is preferable that the computer functions further as a trend leader output portion that outputs information to the effect that a purchaser identified with the purchaser identifying information that has been acquired by the trend leader detecting portion is the trend leader.

Embodiment 3

In this embodiment, an information processing system for detecting a trend leader who purchased a trendy item at an early stage, and recommending a product purchased by the trend leader will be described. In particular, it is preferable that when a user who is not the trend leader accesses, for example, a server apparatus, this information processing system immediately recommends a product purchased by the trend leader. Moreover, in this embodiment, a manner in which when the trend leader purchases a product or service, other users are immediately notified of the purchased product or service will be described.

The information processing system is provided with a server apparatus 221 and the information output apparatuses 12 (12(1), 12(2), . . . , 12(n)). The server apparatus 221 and the one or more information output apparatuses 12 can exchange information via a network. The server apparatus 221 and the one or more information output apparatuses 12 are connected to each other via a network such as the Internet, a wireless communication network, a telephone network, or a dedicated line.

Figure 22:
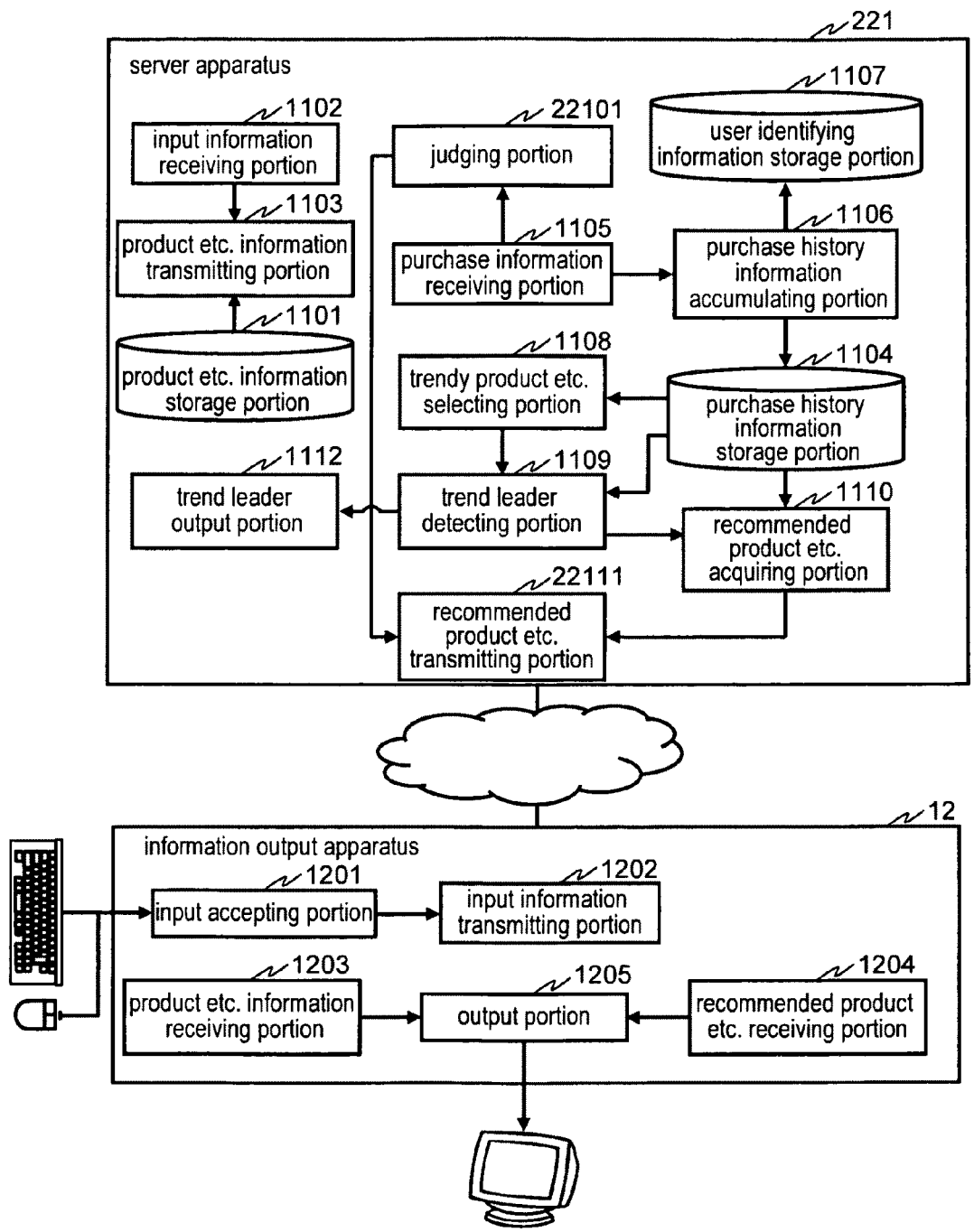
FIG. 22 is a block diagram of an information processing system in Embodiment 3.

FIG. 22 is a block diagram of the information processing system in this embodiment. The server apparatus 221 is provided with the product or service information storage portion 1101, the input information receiving portion 1102, the product or service information transmitting portion 1103, the purchase history information storage portion 1104, the purchase information receiving portion 1105, the purchase history information accumulating portion 1106, the user identifying information storage portion 1107, the trendy product or service selecting portion 1108, the trend leader detecting portion 1109, the recommended product or service acquiring portion 1110, a recommended product or service transmitting portion 22111, the trend leader output portion 1112, and a judging portion 22101.

The judging portion 22101 judges whether or not the purchaser identifying information that has been received by the purchase information receiving portion 1105 is information for identifying the trend leader. More specifically, the judging portion 22101 acquires the purchaser identifying information that has been received by the purchase information receiving portion 1105, and judges whether or not the purchaser identifying information is present in the one or more pieces of purchaser identifying information that have been acquired by the trend leader detecting portion 1109. The timing at which the trend leader detecting portion 1109 acquires the trend leader identifying information may be different from the timing at which the judging portion 22101 performs judgment. The trend leader detecting portion 1109, for example, regularly acquires the trend leader identifying information, and accumulates the information in a storage medium. Typically, the judging portion 22101 can be implemented, for example, as an MPU or a memory. Typically, the processing procedure of the judging portion 22101 is implemented by software, and the software is stored in a storage medium such as a ROM. Note that the processing procedure also may be implemented by hardware (dedicated circuit).

The recommended product or service transmitting portion 22111 transmits the one or more pieces of product or service identifying information that have been acquired by the recommended product or service acquiring portion 1110. It is preferable that if the judging portion 22101 judges that the purchaser identifying information that has been received by the purchase information receiving portion 1105 is contained in the purchaser identifying information that has been acquired by the trend leader detecting portion 1109, then the recommended product or service transmitting portion 22111 transmits the product or service identifying information that has been received by the purchase information receiving portion 1105. In this case, it is preferable that when the purchase information receiving portion 1105 receives the purchase information of the trend leader, the recommended product or service transmitting portion 22111 immediately performs the above-described processing, and transmits the product or service identifying information for recommendation. Also, this transmission may be performed as notification using an email. If notification is performed using an email, typically, one or more email addresses indicating one or more destinations of the notification are held in advance. The recommended product or service transmitting portion 22111 can be implemented, for example, as a wireless or wired communication unit.

Next, the operation of the information processing system will be described. First, the operation of the server apparatus 221 will be described with reference to the flowchart in FIG. 23. In the flowchart in FIG. 23, only steps that are different from those in the flowchart in FIG. 3 will be described.

(Step S2301) The judging portion 22101 reads the purchaser identifying information that has been temporarily stored in step S309.

(Step S2302) The judging portion 22101 judges whether or not a purchaser identified with the purchaser identifying information that has been read in step S2301 is the trend leader. If the purchaser is the trend leader, the procedure proceeds to step S230. If the purchaser is not the trend leader, the procedure returns to step S301. Herein, whether or not the purchaser is the trend leader is judged, for example, in the following manner. In step S310, one or more pieces of trend leader identifying information for identifying the trend leader are stored in a storage medium. Then, the judging portion 22101 judges whether or not the purchaser identifying information that has been read in step S2301 is contained in the one or more pieces of trend leader identifying information. If the purchaser identifying information is contained therein, the purchaser identified with the read purchaser identifying information is the trend leader.

(Step S2303) If it is judged in step S2302 that the purchaser is the trend leader, the procedure proceeds to step S2304. If it is judged that the purchaser is not the trend leader, the procedure returns to step S301.

(Step S2304) The recommended product or service transmitting portion 22111 searches the product or service information storage portion 1101, using the product or service identifying information of a product or service purchased by the trend leader as a key, and acquires information (containing a product attribute) of a recommended product or service (Step S2305) The recommended product or service transmitting portion 22111 transmits the product or service information that has been acquired in step S2304. This transmission is, for example, transmission using an email to an email address registered in advance. The email address registered in advance is, for example, an email address of a user who wants information of a product or service purchased by the trend leader.

Figure 23:
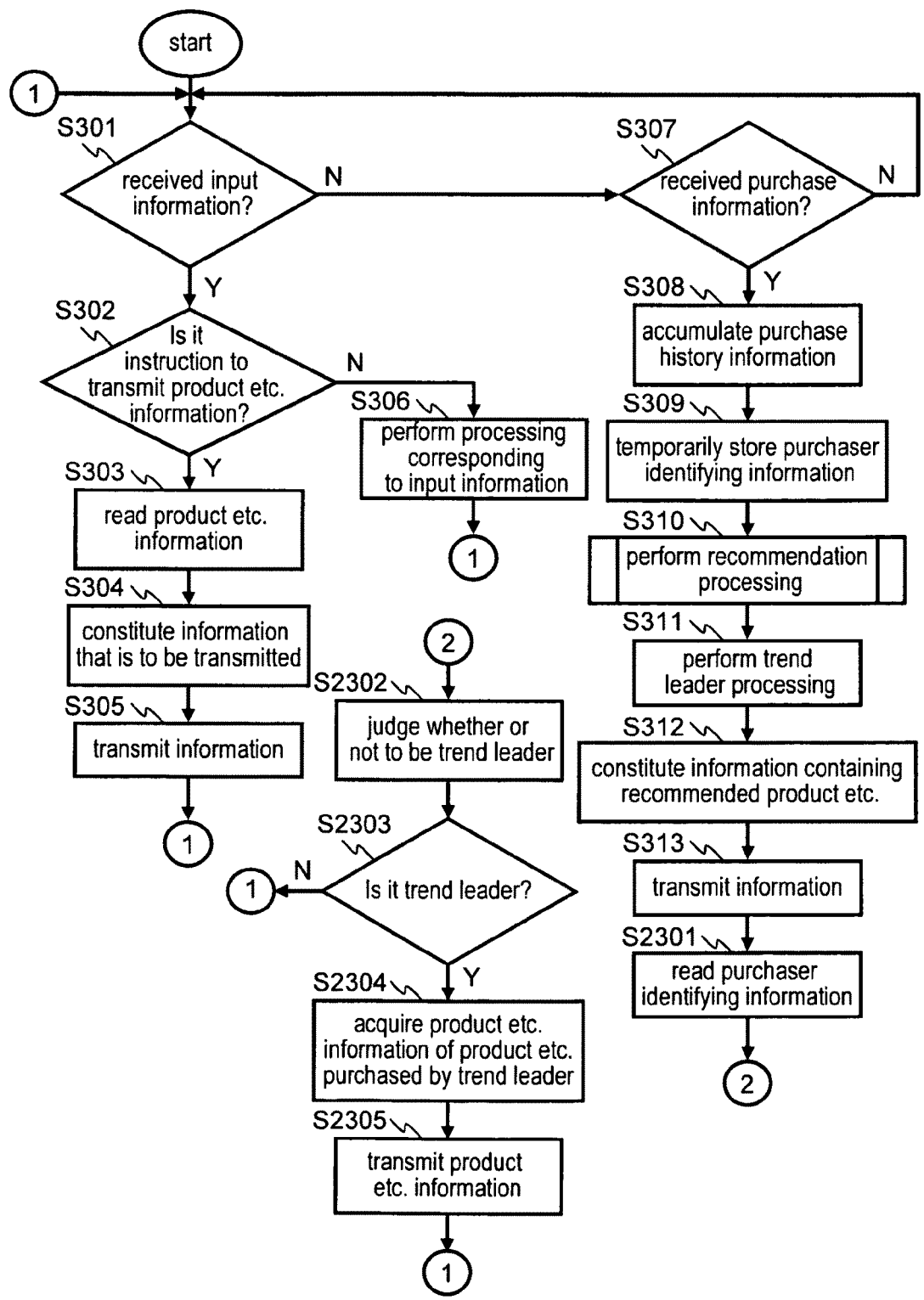
FIG. 23 is a flowchart illustrating the operation of a server apparatus in the information processing system.

Herein, in the recommendation processing in step S310 in the flowchart in FIG. 23, it is preferable to recommend the product or service identified with the product or service identifying information, most recently purchased by the trend leader.

Note that the processing is ended by powering off or interruption for aborting the processing in the flowchart in FIG. 23.

Hereinafter, a specific operation of the information processing system in this embodiment will be described. FIG. 1 is a conceptual diagram of the information processing system.

As in the processing described in Embodiment 1 or 2, also in the information processing system in this embodiment, it is assumed that the trend leader is detected, and the purchaser identifying information (the trend leader identifying information) for identifying the trend leader is stored as shown in FIG. 12 or 20.

Figure 9:
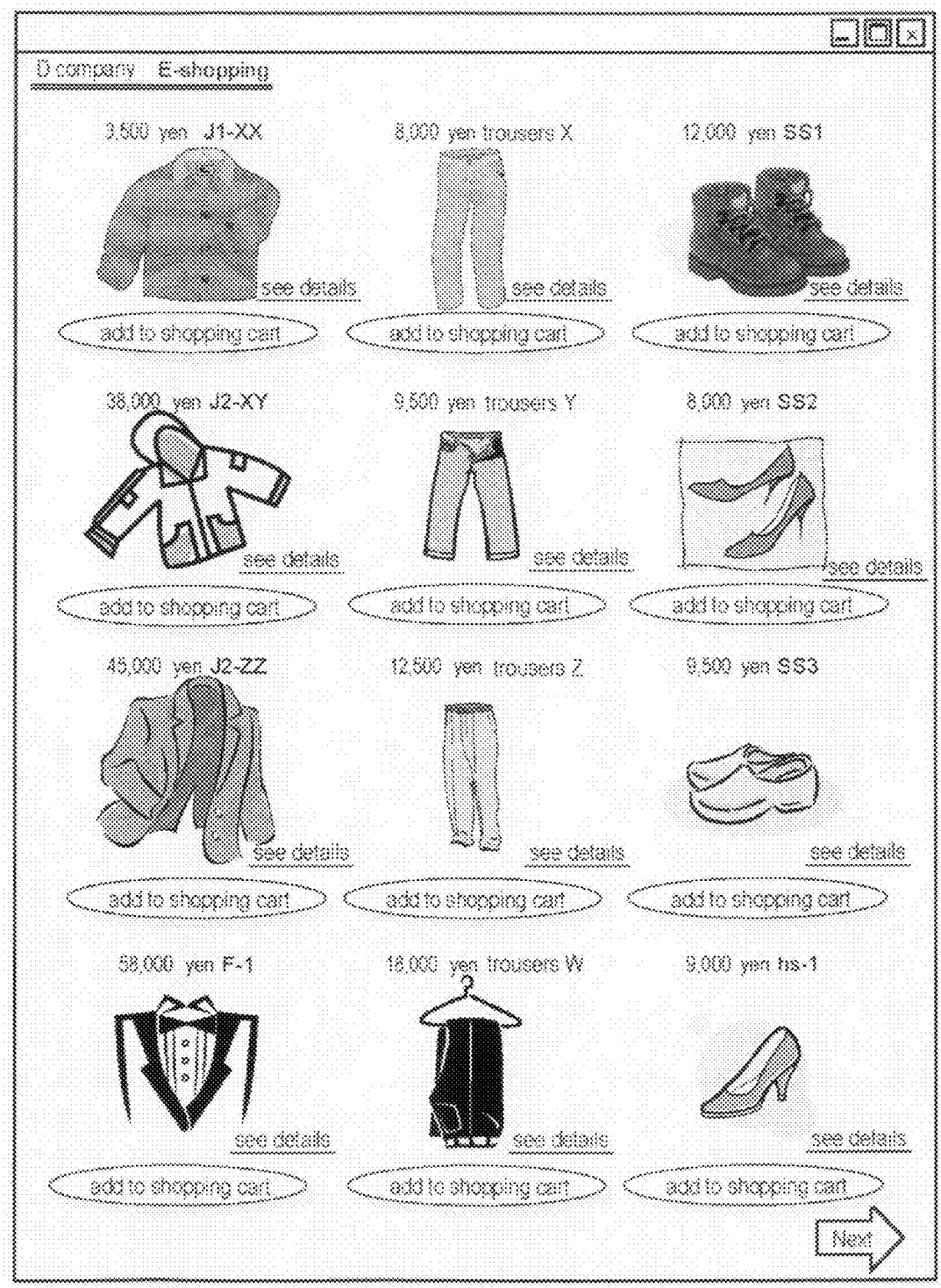
FIG. 9 is a view showing an example of a screen in an electronic commercial transaction in the information processing system.

Then, for example, it is assumed that a purchaser, serving as the trend leader, identified with "090-1111-2234" accesses the server apparatus 221 from the information output apparatus 12, and the information output apparatus 12 displays a screen for shopping as shown in FIG. 9. Then, it is assumed that this trend leader presses the button "add to shopping cart" corresponding to a jacket with product or service identifying information "J-002" and a product name "J2-XY", inputs data for purchasing the jacket, and thus purchases the jacket.

Accordingly, the information output apparatus 12 constitutes purchase information, which is information for purchasing the jacket (information having the purchaser identifying information "090-1111-2234" and the product or service identifying information "J-002"), and transmits the information to the server apparatus 221.

Next, the purchase information receiving portion 1105 of the server apparatus 221 receives the purchase information, and the purchase history information accumulating portion 1106 constitutes purchase history information (information having the purchaser identifying information "090-1111-2234", the product or service identifying information "J-002", and the purchase time information), and accumulates the information. The processing and the like of the purchase history information accumulating portion 1106 are as in Embodiment 1, for example.

Next, the recommended product or service acquiring portion 1110 and the like perform the processing of recommending a product or service for the purchaser identified with the purchaser identifying information "090-1111-2234" as in Embodiment 1, for example. It should be noted that a trend leader was provided with recommendation of a product or service purchased by other trend leaders, but recommendation does not have to be provided for the trend leaders.

Next, the judging portion 22101 judges whether or not this purchaser is the trend leader, from the purchaser identifying information "090-1111-2234". More specifically, the judging portion 22101 judges whether or not the purchaser identifying information "090-1111-2234" is present in the point management table in FIG. 12 or the trend leader management table in FIG. 20. Herein, the purchaser identifying information "090-1111-2234" is present in the tables, and thus the judging portion 22101 judges that the purchaser identified with the purchaser identifying information "090-1111-2234" is the trend leader.

Next, the recommended product or service transmitting portion 22111 searches the product or service information storage portion 1101, using the product or service identifying information of a product or service purchased by the trend leader as a key, and acquires information (containing a product attribute) of a recommended product or service.

Next, the recommended product or service transmitting portion 22111 reads one or more email addresses (mail addresses of purchasers who have requested notification of a product or service purchased by the trend leader) registered in advance. Then, the recommended product or service transmitting portion 22111 transmits the acquired product or service information (the product or service information of the jacket J-002) to the read email addresses.

Furthermore, in this specific example, the product or service identifying information of the product or service purchased by the trend leader, or the product or service identifying information and the product or service information of the product or service purchased by the trend leader may be stored in advance in a storage medium, and if a certain user accesses the server apparatus 221 from the information output apparatus 12, recommendation of the product or service purchased by the trend leader may be provided to the information output apparatus 12.

As described above, according to this embodiment, a demand of users who want to immediately follow a trend can be satisfied, and sales of products etc. can be greatly promoted.

The software that implements the information processing apparatus in this embodiment may be a following program. Specifically, this program is a program for causing a computer to function as: a trendy product or service selecting portion that reads at least two pieces of purchase history information having purchaser identifying information, product or service identifying information, and purchase time information, from a storage medium, selects at least one piece of product or service identifying information for identifying a trendy product or service, which is a product or service purchased at a predetermined or higher degree of a trend, and stores the product or service identifying information in a storage medium; a trend leader detecting portion that acquires purchaser identifying information for identifying a purchaser who purchased the trendy product or service identified with the at least one piece of product or service identifying information that has been selected by the trendy product or service selecting portion and who purchased the trendy product or service at an early stage satisfying a predetermined time condition, from the at least two pieces of purchase history information, and stores the purchaser identifying information in a storage medium; a recommended product or service acquiring portion that acquires product or service identifying information paired with the purchaser identifying information that has been acquired by the trend leader detecting portion, from the purchase history information storage portion; a purchase information receiving portion that receives purchase information, which is information indicating a purchase of a product or service by a user of the information output apparatus, and which has purchaser identifying information for identifying the user and product or service identifying information for identifying the product or service, from the information output apparatus; a judging portion that judges whether or not the purchaser identifying information that has been received by the purchase information receiving portion is contained in the purchaser identifying information that has been acquired by the trend leader detecting portion; and a recommended product or service transmitting portion that transmits the product or service identifying information that has been received by the purchase information receiving portion, if the judging portion judges that the purchaser identifying information that has been received by the purchase information receiving portion is contained in the purchaser identifying information that has been acquired by the trend leader detecting portion.

Embodiment 4

In this embodiment, an information processing system for selecting a trend leader according to a trend leader degree, or a trend leader degree and a trend follower degree, and recommending a product purchased by the trend leader will be described. Herein, regarding the recommended product, typically, a product or service that has not been purchased by a person targeted for recommendation is recommended. Also, the information processing system in this embodiment is an information processing system for dividing users into groups, determining the trend leader for a group to which a person targeted for recommendation belongs, and recommending a product purchased by the trend leader. Furthermore, people targeted for recommendation can be divided into groups by automatically classifying the people according to the order in which they purchased a product or service.

Figure 24:
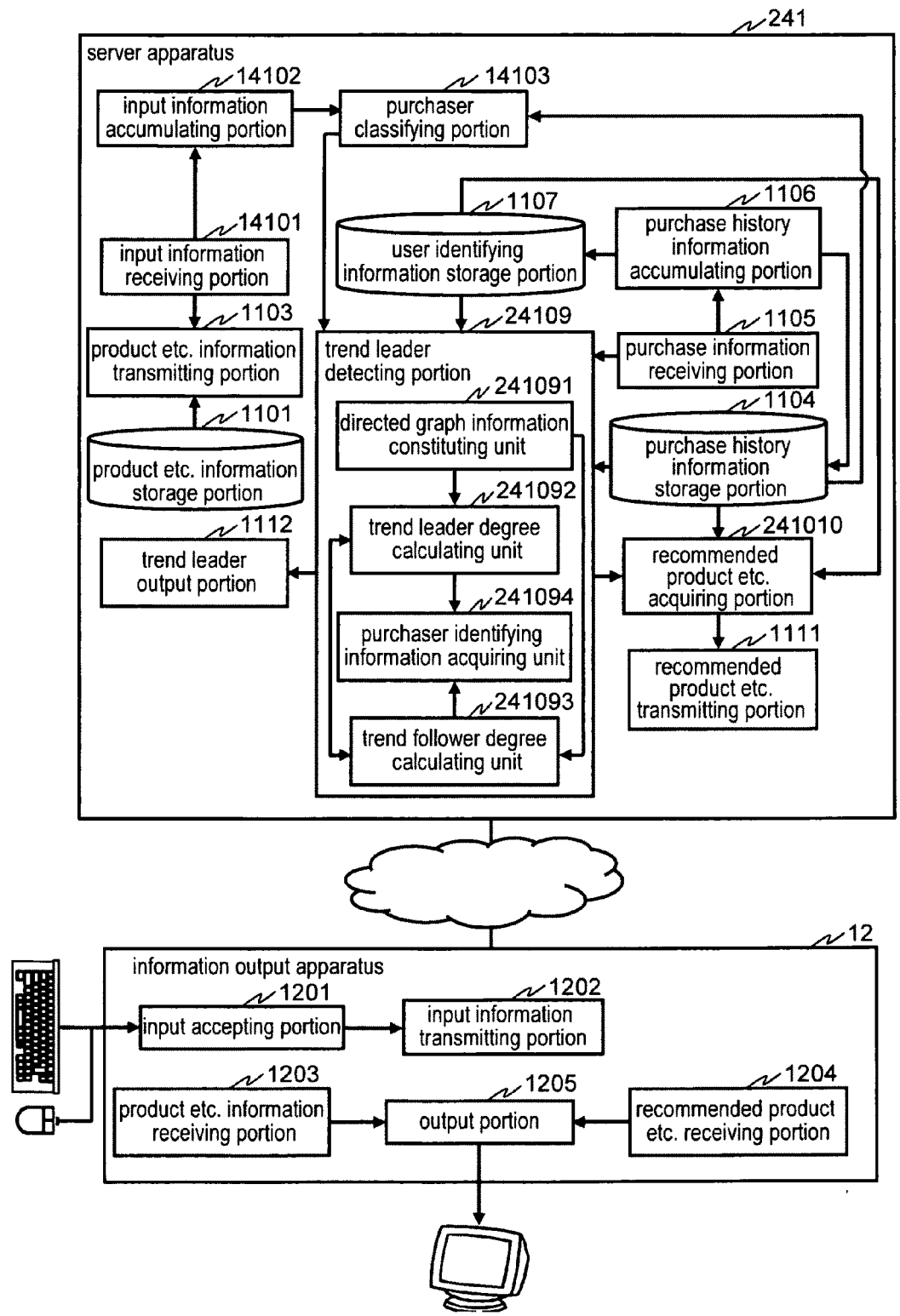
FIG. 24 is a block diagram of an information processing system in Embodiment 4.

FIG. 1 is a conceptual diagram of the information processing system in this embodiment. FIG. 24 is a block diagram of the information processing system in this embodiment. This information processing system is provided with a server apparatus 241 and the one or more information output apparatuses 12 (12(1), 12(2), . . . , 12(n)).

The server apparatus 241 is provided with the product or service information storage portion 1101, the input information receiving portion 14101, the input information accumulating portion 14102, the product or service information transmitting portion 1103, the purchase history information storage portion 1104, the purchase information receiving portion 1105, the purchase history information accumulating portion 1106, the user identifying information storage portion 1107, a purchaser classifying portion 24103, a trend leader detecting portion 24109, a recommended product or service acquiring portion 241010, the recommended product or service transmitting portion 1111, and the trend leader output portion 1112.

The trend leader detecting portion 24109 is provided with a directed graph information constituting unit 241091, a trend leader degree calculating unit 241092, a trend follower degree calculating unit 241093, and a purchaser identifying information acquiring unit 241094.

The purchaser classifying portion 24103 classifies two or more purchasers identified with the purchaser identifying information. The purchaser classifying portion 24103 classifies the purchaser identifying information according to the time-based order in which purchasers purchased a product or service, and manages the purchaser identifying information in such a manner that a group to which each piece of purchaser identifying information belongs can be identified. More specifically, the purchaser classifying portion 24103 links the purchaser identifying information (herein, the purchaser identifying information serves as nodes) according to the time-based order in which purchasers identified with the purchaser identifying information purchased a product or service, constitutes a network of the two or more pieces of purchaser identifying information, acquires two or more subnetworks according to the link relationship between the purchaser identifying information, takes a collection of one or more pieces of purchaser identifying information serving as nodes in each of the subnetworks as the purchaser identifying information constituting each group, and manages the thus constituted network in such a manner that a group to which each piece of purchaser identifying information belongs can be identified. The technique for making a network into two or more subnetworks according to the link relationship is well known, for example, as the above-described algorithms for dividing communities (Non-Patent Documents 1 to 3), and thus a detailed description thereof has been omitted.

The trend leader detecting portion 24109 reads two or more pieces of purchase history information from the purchase history information storage portion 1104, detects purchaser identifying information for identifying a trend leader who purchased at least one product or service at an early stage satisfying a predetermined time condition, from the at least two pieces of product or service identifying information and purchase time information contained in the at least two pieces of purchase history information, acquires the purchaser identifying information from the at least two pieces of purchase history information, and stores the information in a storage medium (may be a volatile storage medium such as a main memory, or may be a non-volatile storage medium such as a hard disk). Herein, the phrase "satisfying a predetermined time condition" has a concept that includes a state in which the relative time condition that the purchaser purchased a certain product earlier than the other purchasers is satisfied, and a state in which the purchaser is a person who purchased a trendy item at the earliest stage. The trend leader detecting portion 24109 detects the purchaser identifying information for identifying the trend leader, for example, using the directed graph information constituting unit 241091, the trend leader degree calculating unit 241092, and the purchaser identifying information acquiring unit 241094 described later. Typically, the trend leader detecting portion 24109 can be implemented, for example, as an MPU or a memory. Typically, the processing procedure of the trend leader detecting portion 24109 is implemented by software, and the software is stored in a storage medium such as a ROM. Note that the processing procedure also may be implemented by hardware (dedicated circuit).

The directed graph information constituting unit 241091 reads two or more pieces of purchase history information from the purchase history information storage portion 1104, acquires the purchaser identifying information and the purchase time information corresponding to the product or service identifying information indicating each of one or more products etc., and constitutes information of a directed graph in which the two or more pieces of purchaser identifying information are linked in the order of the purchase time according to the two or more pieces of purchase time information that have been acquired. The directed graph information is implemented, for example, by a link. Also, the directed graph information can be implemented, for example, by sequentially storing nodes (the purchaser identifying information) in one array. Furthermore, the directed graph information can be expressed, for example, as a matrix, and the matrix can be stored in an array. The matrix is, for example, a matrix in which if there is the link relationship, the element value is "1", and if there is not the link relationship, the element value is "0", and a specific example thereof will be described later. There is no limitation on the data structure of the directed graph information.

The trend leader degree calculating unit 241092 calculates a trend leader degree for each piece of purchaser identifying information, from the directed graph information that has been constituted by the directed graph information constituting unit 241091, and stores the trend leader degree in a storage medium (such as a memory). The trend leader degree is information indicating a degree of being a link origin and a degree of being a trend source. The trend leader degree calculating unit 241092 performs calculation such that if one product purchased by one purchaser is purchased later by a larger number of people, then the trend leader degree of the purchaser is made high (significant). The trend leader degree calculating unit 241092 performs calculation such that if a product purchased by one purchaser is purchased by others and becomes trendy, then the trend leader degree of the purchaser is made high (significant). A specific algorithm for calculating the trend leader degree will be described later.

The trend follower degree calculating unit 241093 calculates a trend follower degree for each piece of purchaser identifying information, from the directed graph information that has been constituted by the directed graph information constituting unit 241091, and stores the trend follower degree in a storage medium (such as a memory). The trend follower degree is information indicating a degree of following a link origin and a degree of following a trend. The trend follower degree calculating unit 241093 performs calculation such that if a product or service purchased by a large number of purchasers is purchased later by a person, the trend follower degree of this person is made high (significant). A specific algorithm for calculating the trend follower degree will be described later.

The purchaser identifying information acquiring unit 241094 acquires purchaser identifying information for identifying a trend leader having a high degree of being the trend source, using the trend leader degree of each piece of purchaser identifying information that has been calculated by the trend leader degree calculating unit 241092, from the two or more pieces of purchase history information, and stores the information in a storage medium. Also, the purchaser identifying information acquiring unit 241094 may acquire purchaser identifying information for identifying a trend leader having a high degree of being the trend source, using the trend leader degree of each piece of purchaser identifying information that has been calculated by the trend leader degree calculating unit 241092 and the trend follower degree of each piece of purchaser identifying information that has been calculated by the trend follower degree calculating unit 241093, from the two or more pieces of purchase history information, and store the information in a storage medium.

Typically, the directed graph information constituting unit 241091, the trend leader degree calculating unit 241092, the trend follower degree calculating unit 241093, and the purchaser identifying information acquiring unit 241094 can be implemented, for example, as an MPU or a memory. Typically, the processing procedure of the directed graph information constituting unit 241091 and the like is implemented by software, and the software is stored in a storage medium such as a ROM. Note that the processing procedure also may be implemented by hardware (dedicated circuit).

Next, the operation of the information processing system will be described. First, an example of the algorithm in which the server apparatus 241 calculates the trend leader degree and the trend follower degree for each piece of purchaser identifying information will be described with reference to the flowcharts in FIGS. 25 and 26.

(Step S2501) The directed graph information constituting unit 241091 reads all the two or more pieces of the purchase history information from the purchase history information storage portion 1104, acquires the purchaser identifying information and the purchase time information corresponding to the product or service identifying information indicating each of one or more products etc., and constitutes information of a directed graph in which the two or more pieces of purchaser identifying information are linked in the order of the purchase time according to the two or more pieces of purchase time information that have been acquired. Later an example of the algorithm for constituting the directed graph information will be described with reference to the flowchart in FIG. 26.

(Step S2502) The trend leader degree calculating unit 241092 initializes a trend leader degree vector. The trend leader degree vector is vector data constituted by elements that are the trend leader degree corresponding to each purchaser identifier. The trend follower degree calculating unit 241093 initializes a trend follower degree vector. The trend follower degree vector is vector data constituted by elements that are the trend follower degree corresponding to each purchaser identifier.

(Step S2503) The trend leader degree calculating unit 241092 obtains the next trend leader degree vector, using the directed graph information (matrix) that has been obtained in step S2501 and the trend follower degree vector.

(Step S2504) The trend follower degree calculating unit 241093 obtains the next trend follower degree vector, using the directed graph information (matrix) that has been obtained in step S2501, and the trend leader degree vector that has been obtained in step S2503 or information generating the trend leader degree vector obtained in the calculation process in step S2503.

(Step S2505) The trend leader degree calculating unit 241092 and the trend follower degree calculating unit 241093 judge whether or not the trend leader degree and the trend follower degree has converged. More specifically, it is judged whether or not "|trend leader degree vector−next trend leader degree vector|<$\epsilon$" and "trend follower degree vector−next trend follower degree vector|<$\epsilon$" are satisfied. Herein, it is preferable that $\epsilon$ is a very small number such as "0.0001". If the trend leader degree and the trend follower degree has converged, the procedure proceeds to step S2506. If the trend leader degree and the trend follower degree has not converged, the procedure proceeds to step S2507.

(Step S2506) The trend leader degree calculating unit 241092 and the trend follower degree calculating unit 241093 accumulate elements of the next trend leader degree vector and the next trend follower degree vector in a storage medium, as the trend leader degree and the trend follower degree of each purchaser.

(Step S2507) The trend leader degree calculating unit 241092 takes the next trend leader degree vector as the trend leader degree vector, and substitute it for a variable in which the trend leader degree vector is stored.

(Step S2508) The trend follower degree calculating unit 241093 takes the next trend follower degree vector as the trend follower degree vector, and substitute it for a variable in which the trend follower degree vector is stored. The procedure returns to step S2503.

Through the processing described above, the trend leader degree and the trend follower degree of each purchaser are calculated.

Figure 25:
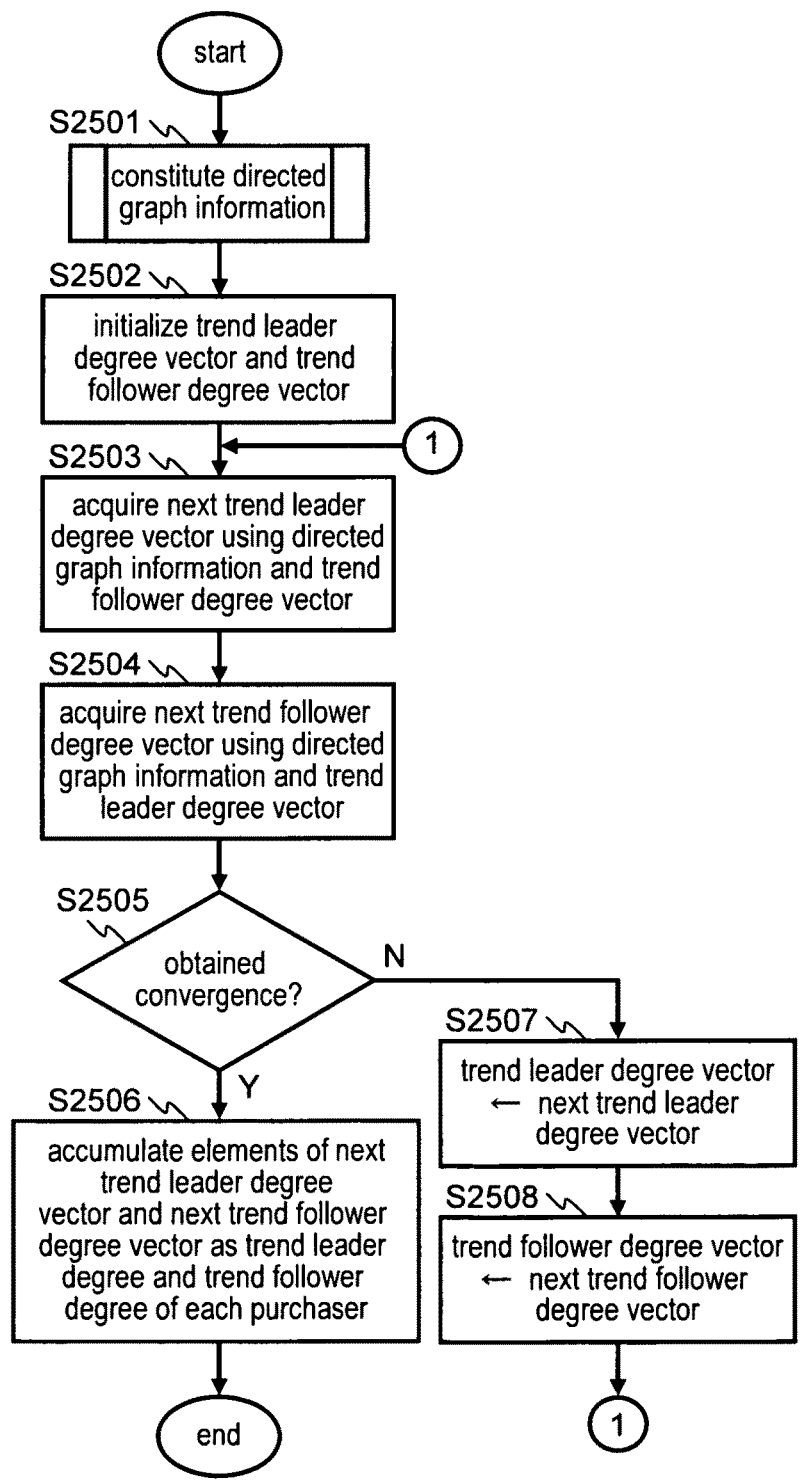
FIG. 25 is a flowchart illustrating an algorithm for calculating a trend leader degree and the like in the information processing system.

Herein, in the flowchart in FIG. 25, after the trend leader degree was calculated, the trend follower degree was calculated (step S2503 and step S2504). However, it would be appreciated that there is no limitation on the order in which the trend leader degree and the trend follower degree are calculated. That is to say, in the flowchart in FIG. 25, the trend leader degree may be calculated after the trend follower degree is calculated.

Figure 26:
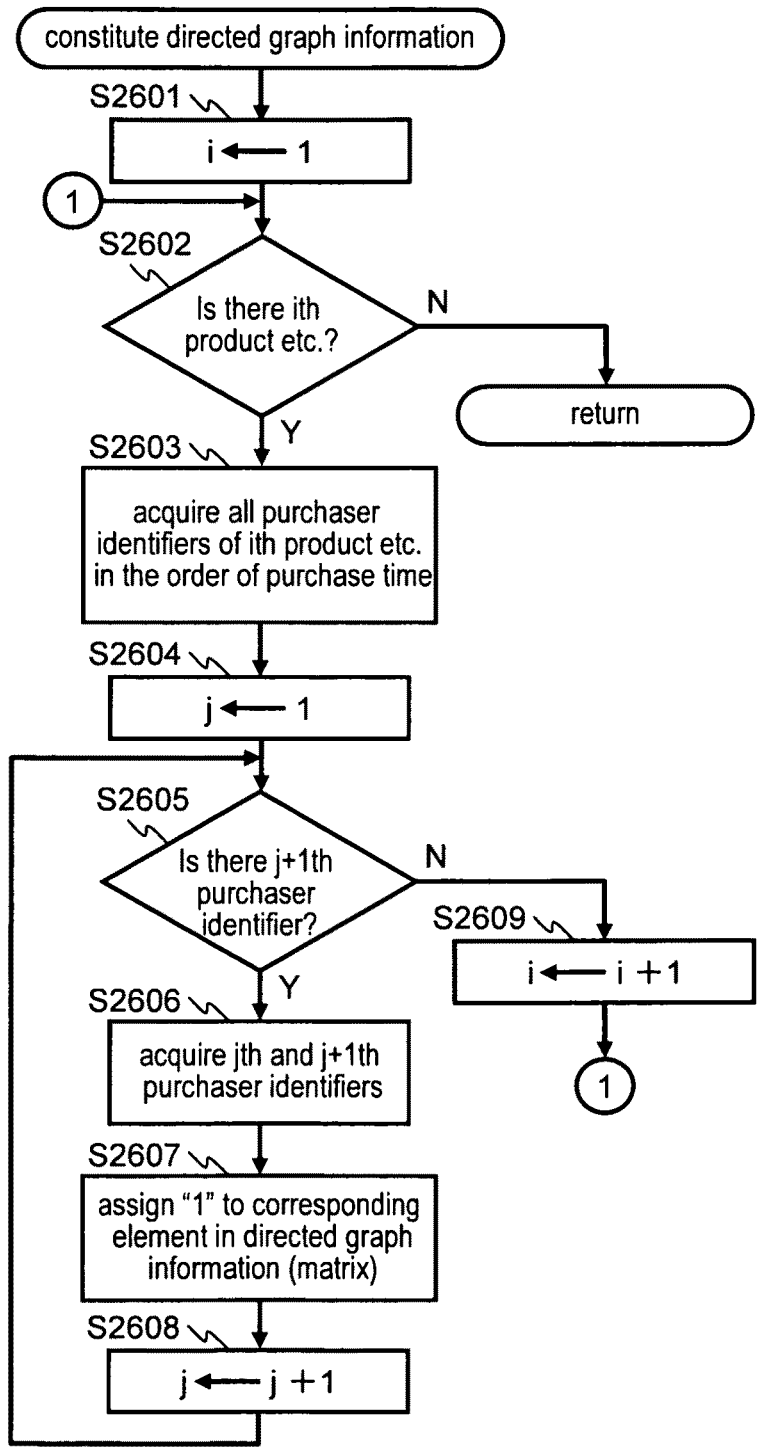

Next, an example of the algorithm for constituting the directed graph information will be described with reference to the flowchart in FIG. 26. It is herein assumed that if the number of pieces of the purchaser identifying information is taken as n, the directed graph information is a matrix n×n.

(Step S2601) The directed graph information constituting unit 241091 substitutes 1 for a counter i.

(Step S2602) The directed graph information constituting unit 241091 judges whether or not the $i^{th}$ product or service is present, from the product or service information in the product or service information storage portion 1101. If the $i^{th}$ product or service is present, the procedure proceeds to step S2603. If the $i^{th}$ product or service is not present, the procedure returns to the upper processing.

(Step S2603) The directed graph information constituting unit 241091 acquires all the purchaser identifiers of the purchasers of the $i^{th}$ product or service, and temporarily stores the purchaser identifiers in a memory or the like in the order of the purchase time. The stored information is a collection of the purchaser identifiers.

(Step S2604) The directed graph information constituting unit 241091 substitutes 1 for a counter j.

(Step S2605) The directed graph information constituting unit 241091 judges whether or not the "j+1"$^{th}$ purchaser identifier is present in the collection of the purchaser identifiers stored in step S2603. If the "j+1"$^{th}$ purchaser identifier is present, the procedure proceeds to step S2606. If the "j+1"$^{th}$ purchaser identifier is not present, the procedure proceeds to step S2609.

(Step S2606) The directed graph information constituting unit 241091 acquires the $i^{th}$ and the "j+1"$^{th}$ purchaser identifiers, in the collection of the purchaser identifiers stored in step S2603.

(Step S2607) The directed graph information constituting unit 241091 assigns "1" to element values corresponding to the $j^{th}$ and the "j+1"$^{th}$ purchaser identifiers that have been acquired in step S2606, among elements in the directed graph information. More specifically, "1" refers to a state in which a link of the network is provided.

(Step S2608) The directed graph information constituting unit 241091 increments j by 1. The procedure returns to step S2605.

(Step S2609) The directed graph information constituting unit 241091 increments i by 1. The procedure returns to step S2602.

Next, the operation in which the server apparatus 241 recommends a product or service, using the trend leader degree and the trend follower degree that have been stored. This operation is different from the operation in the flowchart in FIG. 15, only in the recommendation processing. Hereinafter, this recommendation processing will be described with reference to the flowchart in FIG. 27.

(Step S2701) The recommended product or service acquiring portion 241010 acquires the product or service identifying information of a product or service purchased by a user targeted for recommendation. This product or service identifying information is contained in the purchase information that has been received by the purchase information receiving portion 1105 in step S307.

(Step S2702) The recommended product or service acquiring portion 241010 searches the purchase history information storage portion 1104, using the product or service identifying information that has been acquired in step S2701 as a key, acquires all the purchaser identifying information of the other purchasers who purchased the product or service specified with the product or service identifying information, and arranges the information on the memory.

(Step S2703) The recommended product or service acquiring portion 241010 acquires the trend leader degrees of the purchasers identified with all the purchaser identifying information that has been acquired in step S2702, determines the purchaser identifying information corresponding to the highest trend leader degree (information for identifying the trend leader), and arranges this purchaser identifying information on the memory.

(Step S2704) The recommended product or service acquiring portion 241010 searches the purchase history information storage portion 1104, acquires all the product or service identifying information for identifying products etc. purchased by the purchaser identified with the purchaser identifying information that has been acquired in step S2703, and arranges the information on the memory. Then, the recommended product or service acquiring portion 241010 searches the purchase history information storage portion 1104, acquires one or more pieces of product or service identifying information for identifying all the products etc. purchased by the user targeted for recommendation, and arranges the information on the memory. Then, among the product or service identifying information for identifying the products etc. that have been purchased by the trend leader, the product or service identifying information for identifying the products etc. that have not been purchased by the user targeted for recommendation is acquired and arranged on the memory. Herein, this product or service identifying information is information for identifying a recommended product or service Herein, in the flowchart in FIG. 27, the recommended product or service acquiring portion 241010 may read group identifiers corresponding to the purchaser identifying information, and acquire the trend leader identifying information from one or more pieces of purchaser identifying information paired with the group identifiers. Furthermore, it is preferable that the processing of providing the group identifier corresponding to each piece of purchaser identifying information is performed by the purchaser classifying portion 24103 using the above-described method.

Figure 27:
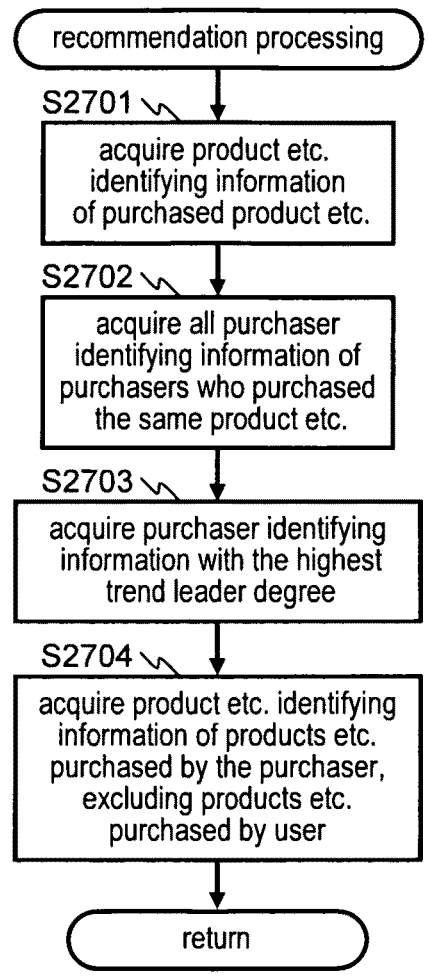
FIG. 27 is a flowchart illustrating recommendation processing in the information processing system.

Furthermore, in the flowchart in FIG. 27, the recommended product or service acquiring portion 241010 may determine the recommended product or service also in consideration of the trend follower degree. For example, it is preferable that in step S2703, the recommended product or service acquiring portion 241010 excludes the purchaser identifying information corresponding to the trend follower degree that is higher than the trend follower degree of the user targeted for recommendation, determines the purchaser identifying information corresponding to the highest trend leader degree among the information left after the exclusion, and arranges this purchaser identifying information on the memory. That is to say, it is preferable that purchasers having the trend follower degree higher than that of the user targeted for recommendation are not taken as a purchaser used for recommendation (the trend leader) even if their trend leader degree is high, because they are lower in the trend than the user targeted for recommendation. It is preferable that a purchaser used for recommendation (the trend leader) is selected, by determining the direction in which the trend is spreading, according to the trend leader degree and the trend follower degree.

Moreover, in the flowchart in FIG. 27, the purchaser identifying information corresponding to the highest trend leader degree was acquired (Step S2703), the product or service identifying information for identifying, among products etc. that have been purchased by this purchaser identified with the purchaser identifying information, products etc. that have not been purchased by the user targeted for recommendation was acquired, and the products etc. identified with the product or service identifying information were recommended. However, it may be preferable that products etc. purchased by purchasers having a trend leader degree that is a predetermined value or more in comparison with the trend leader degree of a user targeted for recommendation are not recommended. The reason for this is that it may be preferable not to recommend products etc. purchased by users who are too different in the leading degree from a user targeted for recommendation. In this case, for example, it is preferable to recommend products etc. purchased by purchasers having a trend leader degree that is higher, within a predetermined threshold value, than the trend leader degree of a user targeted for recommendation. The reason for this is that it seems that a user is highly likely to favor products etc. purchased by users having a leading degree slightly higher than that of the user.

Hereinafter, a specific operation of the information processing system in this embodiment will be described. FIG. 1 is a conceptual diagram of the information processing system.

It is herein assumed that in the purchase history information storage portion 1104 of the server apparatus 241, the purchase history information management table shown in FIG. 28 is stored. More specifically, it is assumed that users A, B, C, D, and E have purchased any one of products [1] to [5]. Herein, in the purchase history information management table, one or more records having "ID" and "purchase history information" are stored. Here, "purchase history information" has "purchaser identifying information", "product or service identifying information", and "purchase time information". Furthermore, in the purchase history information management table in FIG. 28, records are stored such that the earlier time indicated by the attribute value of the purchase time information is higher in order. Moreover, it is assumed that in the product or service information storage portion 1101, the product or service information having a similar structure as that of the product or service information management table shown in FIG. 7 is stored.

Figure 30:
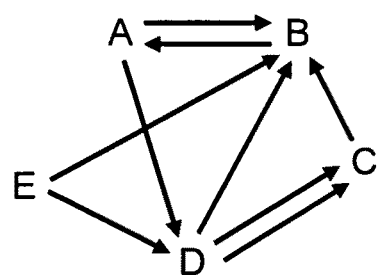
FIG. 30 is a conceptual diagram of a network of purchaser identifying information obtained by the directed graph information constituting unit.

In this case, the directed graph information constituting unit 241091 reads the purchase history information from the purchase history information management table in FIG. 28, acquires the purchaser identifying information and the purchase time information corresponding to the product or service identifying information indicating each of one or more products etc., and constitutes information of a directed graph in which the two or more pieces of purchaser identifying information are linked in the order of the purchase time according to the two or more pieces of purchase time information that have been acquired. More specifically, as shown in the conceptual diagram in FIG. 29, the directed graph information constituting unit 241091 focuses on the order in which purchasers purchased a product etc, and obtains information of the network of the purchaser identifying information for each product or service identifying information. Then, the product or service identifying information is eliminated from the conceptual diagram in FIG. 29, and thus the directed graph information constituting unit 241091 constitutes the directed graph information in which the purchaser identifying information is linked as in FIG. 30. In FIG. 30, a directed graph (arrow) is directed from the purchaser identifying information (node) of a purchaser who made the purchase at a later stage to the purchaser identifying information (node) of a purchaser who made the purchase at an earlier stage. This directed graph information is expressed as information of a matrix (M) as shown in FIG. 31. In FIG. 31, in the matrix (M), a row indicates a source of the link, and a column indicates a destination of the link. For example, "E→B" is expressed as the element value "1" at the $5^{th}$ row, the $2^{nd}$ column. The directed graph information constituting unit 241091 writes information shown in FIG. 31, into the array of 5 rows by 5 columns, and obtains the directed graph information. Herein, the initial values of all the elements in the array of 5 rows by 5 columns are "0".

Next, the trend leader degree calculating unit 241092 initializes the trend leader degree vector, and obtains a trend leader degree vector (TL) "$(1\ 1\ 1\ 1\ 1)^T$. Herein, the symbol "T" in the vector indicates transposition. Furthermore, the trend follower degree calculating unit 241093 initializes the trend follower degree vector (TF), and obtains "$(1\ 1\ 1\ 1\ 1)^T$".

Next, the trend follower degree calculating unit 241093 obtains the next trend follower degree vector, using the directed graph information (matrix (M)) and the current trend leader degree vector (TL). Herein, for example, the trend follower degree calculating unit 241093 obtains the next trend follower degree vector (TF), following "TF=M·TL, TF=TF/|TF|". More specifically, the trend follower degree calculating unit 241093 multiples the directed graph information (matrix (M)) and the trend leader degree vector (TL) using matrix multiplication, obtains a vector "$(2\ 1\ 1\ 2\ 2)^T$" obtained in the calculation process of the next trend follower degree vector, and arranges the information on the memory. Then, the trend follower degree calculating unit 241093 divides the vector "$(2\ 1\ 1\ 2\ 2)^T$" by its absolute value (|TF|), and obtains the next trend follower degree vector (TF). The next trend follower degree vector (TF) is "$(0.53\ 0.27\ 0.27\ 0.53\ 0.53)^T$" (FIG. 32(1), (3)).

Next, the trend leader degree calculating unit 241092 obtains the trend leader degree vector (TL), using the directed graph information (matrix (M)) and the trend follower degree vector "$(2\ 1\ 1\ 2\ 2)^T$" obtained in the calculation process. More specifically, herein, the trend leader degree calculating unit 241092 obtains the next trend leader degree vector, following "TL=$M^T$·TF, TL=TL/|TL|". The trend leader degree calculating unit 241092 multiplies the transposed directed graph information (matrix (M)) and the trend follower degree vector ($(2\ 1\ 1\ 2\ 2)^T$) using matrix multiplication, and obtains a trend leader degree vector "$(1\ 7\ 2\ 4\ 0)^T$" (FIG. 32(1), (2)).

Then, the trend leader degree calculating unit 241092 divides the vector "$(1\ 7\ 2\ 4\ 0)^T$" by its absolute value (|TL|), and arranges the next trend leader degree vector "$(0.12\ 0.84\ 0.24\ 0.48\ 0.0)^T$" on the memory (FIG. 32(4)).

Next, in a similar manner, the trend follower degree calculating unit 241093 calculates the next trend follower degree vector (FIG. 32(5), (7)). Then, the trend follower degree calculating unit 241093 arranges the next trend follower degree vector "$(0.57\ 0.052\ 0.36\ 0.47\ 0.57)^T$" on the memory (FIG. 32(7)).

Then, the trend follower degree calculating unit 241093 calculates 'previous trend follower degree vector−current trend follower degree vector', and judges whether or not this value is smaller than a predetermined value (ε "ε is 0.001, for example"). That is to say, the trend follower degree calculating unit 241093 judges whether or not the trend follower degree vector has converged.

If the trend follower degree calculating unit 241093 judges that the vector has converged, the processing is ended. If it is judged that the vector has not converged, the processing as described above is continuously performed until the vector has converged. It is herein assumed that the trend follower degree vector has converged when it has become the value shown in FIG. 32(9).

Furthermore, the trend leader degree calculating unit 241092 also calculates the next trend leader degree vector (FIG. 32(6), (8)). Then, the trend leader degree calculating unit 241092 arranges the next trend leader degree vector "$(0.022\ 0.85\ 0.20\ 0.49\ 0.0)^T$" on the memory (FIG. 32(8)).

Then, the trend leader degree calculating unit 241092 calculates |previous trend leader degree vector−current trend leader degree vector|, and judges whether or not this value is smaller than a predetermined value (ε "ε is 0.001, for example"). That is to say, the trend leader degree calculating unit 241092 judges whether or not the trend leader degree vector has converged.

If the trend leader degree calculating unit 241092 judges that the vector has converged, the processing is ended. If it is judged that the vector has not converged, the processing as described above is continuously performed until the vector has converged. It is herein assumed that the trend leader degree vector has converged when it has become the value shown in FIG. 32(10).

Through the above-described calculation, the trend leader detecting portion 24109 obtains the trend leader degree and the trend follower degree of each purchaser shown in FIG. 33.

Herein, in the description above, the directed graph information constituting unit 241091 constituted the directed graph information in consideration only of link of the purchaser identifying information using the purchase time information, without considering the order of purchase or the time of purchase. This point is clearly shown by the fact that the network structure in FIG. 30 is constituted from the network in the "purchaser identifying information" in FIG. 29.

However, the directed graph information constituting unit 241091 may constitute the directed graph information in consideration of the order of purchase. For example, if the product [1] was purchased in the order "A→B→C→D", then the directed graph information constituting unit 241091 may perform weighting in consideration of this order (for example, perform multiplication by a constant 0.9) in such a manner that a weight of "1" is assigned to "A←B", a weight of "0.9" is assigned to "B←C", and a weight of "0.81" is assigned to "C←D". Herein, "1", "0.9", and "0.81" constitute element values of the directed graph information (matrix).

Furthermore, the directed graph information constituting unit 241091 may constitute the directed graph information in consideration of the time of purchase. For example, if the product [1] was purchased in the order and at the time "A (time ta)→B (time tb)→C (time tc)→D (time td)", then element values of the directed graph information (matrix) may be calculated with weighting that uses a forgetting factor "$e^{-t}$".

In addition to the above, various algorithms are conceivable with which the directed graph information constituting unit 241091 constitutes information of the directed graph. The directed graph information constituting unit 241091 is required only to read two or more pieces of purchase history information from the purchase history information storage portion 1104, acquire the purchaser identifying information and the purchase time information corresponding to the product or service identifying information indicating each of one or more products etc., and constitute information of a directed graph in which the two or more pieces of purchaser identifying information are linked in the order of the purchase time according to the two or more pieces of purchase time information that have been acquired. This directed graph information may be information having weighted values, as described above.

In this case, it is assumed that a user identified with purchaser identifying information X purchased a product identified with product or service identifying information [4]. More specifically, the information output apparatus 12 of this user transmits purchase information having the purchaser identifying information X and the product or service identifying information [4], to the server apparatus 241.

Next, the purchase information receiving portion 1105 of the server apparatus 241 receives the purchase information having the purchaser identifying information X and the product or service identifying information [4]. Then, the purchase history information accumulating portion 1106 accumulates the purchase history information of purchase of a product or service with the product or service identifying information [4], of the user identified with the purchaser identifying information X. Next, the purchase history information accumulating portion 1106 acquires the purchaser identifying information X, from the purchase information that has been received by the purchase information receiving portion 1105, and temporarily stores the purchaser identifying information in the user identifying information storage portion 1107.

Next, the recommended product or service acquiring portion 241010 acquires the product or service identifying information [4] of the product or service purchased by the user X, from the received purchase information.

Next, the recommended product or service acquiring portion 241010 searches the purchase history information management table in FIG. 28, using the acquired product or service identifying information [4] as a key, acquires all the purchaser identifying information of the other purchasers who purchased the product or service specified with the product or service identifying information, and arranges the information on the memory. It is herein assumed that the acquire purchaser identifying information is "B", "D", and "E".

Next, the recommended product or service acquiring portion 241010 acquires the trend leader degrees "0.85", "0.50", and "0.0" of the purchasers identified with the acquired purchaser identifying information "B", "D", and "E", determined the purchaser identifying information "B" corresponding to the highest trend leader degree, and arranges the purchaser identifying information "B" on the memory.

Next, the recommended product or service acquiring portion 241010 searches the purchase history information management table in FIG. 28, acquires all the product or service identifying information [1], [3], [4], and [5] for identifying products etc. purchased by the purchaser identified with the acquired purchaser identifying information "B", which is the trend leader, and arranges the information on the memory. Then, the recommended product or service acquiring portion 241010 searches the purchase history information management table in FIG. 28, acquires one or more pieces of product or service identifying information (only [4], in this example) for identifying all the products etc. purchased by the user X targeted for recommendation, and arranges the information on the memory. Then, among the product or service identifying information for identifying the products etc. that have been purchased by the trend leader, the product or service identifying information [1], [3], and [5] for identifying the products etc. that have not been purchased by the user targeted for recommendation is acquired and arranged on the memory. Herein, this product or service identifying information [1], [3], and [5] is information for identifying a recommended product or service.

Next, the trend leader output portion 1112 performs the above-described trend leader processing.

Then, the recommended product or service transmitting portion 1111 constitutes information that is to be transmitted, using each of the three pieces of product or service identifying information [1], [3], and [5] that have been acquired. Typically, the trend leader output portion 1112 searches the product or service information management table, using each of the three pieces of product or service identifying information [1], [3], and [5] as a key, acquires information necessary for recommendation (such as the product name, price, or other product attributes, or bitmap data or the like of the product), and constitutes information that is to be transmitted. Then, the recommended product or service transmitting portion 1111 transmits the constituted information to the information output apparatus 12 in order to recommend the product for the user X.

As described above, according to this embodiment, the trend leader degrees of users can be calculated. Furthermore, the trend leader can be detected as appropriate using the trend leader degrees. As a result, a product or service that is preferable for the user can be recommended.

Also, according to this embodiment, the trend follower degrees can be calculated. Furthermore, the trend leader can be detected as appropriate using the trend follower degrees and the trend leader degrees. As a result, a product or service that is preferable for the user can be recommended.

Herein, in the specific example of this embodiment, products etc. that have been purchased by the trend leader and that have not been purchased by the user were recommended. However, there is no limitation on the algorithm for determining the recommended product or service That is to say, products etc. recently purchased by the trend leader may be recommended.

Furthermore, in this embodiment, there is no limitation on the timing at which the product or service is recommended. As described in Embodiment 3, when a user who is not the trend leader accesses, for example, the server apparatus, a product purchased by the trend leader may be immediately recommended. Furthermore, when the trend leader purchases a product or service, other users may be immediately notified of the purchased product or service Software that implements the information processing apparatus in this embodiment may be a following program. Specifically, this program is a program for causing a computer to function as: a trend leader detecting portion that reads at least two pieces of purchase history information from a purchase history information storage portion in which at least two pieces of purchase history information of at least two purchasers are stored, the purchase history information being information indicating purchase history of a product or service that is a product or service, and having purchaser identifying information for identifying a purchaser, product or service identifying information for identifying a product or service, and purchase time information indicating a purchase time of a product or service, detects purchaser identifying information for identifying a trend leader who purchased at least one product or service at an early stage satisfying a predetermined time condition, from the at least two pieces of product or service identifying information and purchase time information contained in the at least two pieces of purchase history information, acquires the purchaser identifying information from the at least two pieces of purchase history information, and stores the purchaser identifying information in a storage medium; a recommended product or service acquiring portion that acquires at least one piece of product or service identifying information for identifying a product or service purchased by at least one purchaser identified with the at least one piece of purchaser identifying information that has been acquired by the trend leader detecting portion, from the purchase history information storage portion, and stores the product or service identifying information in a storage medium; and a recommended product or service transmitting portion that transmits the at least one piece of product or service identifying information that has been acquired by the recommended product or service acquiring portion, to an information output apparatus.

Furthermore, in the above-described program, it is preferable that the computer functions such that the trend leader detecting portion comprises: a directed graph information constituting unit that reads at least two pieces of purchase history information from the purchase history information storage portion, acquires the purchaser identifying information and the purchase time information corresponding to the product or service identifying information indicating each of at least one product or service, and constitutes information of a directed graph in which the at least two pieces of purchaser identifying information are linked in the order of the purchase time according to the at least two pieces of purchase time information that have been acquired; a trend leader degree calculating unit that calculates, for each piece of purchaser identifying information, a trend leader degree, which is information indicating a degree of being a link origin and a degree of being a trend source, from the directed graph information that has been constituted by the directed graph information constituting unit, and stores the trend leader degree in a storage medium; and a purchaser identifying information acquiring unit that acquires purchaser identifying information for identifying a trend leader having a high degree of being the trend source, using the trend leader degree of each piece of purchaser identifying information that has been calculated by the trend leader degree calculating unit, from the at least two pieces of purchase history information, and stores the purchaser identifying information in a storage medium.

Moreover, in the above-described program, it is preferable that the computer functions such that the trend leader detecting portion further comprises a trend follower degree calculating unit that calculates, for each piece of purchaser identifying information, a trend follower degree, which is information indicating a degree of following a link origin and a degree of following a trend, from the directed graph information that has been constituted by the directed graph information constituting unit, and stores the trend follower degree in a storage medium, and the purchaser identifying information acquiring unit acquires purchaser identifying information for identifying a trend leader having a high degree of being the trend source, using the trend leader degree of each piece of purchaser identifying information that has been calculated by the trend leader degree calculating unit and the trend follower degree of each piece of purchaser identifying information that has been calculated by the trend follower degree calculating unit, from the at least two pieces of purchase history information, and stores the purchaser identifying information in a storage medium.

Embodiment 5

In this embodiment, an information processing apparatus for managing behavior information, and outputting information regarding characteristics (a leading degree or a delaying degree) of a user in relative to other users, using the behavior information will be described. The behavior information is information indicating a history of events in which a target is processed by a user performing a behavior on the target. The behavior information is information having user identifying information for identifying a user, target identifying information for identifying a target, and time information indicating when a behavior occurred.

Figure 34:
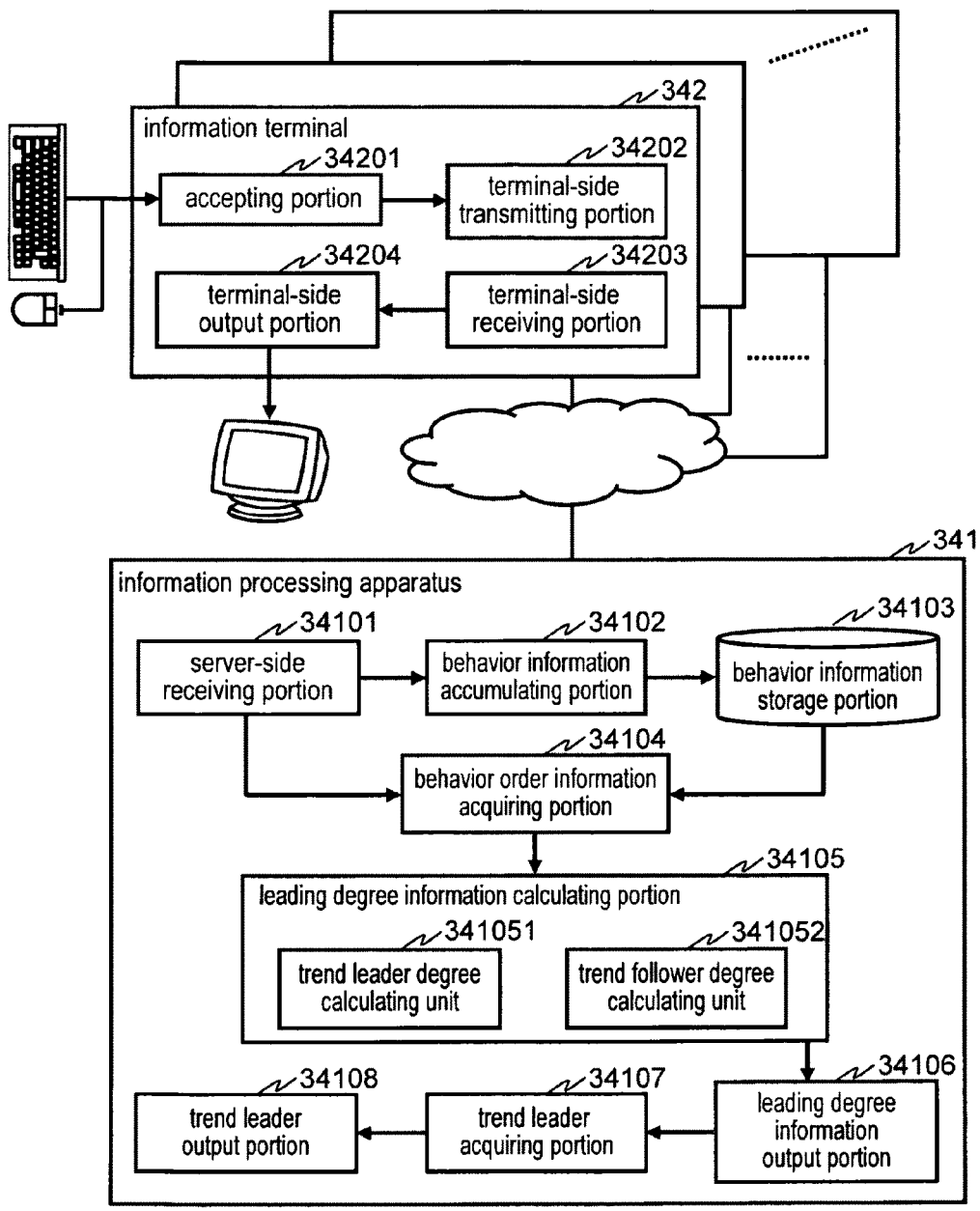
FIG. 34 is a block diagram of an information processing system in Embodiment 5.

FIG. 34 is a block diagram of the information processing system in this embodiment. The information processing system is provided with one information processing apparatus 341 and two or more information terminals 342. Herein, it is assumed that one or more users operate the information terminals 342 and access the information processing apparatus 341. The information processing apparatus 341 is, for example, a server apparatus on the web. The information terminals 342 may be, for example, a so-called notebook computer or mobile phone. The information terminals 342 may be any terminal that can communicate with the information processing apparatus 341.

The information processing apparatus 341 is provided with a server-side receiving portion 34101, a behavior information accumulating portion 34102, a behavior information storage portion 34103, a behavior order information acquiring portion 34104, a leading degree information calculating portion 34105, a leading degree information output portion 34106, a trend leader acquiring portion 34107, and a trend leader output portion 34108.

The leading degree information calculating portion 34105 is provided with a trend leader degree calculating unit 341051 and a trend follower degree calculating unit 341052.

The information terminal 342 is provided with an accepting portion 34201, a terminal-side transmitting portion 34202, a terminal-side receiving portion 34203, and a terminal-side output portion 34204.

The server-side receiving portion 34101 receives behavior information, various instructions and data, and the like, from the information terminals 342. The behavior information is information indicating a history of events in which a target is processed by a user performing a behavior on the target. The behavior information has user identifying information, target identifying information, and time information. The user identifying information is information for identifying a user. The behavior may be any behavior, such as purchase of a product or service, rental of a product, entry to a location (such as an attraction in an amusement park), visit to a location, region, country, or the like, a comment to an article, a hyperlink or trackback to information, or a vote for a favorite movie (or a political party/politician, or popular personality). The target identifying information is information for identifying a target, and refers to a target ID, or a target name, for example. The target includes any target on which any behavior is to be performed, such as information of a product, service, location, scenic beauty, region, country, article, or the like, or people. The time information is information indicating when a behavior occurred. The time information may be given by the information processing apparatus 341, or may be given by the information terminals 342. The time information may be constituted only by the date, or may be information having the time and date. There is no limitation on the form of the time information. The user identifying information is, for example, the user ID, name, mail address, or the ID of the user's information terminal (such as the IP address, the telephone number, the MAC address, etc.). Furthermore, examples of the instruction include a leading degree information output instruction, which is an instruction to output leading degree information, and a trend leader output instruction, which is an instruction to output information indicating a trend leader. Herein, the behavior information that is received by the server-side receiving portion 34101 does not have to have the time information. In this case, the information processing apparatus 341 acquires time information indicating the time (such as the time at which the server-side receiving portion 34101 received information), using an unshown unit, and writes the information as the time information of the behavior information. Herein, the information processing apparatus 341 acquires the time information from its clock or an external apparatus.

If the server-side receiving portion 34101 receives the behavior information, the behavior information accumulating portion 34102 accumulates the behavior information in the behavior information storage portion 34103.

In the behavior information storage portion 34103, two or more pieces of behavior information are stored. The behavior information storage portion 34103 is preferably a non-volatile storage medium, but can be implemented also as a volatile storage medium.

The behavior order information acquiring portion 34104 acquires behavior order information. More specifically, the behavior order information acquiring portion 34104 reads two or more pieces of behavior information from the behavior information storage portion 34103. Next, the behavior order information acquiring portion 34104 acquires behavior order information, which is information regarding the order of the behavior performed by the two or more users on the target identified with the target identifying information, from the target identifying information and the time information contained in each of the two or more pieces of behavior information, and arranges the information on the memory. The behavior order information is information of a directed graph constituted by the order of the time indicated by the time information that is contained in the behavior information, and there is no limitation on the form. The form may be a matrix, or may be link information. The link information is information in which the behavior information is linked in the order of the time indicated by the time information. Herein, in the case where the behavior information is linked, the link may be a link that connects the behavior information in either ascending order or descending order. A specific example of the behavior order information will be described later.

The leading degree information calculating portion 34105 calculates leading degree information. The leading degree information is information regarding a leading degree or delaying degree of a user. More specifically, the leading degree information calculating portion 34105 calculates leading degree information using the behavior order information that has been acquired by the behavior order information acquiring portion 34104, by substituting the behavior order information for a predetermined formula, and arranges the information on the memory. The leading degree information is, for example, either one of, or both of, a trend leader degree and a trend follower degree. The trend leader degree is information indicating a degree of being an origin of a behavior performed on the same target by multiple users and a degree of being a trend source of the users. The trend follower degree is information indicating a degree of following an origin of a behavior performed on the same target by multiple users and a degree of following a trend. A specific example of the leading degree information, the trend leader degree, or the trend follower degree will be described later.

The trend leader degree calculating unit 341051 calculates the trend leader degree for each of the two or more users, by substituting the two or more pieces of behavior order information that have been acquired by the behavior order information acquiring portion 34104, for a predetermined formula, and arranges the information on the memory. A specific example of a method for calculating the trend leader degree will be described later.

The trend follower degree calculating unit 341052 calculates the trend follower degree for each of the two or more users, by substituting the two or more pieces of behavior order information that have been acquired by the behavior order information acquiring portion 34104, for a predetermined formula, and arranges the information on the memory. A specific example of a method for calculating the trend follower degree will be described later.

The leading degree information output portion 34106 outputs the leading degree information that has been calculated by the leading degree information calculating portion 34105. The leading degree information output portion 34106 outputs, for example, at least one of the trend leader degree and the trend follower degree. Herein, the term "output" has a concept that includes displaying on a display screen, printing in a printer, outputting a sound, transmission to an external apparatus, and transmission of data to other processing. Herein, other processing is, for example, processing of recommending a product or service, or processing of outputting rankings of the trend leader degree and the trend follower degree. The processing of recommending a product or service is, for example, processing of reading information of the product or service recently purchased by the user having the highest trend leader degree, from the behavior information storage portion 34103, and transmitting the information of the product or service to the information terminals 342. Alternatively, the processing of recommending a product or service may be, for example, processing of reading information of the product or service purchased by a user having a trend leader degree higher than that of a certain user, from the behavior information storage portion 34103, and transmitting the information of the product or service to the information terminals 342. When recommending a product or service, it is possible to select various users by whom a product or service that is to be recommended was purchased. More specifically, when recommending a product or service, information regarding one or more of the trend leader degree and the trend follower degree may be used. The processing of outputting rankings of the trend leader degree and the trend follower degree is processing of sorting the user identifying information using the trend leader degree and the trend follower degree as a key, and transmitting the sorting results to the information terminals 342. Herein, a description will be given assuming that the leading degree information output portion 34106 transmits the leading degree information to the trend leader acquiring portion 34107.

The trend leader acquiring portion 34107 accepts the leading degree information that has been output by the leading degree information output portion 34106, and acquires user identifying information for identifying a trend leader, which is a user who performs a behavior at an early stage satisfying a predetermined time condition, using the leading degree information. The trend leader acquiring portion 34107 may acquire user identifying information paired with the highest trend leader degree, may acquire user identifying information having the top three trend leader degrees, or may acquire user identifying information paired with a trend leader degree higher than a predetermined threshold value. Furthermore, the trend leader acquiring portion 34107 may determine an ability of users to create a trend, using both of the trend leader degree and the trend follower degree, and acquire the user identifying information of a user matching a predetermined condition (for example, judged to have the highest ability to create a trend).

The trend leader output portion 34108 outputs the user identifying information that has been acquired by the trend leader acquiring portion 34107. Herein, the term "output" has a concept that includes displaying, printing, outputting a sound, transmission to an external apparatus, and transmission of data to other processing. Herein, other processing is, for example, processing of recommending a product or service, or processing of providing a user identified with the user identifying information with a notification to that effect. The processing of recommending a product or service is processing of reading information of a product or service purchased by a user (trend leader) identified with the user identifying information, from the behavior information storage portion 34103, and transmitting the information of the product or service to the information terminals 342.

The accepting portion 34201 accepts various instructions from the user, behavior information, various types of data, and the like. The various instructions, the behavior information, and the like may be input using any input unit, such as a numeric keypad, a keyboard, a mouse, or a menu screen. The accepting portion 34201 can be implemented as a device driver of an input unit such as a numeric keypad or a keyboard, or control software for a menu screen, for example.

The terminal-side transmitting portion 34202 transmits the behavior information, the various types of data, and the like that have been accepted by the accepting portion 34201, to the information processing apparatus 341, according to the accepted instructions.

The terminal-side receiving portion 34203 receives the user identifying information and the like from the information processing apparatus 341. Furthermore, the terminal-side receiving portion 34203 may receive the leading degree information (the trend leader degree, the trend follower degree, and the like) of the user from the information processing apparatus 341.

The terminal-side output portion 34204 outputs the user identifying information or the leading degree information that has been received by the terminal-side receiving portion 34203, information that has been input by the user, or the like. The terminal-side output portion 34204 may or may not include an output device such as a display screen and a loudspeaker. The terminal-side output portion 34204 can be implemented as driver software for an output device, or a combination of driver software for an output device and the output device, for example.

Typically, the behavior information accumulating portion 34102, the behavior order information acquiring portion 34104, the leading degree information calculating portion 34105, and the trend leader acquiring portion 34107 can be implemented, for example, as an MPU or a memory. Typically, the processing procedure of the behavior information accumulating portion 34102 and the like is implemented by software, and the software is stored in a storage medium such as a ROM. Note that the processing procedure also may be implemented by hardware (dedicated circuit).

The server-side receiving portion 34101, the leading degree information output portion 34106, the trend leader output portion 34108, the terminal-side transmitting portion 34202, and the terminal-side receiving portion 34203 can be implemented, for example, as a wireless or wired communication unit, but also may be implemented as a broadcasting unit.

Next, the operation of the information processing system will be described. First, the operation of the information processing apparatus 341 will be described with reference to the flowchart in FIG. 35.

(Step S3501) The server-side receiving portion 34101 judges whether or not the behavior information has been received. If the behavior information has been received, the procedure proceeds to step S3502. If the behavior information has not been received, the procedure proceeds to step S3503.

(Step S3502) The behavior information accumulating portion 34102 additionally writes the behavior information that has been received in step S3501, in the behavior information storage portion 34103. The procedure proceeds to step S3501.

(Step S3503) The server-side receiving portion 34101 judges whether or not a leading degree information output instruction, which is an instruction to output leading degree information, has been received. If the leading degree information output instruction has been received, the procedure proceeds to step S3504. If the leading degree information output instruction has not been received, the procedure proceeds to step S3506.

(Step S3504) The leading degree information calculating portion 34105 calculates the leading degree information. The processing of calculating the leading degree information is similar to the processing described with reference to the flowcharts in FIGS. 25 and 26. It should be noted that the directed graph information constituting unit 241091 corresponds to the behavior order information acquiring portion 34104. Furthermore, the purchase history information storage portion 1104 corresponds to the behavior information storage portion 1103. The purchase history information corresponds to the behavior information. The trend leader degree calculating unit 241092 corresponds to the trend leader degree calculating unit 341051. The trend follower degree calculating unit 241093 corresponds to the trend follower degree calculating unit 341052.

(Step S3505) The leading degree information output portion 34106 transmits the leading degree information that has been calculated in step S3504, to the information terminal 342 that has transmitted the leading degree information output instruction. The procedure returns to step S3501.

(Step S3506) The server-side receiving portion 34101 judges whether or not a trend leader output instruction, which is an instruction to output information indicating a trend leader, has been received. If the trend leader output instruction has been received, the procedure proceeds to step S3507. If the trend leader output instruction has not been received, the procedure returns to step S3501.

(Step S3507) The leading degree information calculating portion 34105 calculates the leading degree information. The processing of calculating the leading degree information is similar to the processing described with reference to the flowcharts in FIGS. 25 and 26.

(Step S3508) The trend leader acquiring portion 34107 reads a trend leader condition, which is information indicating a condition for extracting the user identifying information as the information indicating a trend leader. It is herein assumed that in the trend leader acquiring portion 34107, for example, the trend leader condition is stored in advance. Herein, the trend leader acquiring portion 34107 also may dynamically determine the trend leader condition.

(Step S3509) The trend leader acquiring portion 34107 acquires the user identifying information of a user matching the trend leader condition that has been read in step S3508. A specific example of the processing of acquiring the user identifying information will be described later. Herein, the trend leader acquiring portion 34107 typically applies the leading degree information (information regarding one or more of the trend leader degree and the trend follower degree) of each user to the trend leader condition, and judges whether or not the leading degree information matches the trend leader condition. Then, the trend leader acquiring portion 34107 reads the user identifying information paired with the leading degree information that matches the trend leader condition.

(Step S3510) The trend leader output portion 34108 transmits the user identifying information that has been acquired in step S3509, to the information terminal 342. The procedure returns to step S3501.

Figure 35:
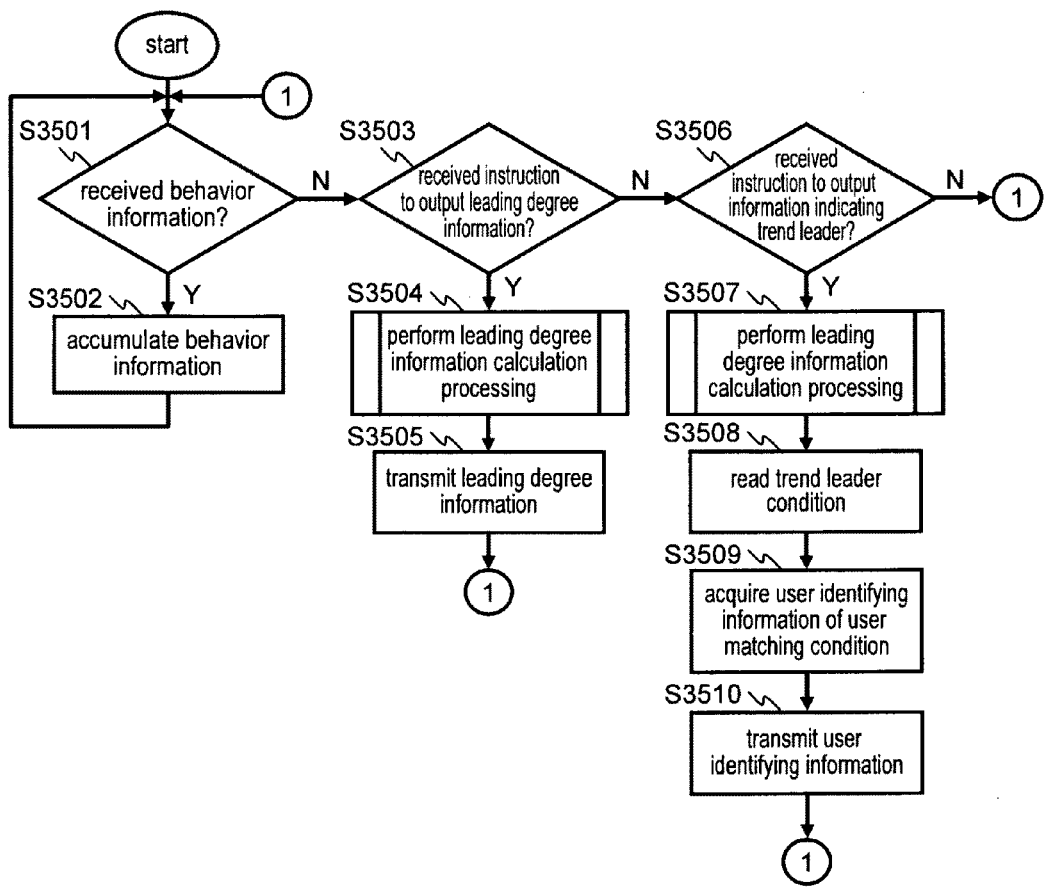
FIG. 35 is a flowchart illustrating an operation of an information processing apparatus in the information processing system.

Herein, in the flowchart in FIG. 35, processing corresponding to an instruction other than the leading degree information output instruction or the trend leader output instruction also may be performed.

Note that the processing is ended by powering off or interruption for aborting the processing in the flowchart in FIG. 35.

Next, the operation of the information terminal 342 will be described. The accepting portion 34201 of the information terminal 342 accepts various instructions from the user, behavior information, various types of data, and the like. Then, the terminal-side transmitting portion 34202 transmits the behavior information, the various types of data, and the like that have been accepted by the accepting portion 34201, to the information processing apparatus 341, according to the accepted instructions. Next, the terminal-side receiving portion 34203 receives, for example, the user identifying information and the leading degree information from the information processing apparatus 341, according to the various instructions that have been transmitted by the terminal-side transmitting portion 34202. The terminal-side output portion 34204 outputs the user identifying information and the leading degree information that have been received by the terminal-side receiving portion 34203. Herein, the above-described operation of the information terminal 342 is well known, and thus a detailed description thereof has been omitted.

Hereinafter, a specific operation of the information processing apparatus in this embodiment will be described. FIG. 1 is a conceptual diagram of the information processing system.

It is herein assumed that a product or service information management table (hereinafter, also referred to as a "target management table") shown in FIG. 7 is stored in the behavior order information acquiring portion 34104 or an unshown unit. The target management table is a table in which targets are managed. Herein, the targets are products, in particular, articles that are to be worn on the body, such as clothing or shoes. The target management table is a table in which one or more target records, which are information of a product or service for an electronic commercial transaction, are stored. The target management table has "ID", "product or service identifying information", and "product attribute". It is herein assumed that "product or service identifying information" is the same as "target identifying information". It is assumed that "product attribute" is the same as "target attribute". Furthermore, "target identifying information" is information for identifying a target, and refers to a target ID in this example. Note that "target identifying information" also may be a product name or the like, or may be information containing a target attribute described later. In "target attribute", one or more attribute values of a target are stored. The attribute value is "product name", "product category", or "size", for example.

Furthermore, in the behavior information storage portion 34103, a behavior information management table shown in FIG. 28 is stored. Herein, in the behavior information management table, the behavior information, which is information indicating information of the purchase history of a previously purchased product or service, is stored. More specifically, the behavior information is information indicating that a user's behavior of purchasing a product or service has occurred. In the behavior information management table, one of more records having "ID" and "purchase history information" are stored. Herein, "purchase history information" corresponds to the above-described behavior information. Furthermore, the purchaser identifying information in the behavior information management table corresponds to the user identifying information. Furthermore, the product or service identifying information corresponds to the target identifying information. Furthermore, the purchase time information corresponds to the time information. Moreover, the values of the product or service identifying information ([1], [2], [3], . . . ) respectively correspond to [Z-001], [Z-002], [Z-003], . . . .

Furthermore, the behavior information in the behavior information storage portion 34103 is, for example, accumulated through the operation described below. That is to say, it is assumed that the user logs into a site for an electronic commercial transaction, and displays, for example, the website as shown in FIG. 9 on the information terminal 342.

Then, the user purchases any product (presses the button "add to shopping cart", and performs electronic settlement processing). Then, the accepting portion 34201 of the information terminal 342 accepts "target identifying information" indicating a product that is to be purchased. The information terminal 342 constitutes the behavior information, and the terminal-side transmitting portion 34202 transmits the behavior information to the information processing apparatus 341. Herein, the behavior information has the target identifying information, the user identifying information, and the time information. It is assumed that the user inputs the user identifying information, for example, when logging into the site shown in FIG. 9 or performing electronic settlement. Furthermore, it is assumed that the information terminal 342 acquires the time information from its clock when pressing of an unshown purchase determination button is accepted. Herein, it is preferable that the time information is acquired when the information processing apparatus 341 receives the behavior information.

Next, the server-side receiving portion 34101 of the information processing apparatus 341 receives the behavior information. Then, the behavior information accumulating portion 34102 additionally writes the received behavior information, in the behavior information storage portion 34103. Through the above-described processing, the behavior information is accumulated.

Next, it is assumed that the user inputs a leading degree information output instruction, using an input unit of the information terminal 342. Then, the accepting portion 34201 of the information terminal 342 accepts the leading degree information output instruction. Next, the terminal-side transmitting portion 34202 transmits the leading degree information output instruction that has been accepted by the accepting portion 34201, to the information processing apparatus 341.

Next, the server-side receiving portion 34101 of the information processing apparatus 341 receives the leading degree information output instruction. Then, the leading degree information calculating portion 34105 and the like calculate the leading degree information in the following manner. That is to say, first, the behavior order information acquiring portion 34104 reads all of the two or more pieces of behavior information from the behavior information management table in FIG. 28, acquires the user identifying information and the time information corresponding to the target identifying information indicating each of one or more targets, and constitutes information of a directed graph in which the two or more pieces of user identifying information are linked in the order of the time when a behavior occurred according to the two or more pieces of time information that have been acquired. It is herein assumed that the behavior order information acquiring portion 34104 focuses on the order in which users purchased a product etc, and obtains information of the network of the user identifying information for each piece of target identifying information (see FIG. 29). Then, the target identifying information is eliminated from the conceptual diagram in FIG. 29, and thus the behavior order information acquiring portion 34104 constitutes the directed graph information as shown in FIG. 30. This directed graph information is information that links the purchaser identifying information. In FIG. 30, an arrow is directed from the user identifying information of a user who made the purchase at a later stage to the user identifying information of a user who made the purchase at an earlier stage. The user identifying information is nodes in FIG. 30. This directed graph information is expressed as information of a matrix (M) as shown in FIG. 31. In FIG. 31, in the matrix (M), a row indicates a source of the link, and a column indicates a destination of the link. For example, "E→B" is expressed as the element value "1" at the $5^{th}$ row, the $2^{nd}$ column. The behavior order information acquiring portion 34104 writes information shown in FIG. 31, into the array of 5 rows by 5 columns, and obtains the directed graph information. Herein, the initial values of all the elements in the array of 5 rows by 5 columns are "0".

Next, the trend leader degree calculating unit 341051 and the trend follower degree calculating unit 341052 obtain the trend leader degree and the trend follower degree of each user shown in FIG. 33, through the processing described with reference to the flowchart in FIG. 32. This aspect was described in Embodiment 4, and thus a detailed description thereof has been omitted.

Next, the leading degree information output portion 34106 transmits the leading degree information (information regarding one or more of the trend leader degree and the trend follower degree) in FIG. 33 to the information terminal 342. Herein, for example, it is preferable that the leading degree information output portion 34106 processes the leading degree information in FIG. 33 and then transmits the information to the information terminal 342. More specifically, the leading degree information output portion 34106 sorts the user identifying information in descending order of the trend leader degree according to the leading degree information in FIG. 33, ranks the users, and acquires the information "first: B, second: D, third: C, fourth: A, fifth: E". Then, the leading degree information output portion 34106 transmits the information "first: B, second: D, third: C, fourth: A, fifth: E" to the information terminal 342.

According to the above-described processing, the users of the information terminals 342 can be aware of their own degrees of being the trend leader. In this case, it is preferable that the leading degree information output portion 34106 determines (ranks) the order of the leading degree of the users, also considering the trend follower degree.

For example, if the leading degree information output portion 34106 selects the top five trend leaders, an algorithm also may be used in which the user identifying information paired with a trend follower degree that is larger than a predetermined threshold value is not selected. In this case, it is preferable that the leading degree information output portion 34106 selects the user identifying information of the users having the top five trend leader degrees, from among the user identifying information having a trend follower degree that is at the predetermined threshold value or smaller, and transmits the information together with their rankings to the information terminal 342.

Next, it is assumed that the user inputs a trend leader output instruction using an input unit of the information terminal 342.

It is assumed that through the above-described processing, the trend leader degree and the trend follower degree of each user shown in FIG. 33 have been calculated.

Next, the trend leader acquiring portion 34107 reads a trend leader condition, which is information indicating a condition for extracting the user identifying information as the information indicating a trend leader (herein, "trend follower degree <=0.5, and trend leader degree >=0.5").

Next, the trend leader acquiring portion 34107 acquires the user identifying information (B, D) of the users matching the read trend leader condition (trend follower degree <=0.5, and trend leader degree >=0.5), from the processing results in FIG. 33.

Then, the trend leader output portion 34108 transmits the acquired user identifying information (B, D) to the information terminal 342.

Next, the terminal-side receiving portion 34203 of the information terminal 342 receives the user identifying information (B, D), and the terminal-side output portion 34204 outputs the user identifying information (B, D) as trend leaders on a display.

As described above, according to this embodiment, the leading degree information (the trend leader degree and the trend follower degree) can be calculated from the behavior history (the behavior information) of multiple users. Furthermore, using the leading degree information, the ranking of the trend leader degree can be calculated, and the trend leader can be detected.

Herein, in this embodiment, the information processing apparatus 341 received the behavior information from the information terminals 342. However, a configuration is also possible in which the information processing apparatus 341 cannot communicate with the information terminals 342, and the behavior information is stored via manual input or a storage medium. In other words, the information processing apparatus 341 alone may process the stored behavior information. At that time, the information processing apparatus 341 may transmit the processing results (such as the leading degree information) to an external apparatus such as the information terminals 342.

Furthermore, in this embodiment, acceptance of the leading degree information output instruction by the accepting portion 34201 acted as a trigger to calculate the leading degree information. However, there is no limitation on the trigger to calculate the leading degree information. More specifically, it is preferable that the information processing apparatus 341 calculates the leading degree information in the background, without an instruction from a user.

Furthermore, in a specific example of this embodiment, the information terminal 342 output information indicating a trend leader on a display. However, as described above, the information of the trend leader (the user identifying information) may be transmitted to other processing. Then, other processing may be performed, such as processing of recommending a product or service, or processing of providing a user identified with the user identifying information with a notification to that effect, for example.

Furthermore, the processing of the information processing apparatus according to this embodiment may be implemented by a computer program or a computer program product.

Embodiment 6

In this embodiment, an information processing apparatus for managing behavior information, and outputting information regarding characteristics (a leading degree or a following degree) of a target such as a product in relative to other targets, using the behavior information will be described. The conceptual diagram of the information processing system according to this embodiment is as shown in FIG. 1. The behavior information is information indicating a history of events in which a target is processed by a user performing a behavior on the target. The behavior information has user identifying information for identifying a user, target identifying information for identifying a target, and time information indicating when a behavior occurred.

Figure 36:
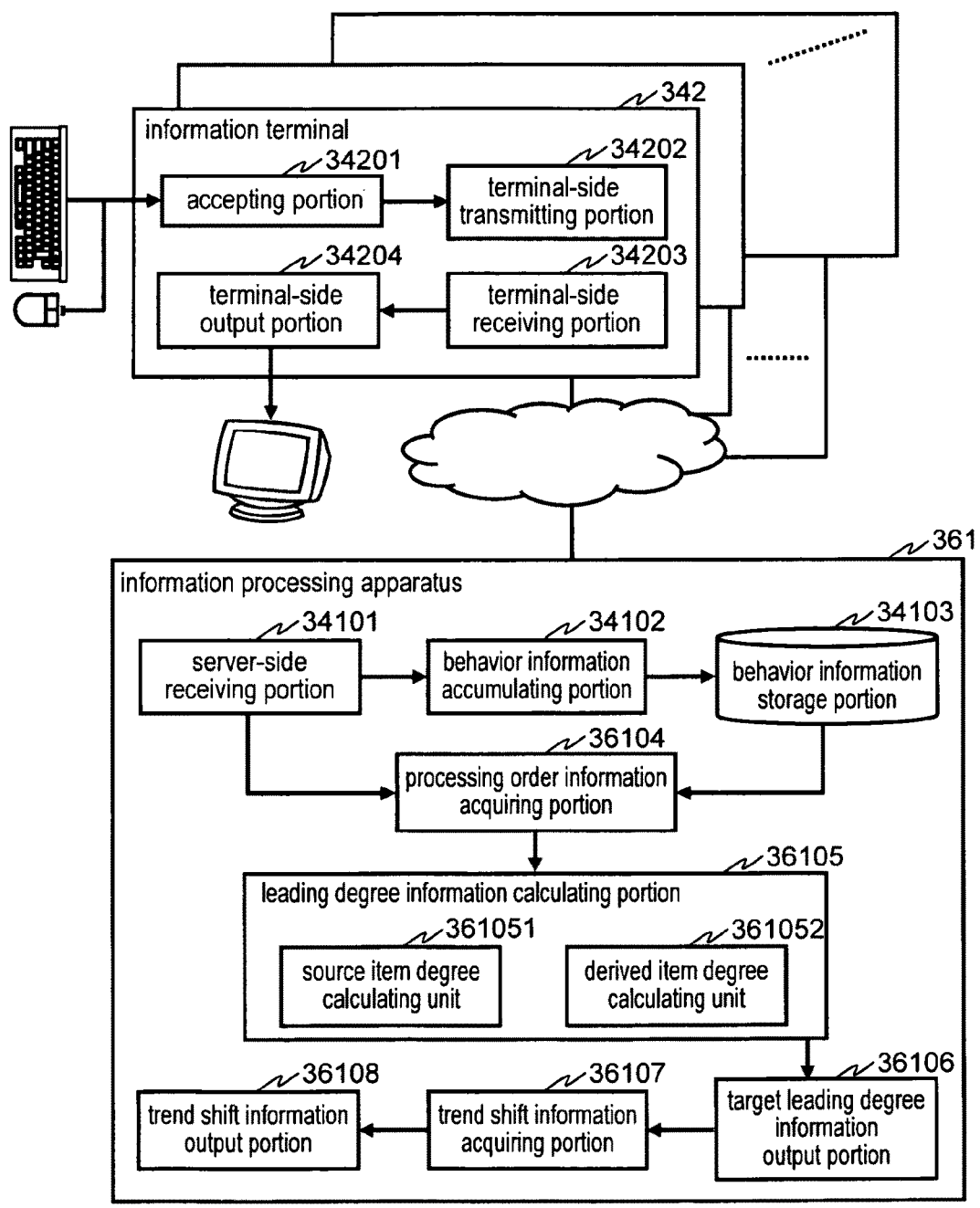
FIG. 36 is a block diagram of an information processing system in Embodiment 6.

FIG. 36 is a block diagram of the information processing system in this embodiment. The information processing system is provided with one information processing apparatus 361 and two or more information terminals 342. The information processing apparatus 361 is provided with the server-side receiving portion 34101, the behavior information accumulating portion 34102, the behavior information storage portion 34103, a processing order information acquiring portion 36104, a leading degree information calculating portion 36105, a target leading degree information output portion 36106, a trend shift information acquiring portion 36107, and a trend shift information output portion 36108.

The leading degree information calculating portion 36105 is provided with a source item degree calculating unit 361051 and a derived item degree calculating unit 361052.

The processing order information acquiring portion 36104 reads two or more pieces of behavior information from the behavior information storage portion 34103, and acquires processing order information, which is information regarding the order of processing performed on the two or more targets by the user identified with the user identifying information, from the user identifying information and the time information contained in each of the two or more pieces of behavior information. The processing order information is information regarding the order of processing performed on two or more targets by a certain user. The processing order information is information of a directed graph constituted by the order of the time indicated by the time information that is contained in the behavior information, and there is no limitation on the form. The form may be a matrix, or may be link information. For example, if a certain user purchased products in the order "disposable camera→APS camera→compact digital camera→digital single-lens reflex camera", the processing order information forms the information sequence "ID for identifying a disposable camera, ID for identifying an APS camera, ID for identifying a compact digital camera, ID for identifying a digital single-lens reflex camera". A further specific example of the processing order information will be described later.

The leading degree information calculating portion 36105 calculates target leading degree information, which is information regarding a leading degree or delaying degree of a target. More specifically, the leading degree information calculating portion 36105 calculates target leading degree information using the processing order information that has been acquired by the processing order information acquiring portion 36104, by substituting the processing order information for a predetermined formula. The leading degree or delaying degree of a target is information regarding a leading degree or delaying degree with respect to a time when the target is processed (purchased, rented, or visited, etc.). More specifically, the leading degree information calculating portion 36105 calculates target leading degree information, which is information regarding a degree at which each target (such as a disposable camera, or a APS camera, etc.) is, for example, purchased at an earlier stage or a later stage, from the target leading degree information of multiple users, such as the target leading degree information "ID for identifying a disposable camera, ID for identifying an APS camera, ID for identifying a compact digital camera, ID for identifying a digital single-lens reflex camera". A specific example of a method for calculating the target leading degree information will be described later. Furthermore, the target leading degree information is, for example, information regarding one or more of a source item degree and a derived item degree described later.

The source item degree calculating unit 361051 calculates the source item degree for each of the two or more targets, by substituting the two or more pieces of processing order information that have been acquired by the processing order information acquiring portion 36104, for a predetermined formula. The source item degree is information indicating a degree of a target being an origin of a behavior performed by the same user on multiple targets and a degree of the target being a hub.

The derived item degree calculating unit 361052 calculates the derived item degree for each of the two or more targets, by substituting the two or more pieces of processing order information that have been acquired by the processing order information acquiring portion 36104, for a predetermined formula. The derived item degree is information indicating a degree of following (being derived from) a target that serves as an origin of a behavior performed by the same user on multiple targets.

The target leading degree information output portion 36106 outputs the target leading degree information. Herein, the term "output" has a concept that includes, for example, displaying on a display screen, printing in a printer, outputting a sound, transmission to an external apparatus, and transmission of the target leading degree information to another processing portion.

The trend shift information acquiring portion 36107 accepts the target leading degree information that has been output by the target leading degree information output portion 36106, and acquires trend shift information, which is information of trend shift as the flow of a behavior performed on targets, using the target leading degree information.

The trend shift information output portion 36108 outputs the trend shift information that has been acquired by the trend shift information acquiring portion 36107. Herein, the term "output" has a concept that includes, for example, displaying on a display screen, printing in a printer, outputting a sound, transmission to an external apparatus, and transmission of the trend shift information to another processing portion.

Typically, the processing order information acquiring portion 36104, the leading degree information calculating portion 36105, and the trend shift information acquiring portion 36107 can be implemented, for example, as an MPU or a memory. Typically, the processing procedure of the processing order information acquiring portion 36104 and the like is implemented by software, and the software is stored in a storage medium such as a ROM. Note that the processing procedure also may be implemented by hardware (dedicated circuit).

The target leading degree information output portion 36106 and the trend shift information output portion 36108 can be implemented as a communication unit, driver software for an output device, or a combination of driver software for an output device and the output device, for example.

Next, the operation of the information processing system will be described. First, the operation of the information processing apparatus will be described with reference to the flowchart in FIG. 37. In the flowchart in FIG. 37, a description of steps similar to those in the flowchart in FIG. 35 has been omitted.

(Step S3701) The server-side receiving portion 34101 judges whether or not a target leading degree information output instruction, which is an instruction to output target leading degree information, has been received from the information terminal 342. If the target leading degree information output instruction has been received, the procedure proceeds to step S3702. If the target leading degree information output instruction has not been received, the procedure proceeds to step S3704.

(Step S3702) The leading degree information calculating portion 34105 calculates the target leading degree information. The processing of calculating the leading degree information will be described in detail with reference to the flowcharts in FIGS. 38 and 39.

(Step S3703) The target leading degree information output portion 36106 transmits the target leading degree information that has been calculated in step S3702, to the information terminal 342. The procedure returns to step S3501.

(Step S3704) The server-side receiving portion 34101 judges whether or not a trend shift information output instruction, which is an instruction to output trend shift of targets such as products, has been received. If the trend shift information output instruction has been received, the procedure proceeds to step S3705. If the trend shift information output instruction has not been received, the procedure returns to step S3501.

(Step S3705) The leading degree information calculating portion 36105 calculates the target leading degree information. The processing of calculating the target leading degree information will be described in detail with reference to the flowcharts in FIGS. 38 and 39.

(Step S3706) The target leading degree information output portion 36106 transmits the target leading degree information that has been calculated in step S3705, to the trend shift information acquiring portion 36107.

(Step S3707) The trend shift information acquiring portion 36107 constitutes trend shift information, from the target leading degree information that has been transmitted in step S3706. An example of a method for constituting the trend shift information will be described later.

(Step S3708) The trend shift information output portion 36108 transmits the trend shift information that has been constituted in step S3707, to the information terminal 342. The procedure returns to step S3501.

Figure 37:
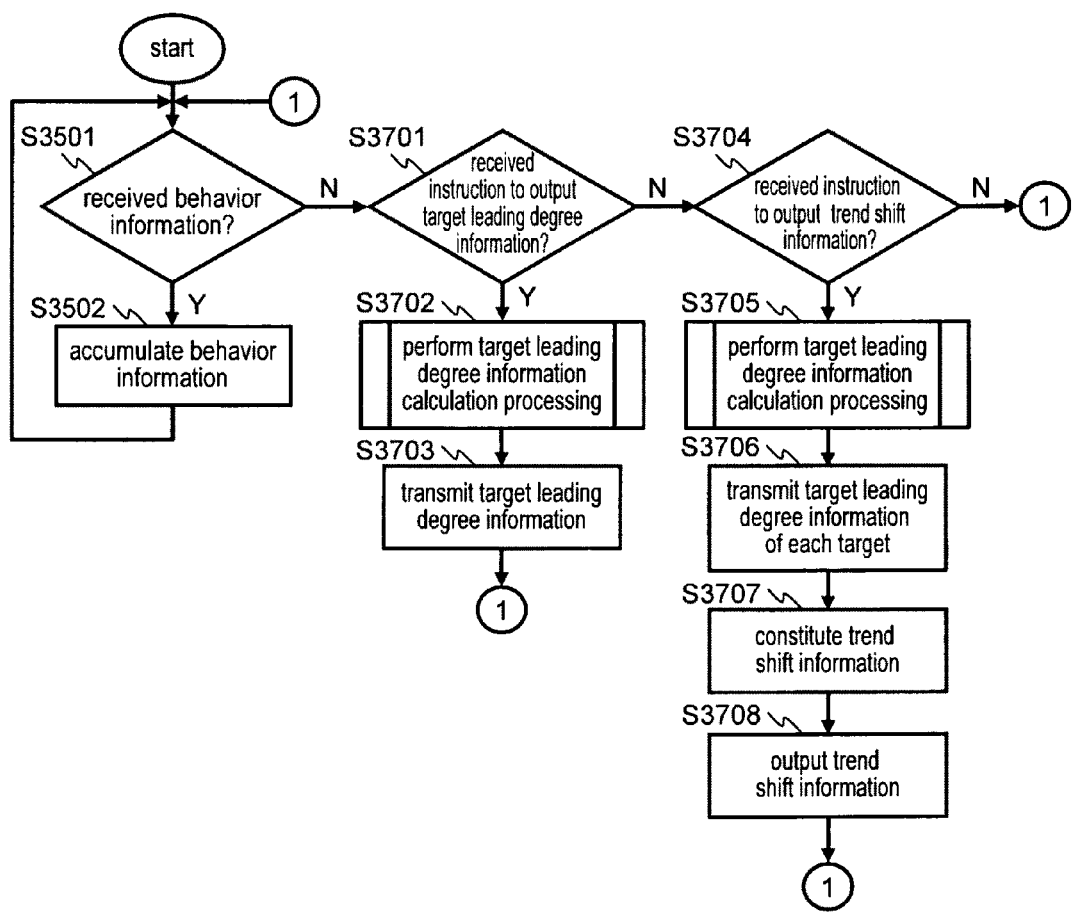
FIG. 37 is a flowchart illustrating an operation of an information processing apparatus in the information processing system.

Note that the processing is ended by powering off or interruption for aborting the processing in the flowchart in FIG. 37.

Next, the processing of calculating the target leading degree in steps S3702 and S3705 will be described in detail with reference to the flowcharts in FIGS. 38 and 39.

(Step S3801) The processing order information acquiring portion 36104 reads all of the two or more pieces of behavior information from the behavior information storage portion 34103, acquires the user identifying information and the time information corresponding to the target identifying information indicating each of one or more targets, and constitutes information of a directed graph in which the two or more pieces of user identifying information are linked in the order of the time when a behavior occurred according to the two or more pieces of time information that have been acquired. An example of the algorithm for constituting the directed graph information will be described with reference to the flowchart in FIG. 39. Herein, the directed graph information has the same meaning as the processing order information.

(Step S3802) The source item degree calculating unit 361051 initializes a source item degree vector. The source item degree vector is vector data in which a source item degree corresponding to each piece of target identifying information serves as an element. The derived item degree calculating unit 361052 initializes a derived item degree vector. The derived item degree vector is vector data in which a derived item degree corresponding to each piece of target identifying information serves as an element.

(Step S3803) The derived item degree calculating unit 361052 substitutes the directed graph information (matrix) that has been obtained in step S3801 and the current source item degree vector for a predetermined formula, and obtains the next derived item degree vector.

(Step S3804) The source item degree calculating unit 361051 substitutes the directed graph information (matrix) that has been obtained in step S3801 and the current derived item degree vector for a predetermined formula, and obtains the next source item degree vector.

(Step S3805) The source item degree calculating unit 361051 and the derived item degree calculating unit 361052 judge whether or not the source item degree and the derived item degree has converged. More specifically, it is judged whether or not "|source item degree vector−next source item degree vector|<$\epsilon$" and "|derived item degree vector−next derived item degree vector|<$\epsilon$" are satisfied. Herein, it is preferable that $\epsilon$ is a very small number such as "0.0001". If the source item degree and the derived item degree has converged, the procedure proceeds to step S3806. If the source item degree and the derived item degree has not converged, the procedure proceeds to step S3807.

(Step S3806) The source item degree calculating unit 361051 and the derived item degree calculating unit 361052 accumulate elements of the next source item degree vector and the next derived item degree vector in a storage medium, as the source item degree and the derived item degree of each user. The procedure returns to the upper processing.

(Step S3807) The source item degree calculating unit 361051 takes the next source item degree vector as the source item degree vector, and substitutes it for a variable in which the source item degree vector is stored.

(Step S3808) The derived item degree calculating unit 361052 takes the next derived item degree vector as the derived item degree vector, and substitutes it for a variable in which the derived item degree vector is stored. The procedure returns to step S3803.

Figure 38:
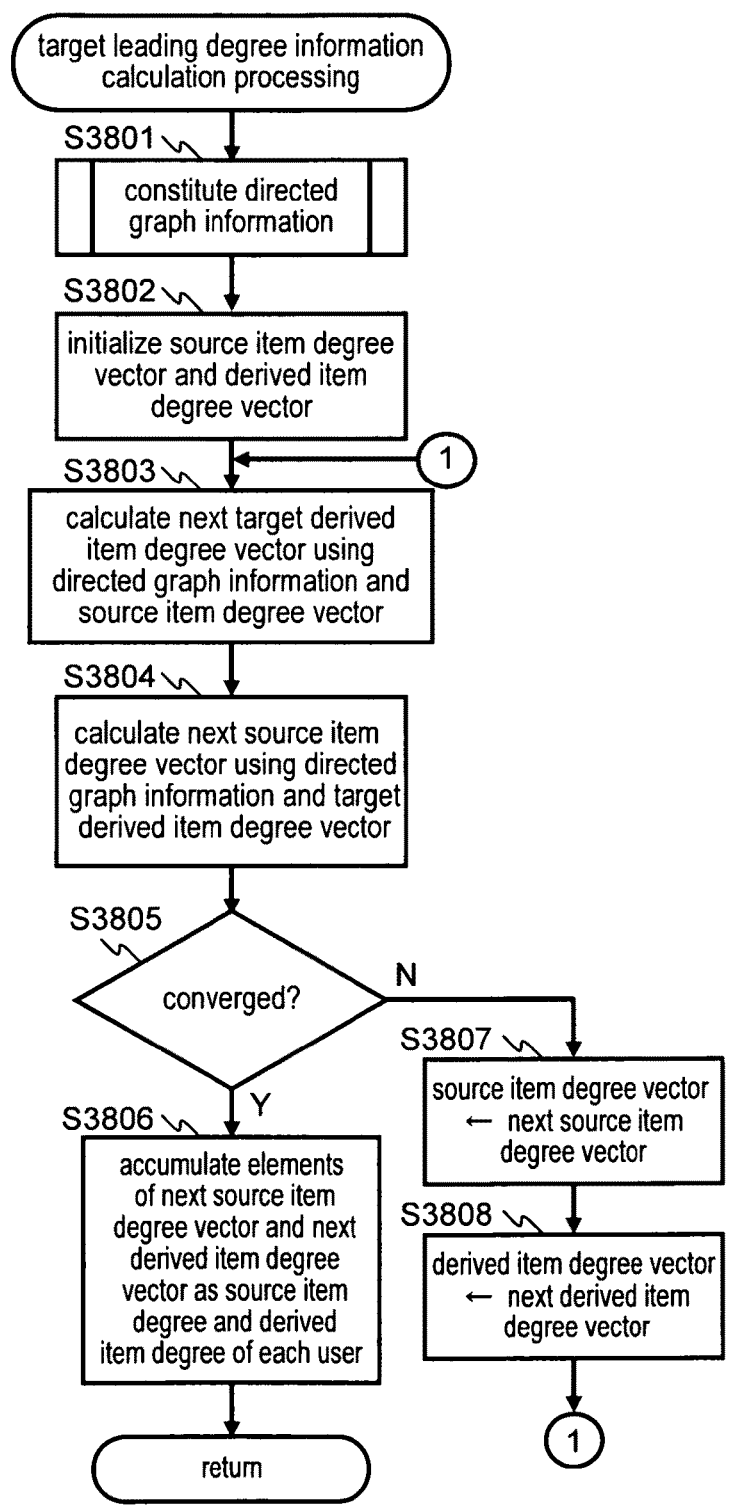
FIG. 38 is a flowchart illustrating processing of calculating target leading degree information in the information processing system.
Figure 39:
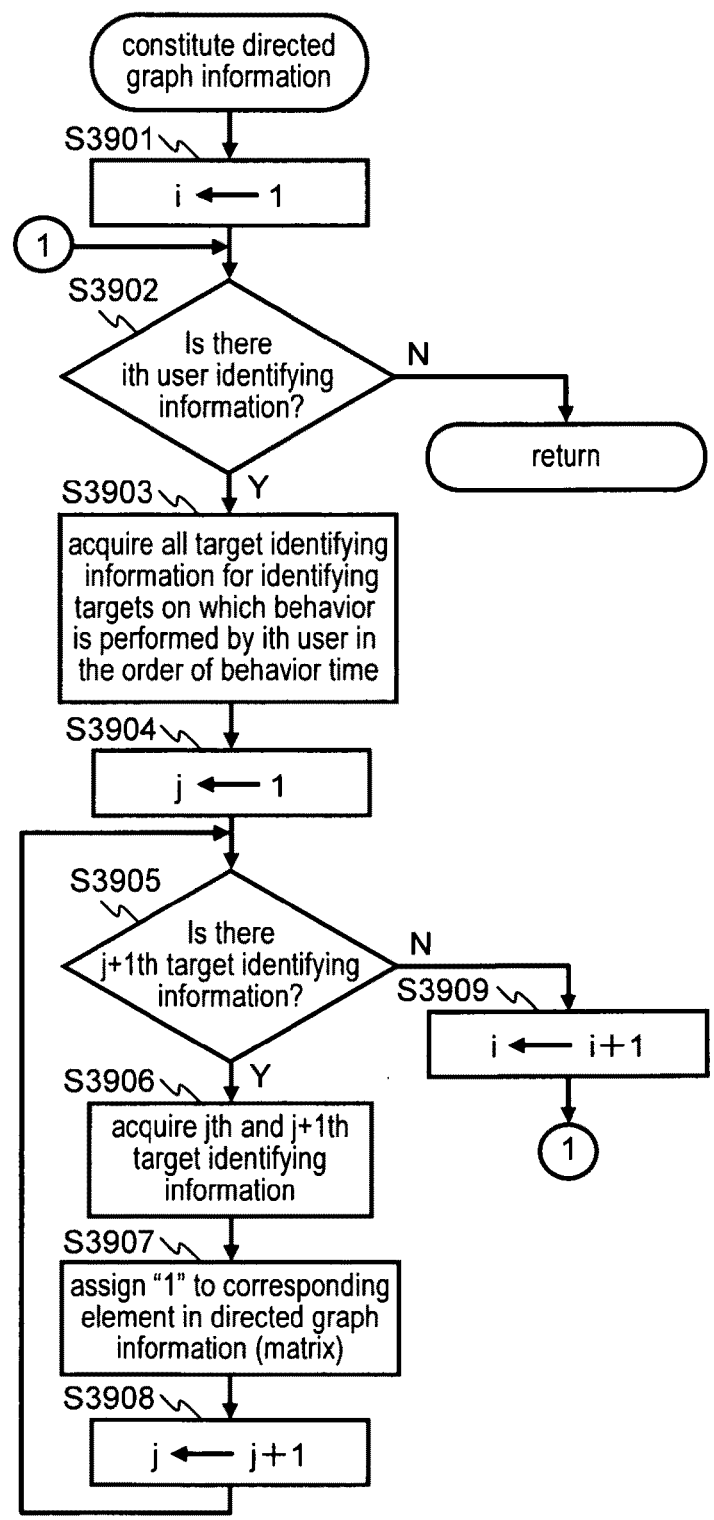
FIG. 39 is a flowchart illustrating an operation of constituting directed graph information in the information processing system.

Herein, in the flowchart in FIG. 38, after the derived item degree was calculated, the source item degree was calculated (step S3803 and step S3804). However, it would be appreciated that there is no limitation on the order in which the derived item degree and the source item degree are calculated.

Next, an example of the algorithm for constituting the directed graph information in step S3801 will be described with reference to the flowchart in FIG. 39.

(Step S3901) The processing order information acquiring portion 36104 substitutes 1 for a counter i.

(Step S3902) The processing order information acquiring portion 36104 judges whether or not the $i^{th}$ user identifying information is present, from the user identifying information contained in the behavior information in the behavior information storage portion 34103. If the $i^{th}$ user identifying information is present, the procedure proceeds to step S3903. If the $i^{th}$ user identifying information is not present, the procedure returns to the upper processing. Herein, the $i^{th}$ user identifying information is the $i^{th}$ unique user identifying information.

(Step S3903) The processing order information acquiring portion 36104 acquires all the target identifying information for identifying targets on which a behavior is performed by the user identified with the $i^{th}$ user identifying information, from the behavior information storage portion 34103, and temporarily stores the information in a memory or the like in the order of the time indicated by the time information. The stored information is a collection of the target identifying information.

(Step S3904) The processing order information acquiring portion 36104 substitutes 1 for a counter j.

(Step S3905) The processing order information acquiring portion 36104 judges whether or not the "j+1"$^{th}$ target identifying information is present in the collection of the target identifying information stored in step S3903. If the "j+1"$^{th}$ target identifying information is present, the procedure proceeds to step S3906. If the "j+1"$^{th}$ target identifying information is not present, the procedure proceeds to step S3909.

(Step S3906) The processing order information acquiring portion 36104 acquires the j$^{th}$ and the "j+1"$^{th}$ target identifying information, in the collection of the target identifying information stored in step S3903.

(Step S3907) The processing order information acquiring portion 36104 assigns "1" to element values corresponding to the j$^{th}$ and the "j+1"$^{th}$ target identifying information, among elements in the directed graph information. More specifically, "1" refers to a state in which a link of the network is provided.

(Step S3908) The processing order information acquiring portion 36104 increments j by 1. The procedure returns to step S3905.

(Step S3909) The processing order information acquiring portion 36104 increments i by 1. The procedure returns to step S3902.

Hereinafter, a specific operation of the information processing system according to this embodiment will be described. As in the description of the specific operation in Embodiment 5, also in this embodiment, the behavior information management table shown in FIG. 28 is stored in the behavior information storage portion 34103. An example of the operation for constituting the behavior information management table was described in Embodiment 5, and thus the description has been omitted in this embodiment.

It is assumed that in this status, the user inputs a target leading degree information output instruction using an input unit of the information terminal 342. Then, the accepting portion 34201 of the information terminal 342 accepts the target leading degree information output instruction. Next, the terminal-side transmitting portion 34202 transmits the target leading degree information output instruction that has been accepted by the accepting portion 34201, to the information processing apparatus 341.

Next, the server-side receiving portion 34101 of the information processing apparatus 341 receives the target leading degree information output instruction. Then, the leading degree information calculating portion 34105 and the like calculate the target leading degree information in the following manner. That is to say, first, the processing order information acquiring portion 36104 reads all of the two or more pieces of behavior information from the behavior information management table in FIG. 28, acquires the target identifying information and the time information corresponding to the user identifying information indicating each of one or more users, and constitutes information of a directed graph in which the two or more pieces of target identifying information are linked in the order of the time when a behavior occurred (the time of a behavior performed on a target in the target identifying information) according to the two or more pieces of time information that have been acquired. It is herein assumed that the processing order information acquiring portion 36104 focuses on the order in which each user performed a behavior on (for example, purchased) targets such as products, and obtains information of the network of the target identifying information for each piece of user identifying information (see FIG. 40). Then, the user identifying information is eliminated from the conceptual diagram in FIG. 40, and thus the processing order information acquiring portion 36104 constitutes the directed graph information that links the target identifying information as shown in FIG. 41.

Figure 41:
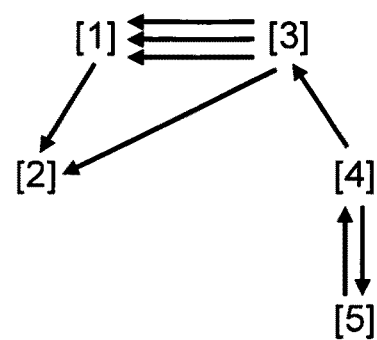
FIG. 41 is a diagram showing an example of a directed graph in the information processing system.

In FIG. 41, an arrow is directed from the target identifying information of a product that was purchased at a later stage to the target identifying information of a product that was purchased at an earlier stage. This directed graph information is expressed as information of a matrix (M) as shown in FIG. 42. In FIG. 42, in the matrix (M), a row indicates a source of the link, and a column indicates a destination of the link. For example, "[4]→[3]" is expressed as the element value "1" at the 4$^{th}$ row, the 3$^{rd}$ column. The behavior order information acquiring portion 34104 writes information shown in FIG. 42, into the array of 5 rows by 5 columns, and obtains the directed graph information. Herein, the initial values of all the elements in the array of 5 rows by 5 columns are "0". Herein, it would be appreciated that the arrow in FIG. 41 also may be in the opposite direction. If the arrow is in the opposite direction, the matrix (M) in FIG. 42 is required only to be transposed.

Next, the source item degree calculating unit 361051 initializes the source item degree vector, and obtains a source item degree vector (SI) "(1 1 1 1 1)$^T$". Herein, the symbol "T" in the vector indicates transposition. Furthermore, the derived item degree calculating unit 361052 initializes the derived item degree vector (DI), and obtains "(1 1 1 1 1)$^T$".

Next, the derived item degree calculating unit 361052 substitutes the directed graph information (matrix (M)) and the current source item degree vector (SI) for a predetermined formula, and obtains the next derived item degree vector. Herein, for example, the derived item degree calculating unit 361052 obtains the next derived item degree vector (DI), following the formula "DI=M·SI, DI=DI/|DI|". More specifically, the derived item degree calculating unit 361052 multiplies the directed graph information (matrix (M)) and the source item degree vector (SI) using matrix multiplication, to obtain the next derived item degree vector "(1 0 2 2 1)$^T$", and arranges the information on the memory.

Then, the derived item degree calculating unit 361052 divides the vector "(1 0 2 2 1)$^T$" (DI) by its absolute value (|DI|), and obtains the next derived item degree vector (DI). The next derived item degree vector (DI) is "(0.32 0.0 0.63 0.63 0.32)$^T$" (FIG. 43(1), (3)).

Then, the derived item degree calculating unit 361052 calculates |previous derived item degree vector−current derived item degree vector|, and judges whether or not this value is smaller than a predetermined value (ε "ε is 0.001, for example"). That is to say, the derived item degree calculating unit 361052 judges whether or not the derived item degree vector has converged.

If the derived item degree calculating unit 361052 judges that the vector has converged, the processing is ended. If it is judged that the vector has not converged, the processing as described above is continuously performed until the vector has converged. It is herein assumed that the derived item degree vector has converged when it has become the value shown in FIG. 43(9).

Next, the source item degree calculating unit 361051 obtains the source item degree vector (SI), using the directed graph information (matrix (M)) and the derived item degree vector "(1 0 2 2 1)$^T$". Herein, the source item degree calculating unit 361051 obtains the next source item degree vector, following "SI=M$^T$·DI, SI=SI/|SI|". The source item degree calculating unit 361051 multiplies the directed graph information (matrix (M$^T$)) and the derived item degree vector "(1 0 2 2 1)$^T$" using matrix multiplication, and obtains the source item degree vector "(2 3 2 1 2)$^T$" (FIG. 43(2)).

Then, the source item degree calculating unit 361051 divides the source item degree "$(2\ 3\ 2\ 1\ 2)^T$" (also referred to as SI) by its absolute value (|SI|), and obtains the next source item degree vector "$(0.43\ 0.64\ 0.43\ 0.21\ 0.43)^T$" (FIG. 43(4)).

Then, in a similar manner, the source item degree calculating unit 361051 calculates the next source item degree vector (FIG. 43(6), (8)). Then, the source item degree calculating unit 361051 arranges the next source item degree vector "$(0.45\ 0.72\ 0.36\ 0.089\ 0.36)^T$" on the memory (FIG. 43(8)).

Then, the source item degree calculating unit 361051 calculates |previous source item degree vector−current source item degree vector|, and judges whether or not this value is smaller than a predetermined value ($\epsilon$ "$\epsilon$ is 0.001, for example"). That is to say, the source item degree calculating unit 361051 judges whether or not the source item degree vector has converged.

If the source item degree calculating unit 361051 judges that the vector has converged, the processing is ended. If it is judged that the vector has not converged, the processing as described above is continuously performed until the vector has converged. It is herein assumed that the source item degree vector has converged when it has become the value shown in FIG. 43(10).

Through the above-described calculation, the leading degree information calculating portion 36105 obtains the source item degree and the derived item degree of each target shown in FIG. 44.

Herein, in the description above, the processing order information acquiring portion 36104 constituted the directed graph information in consideration only of link of the target identifying information using the time information, without considering information of the order or time of a behavior on targets. This point is clearly shown by the fact that the network structure in FIG. 41 is constituted from the network in the "target identifying information" in FIG. 40.

However, the processing order information acquiring portion 36104 may constitute the directed graph information in consideration of the order of a behavior on targets. For example, if the user "B" purchased products (targets) in the order "[1]→[3]→[4]→[5]", then the processing order information acquiring portion 36104 may perform weighting in consideration of this order (for example, perform multiplication by a constant 0.9) in such a manner that a weight of "1" is assigned to "[1]→[3]", a weight of "0.9" is assigned to "[3]→[4]", and a weight of "0.81" is assigned to "[4]→[5]". Herein, "1", "0.9", and "0.81" constitute element values of the directed graph information (matrix).

Furthermore, the processing order information acquiring portion 36104 may constitute the directed graph information in consideration of the time of purchase (time when an operation was performed). For example, if the user "A" purchased products in the order and at the time "1 (time $t_1$)→3 (time $t_6$)→4 (time $t_{21}$)→5 (time $t_{34}$)", then element values of the directed graph information (matrix) may be calculated with weighting that uses a forgetting factor "$e^{-(t-tx)}$". Herein, the numbers "1", "3", and the like added in the times $t_1$ and $t_3$ correspond to the IDs of the behavior information management table in FIG. 28.

Furthermore, the processing order information acquiring portion 36104 may calculate the element values in the directed graph information (matrix) in consideration of the weight of multiple links (such as links [1]←[3] in FIG. 41) (since there are three links [1]←[3] in FIG. 19, a weight of "3" is assigned). In this case, in FIG. 42, the value at the $3^{rd}$ row, the $1^{st}$ column is "3".

In addition to the above, various algorithms are conceivable that are used by the processing order information acquiring portion 36104 for constituting the directed graph information. Also in this case, the processing order information acquiring portion 36104 is required only to read two or more pieces of behavior information from the behavior information storage portion 34103, and constitute processing order information (directed graph information), which is information regarding the order of processing performed on the two or more targets by the user identified with the user identifying information, from the user identifying information and the time information contained in each of the two or more pieces of behavior information. This directed graph information may be information having weighted values as described above.

Next, the target leading degree information output portion 36106 transmits the leading degree information (information regarding one or more of the source item degree and the derived item degree) in FIG. 44, to the information terminal 342. Herein, for example, it is preferable that the target leading degree information output portion 36106 processes the leading degree information in FIG. 44 and then transmits the information to the information terminal 342. More specifically, the target leading degree information output portion 36106 sorts the target identifying information in ascending order of the source item degree according to the leading degree information in FIG. 44, and acquires the information "[4]-[3]-[5]-[1]-[2]". Then, the target leading degree information output portion 36106 transmits the information "[4]-[3]-[5]-[1]-[2]" to the information terminal 342.

As described above, according to this embodiment, the target leading degree information (the source item degree and the derived item degree) can be calculated from the behavior history (the behavior information) of multiple users. Furthermore, using the leading degree information, trend shift information indicating trend shift of products etc. can be output.

Herein, in this embodiment, the information processing apparatus 361 received the behavior information from the information terminals 342. However, a configuration is also possible in which the information processing apparatus 361 cannot communicate with the information terminals 342, and the behavior information is stored via manual input or a storage medium. In other words, the information processing apparatus 361 alone may process the stored behavior information. At that time, the information processing apparatus 361 may transmit the processing results (such as the target leading degree information) to an external apparatus such as the information terminals 342.

Furthermore, in this embodiment, acceptance of the leading degree information output instruction by the accepting portion 34201 acted as a trigger to calculate the target leading degree information. However, there is no limitation on the trigger to calculate the target leading degree information. More specifically, it is preferable that the information processing apparatus 361 calculates the target leading degree information in the background, without an instruction from a user.

Furthermore, the processing of the information processing apparatus according to this embodiment may be implemented by a computer program or a computer program product.

Herein, in the foregoing embodiments, the predetermined formulae are typically stored in advance in the apparatuses.

Furthermore, in the foregoing embodiments, each processing (each function) may be implemented by integrated processing by a single apparatus (system), or may be implemented by distributed processing by multiple apparatuses.

Figure 45:
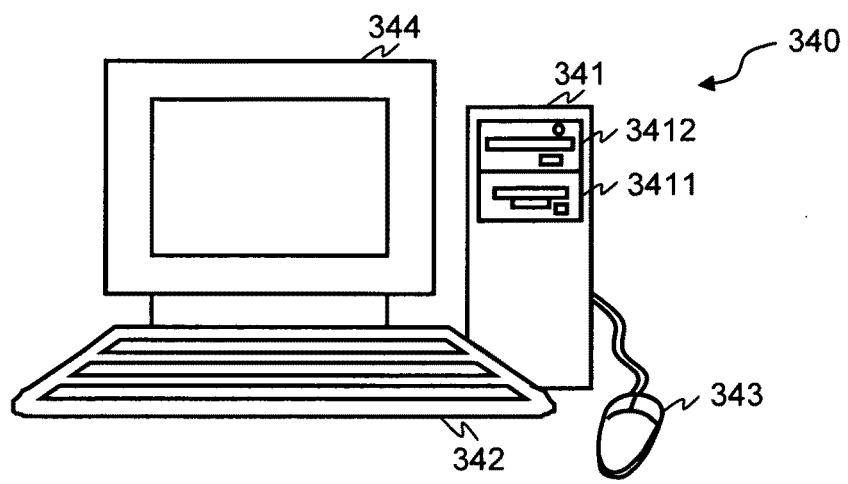
FIG. 45 is an overall view of a computer system for implementing a server apparatus and the like in the information processing system.
Figure 46:
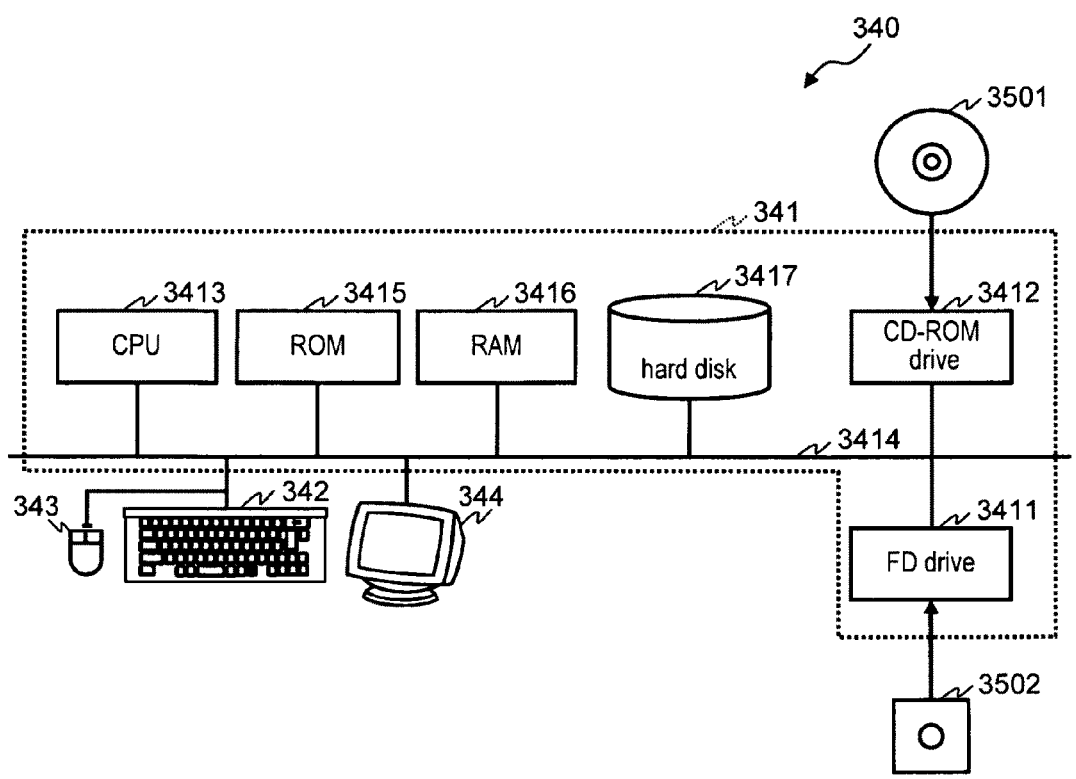
FIG. 46 is a block diagram of the system.

FIG. 45 shows the external appearance of a computer for executing the program described in this specification, thereby implementing the server apparatus and the information output apparatus of the foregoing various embodiments. The foregoing embodiments can be implemented by computer hardware and a computer program executed thereon. FIG. 45 is an overall view a computer system 340. FIG. 46 is a block diagram of the computer system 340.

In FIG. 45, the computer system 340 includes a computer 341 including a FD (flexible disk) drive and a CD-ROM (compact disk read only memory) drive, a keyboard 342, a mouse 343, and a monitor 344.

In FIG. 46, the computer 341 is connected, not only to a FD drive 3411 and a CD-ROM drive 3412, but also to a CPU (central processing unit) 3413, a bus 3414 to which the CPU 3413, the CD-ROM drive 3412, and the FD drive 3411 are connected, a ROM (read-only memory) 3415 in which a program such as a bootup program is to be stored, a RAM (random access memory) 3416 to which the CPU 3413 is connected, in which a command of an application program is temporarily stored, and with which a temporary storage area is to be provided, and a hard disk 3417 in which an application program, a system program, and data are to be stored. Herein, although not shown, the computer 341 may further include a network card for providing a connection to a LAN.

The program for causing the computer system 340 to execute the functions of the information processing apparatus in the foregoing embodiments may be stored in a CD-ROM 3501 or a FD 3502, inserted into the CD-ROM drive 3412 or the FD drive 3411, and transmitted to the hard disk 3417. Alternatively, the program may be transmitted to the computer 341 via an unshown network, and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program for causing the computer 341 to execute the functions of the information processing apparatus in the foregoing embodiments. The program may be any program as long as it includes a command portion to call an appropriate function (module) in a controlled manner and obtain desired results. The manner in which the computer system 340 operations is known, and thus a detailed description thereof has been omitted.

It should be noted that in the program, in a transmitting step of transmitting information, a receiving step of receiving information, or the like, processing that is performed by hardware, for example, processing performed by a modem, an interface card, or the like in the transmitting step (processing that can only be performed with hardware) is not included. The same is applied to other embodiments.

Furthermore, the computer that executes this program may be a single computer, or may be multiple computers. More specifically, centralized processing may be performed, or distributed processing may be performed.

Furthermore, in the foregoing embodiments, it would be appreciated that two or more communication units (such as input information receiving portions) in one apparatus may be physically implemented as one medium.

Furthermore, in the foregoing embodiments, a communication unit in each apparatus may be implemented as a unit that transmits information via broadcasting or a unit that receives broadcasting (such as a tuner).

The present invention is not limited to the embodiments set forth herein. Various modifications are possible within the scope of the present invention.

INDUSTRIAL APPLICABILITY

As described above, the information processing system according to the present invention has the effect that a product or service can be effectively recommended, and thus this system is useful, for example, as a recommendation information system.

LIST OF REFERENCE NUMERALS

11, 141, 221, 241 server apparatus
12 information output apparatus
341, 361 information processing apparatus
342 information terminal
1101 product or service information storage portion
1102 input information receiving portion
1103 product or service information transmitting portion
1104 purchase history information storage portion
1105 purchase information receiving portion
1106 purchase history information accumulating portion
1107 user identifying information storage portion
1108 trendy product or service selecting portion
1109, 14109, 24109 trend leader detecting portion
1110, 241010 recommended product or service acquiring portion
1111, 22111 recommended product or service transmitting portion
1112 trend leader output portion
1201 input accepting portion
1202 input information transmitting portion
1203 product or service information receiving portion
1204 recommended product or service receiving portion
1205 output portion
14101 input information receiving portion
14102 input information accumulating portion
14103, 24103 purchaser classifying portion
22101 judging portion
241091 directed graph information constituting unit
241092 trend leader degree calculating unit
241093 trend follower degree calculating unit
241094 purchaser identifying information acquire unit
34101 server-side receiving portion
34102 behavior information accumulating portion
34104 behavior order information acquiring portion
34105, 36105 leading degree information calculating portion
34106 leading degree information output portion
34106, 36106 target leading degree information output portion
34107 trend leader acquiring portion
34201 accepting portion
34202 terminal-side transmitting portion
34203 terminal-side receiving portion
34204 terminal-side output portion
36104 processing order information acquiring portion
36107 trend shift information acquiring portion
36108 trend shift information output portion
361051 source item degree calculating unit
361052 derived item degree calculating unit

The invention claimed is:

1. A server apparatus including a processor, the processor comprising:
   a purchase history information storage portion that stores at least two pieces of purchase history information of at least two purchasers including purchaser identifying information and purchase time information;
   a trend leader detecting portion including:
   a directed graph information constituting unit that:
   reads two or more pieces of purchase history information from the purchase history information storage portion, acquires purchaser identifying information and purchase time information, and constitutes a directed graph information that the two or more pieces of purchaser identifying information are linked in the order of the purchase time according to the two or more pieces of purchase time information;

a trend leader degree calculating unit that:

calculates a trend leader degree for each piece of purchaser identifying information from the directed graph information, the trend leader degree being information indicating a degree of being a link origin and a degree of being a trend source, and initializes a trend leader degree vector based on the trend leader degree corresponding to each purchaser identifier;

a trend follower degree calculating unit which that:

calculates a trend follower degree for each piece of purchase identifying information from the directed graph information, the trend follower degree being information indicating a degree of following a link origin and a degree of following a trend, and initializes a trend follower degree vector based on the trend follower degree corresponding to each purchaser identifier;

wherein the trend leader degree calculating unit:

determines a next trend leader degree vector by using the directed graph information and the trend follower degree vector, judges whether or not an absolute value of a difference between the next trend leader degree vector and the current trend leader degree vector is smaller than a predetermined threshold, and stores the elements of the next trend leader degree vector as the current trend leader degree vector when judged smaller;

wherein the trend follower degree calculating unit:

determines a next trend follower degree vector by using the directed graph information and the trend leader degree vector, judges whether or not an absolute value of a difference between the next trend follower degree vector and the current trend follower degree vector is smaller than a predetermined threshold, and stores the elements of next trend follower degree vector as the current trend follower degree vector when judged smaller;

a recommended product or service acquiring portion that determines a recommended product or service using both the current trend leader degree vector and the current trend follower degree vector; and a recommended product transmitting portion configured to transmit at least one recommended product or service to an information output apparatus.

2. The server apparatus according to claim 1, wherein the recommended product or service is determined based on the purchaser identifying information corresponding to a highest trend leader degree among the information left after excluding the purchaser identifying information corresponding to the trend follower degree that is higher than the trend follower degree of the user targeted for recommendation.

3. A server apparatus including a processor, the processor comprising:

a purchase history information storage portion in which at least two pieces of purchase history information of at least two purchasers are stored, the purchase history information being information indicating purchase history of a product that is a product or service, and having purchaser identifying information for identifying a purchaser, product identifying information for identifying a product, and purchase time information indicating a purchase time of a product;

a trend leader detecting portion that reads at least two pieces of purchase history information from the purchase history information storage portion, detects purchaser identifying information for identifying a trend leader who purchased at least one product at an early stage satisfying a predetermined time condition, from the at least two pieces of product identifying information and purchase time information contained in the at least two pieces of purchase history information, acquires the purchaser identifying information from the at least two pieces of purchase history information, and stores the purchaser identifying information in a storage medium;

a recommended product acquiring portion that acquires at least one piece of product identifying information for identifying a product purchased by at least one purchaser identified with the at least one piece of purchaser identifying information that has been acquired by the trend leader detecting portion, from the purchase history information storage portion, and stores the product identifying information in a storage medium; and a recommended product transmitting portion that transmits the at least one piece of product identifying information that has been acquired by the recommended product acquiring portion, to an information output apparatus;

wherein the trend leader detecting portion comprises:

a directed graph information constituting unit that reads at least two pieces of purchase history information from the purchase history information storage portion, acquires the purchaser identifying information and the purchase time information corresponding to the product identifying information indicating each of at least one product, and constitutes information of a directed graph in which the at least two pieces of purchaser identifying information are linked in the order of the purchase time according to the at least two pieces of purchase time information that have been acquired;

a trend leader degree calculating unit that calculates, for each piece of purchaser identifying information, a trend leader degree, which is information indicating a degree of being a link origin and a degree of being a trend source, from the directed graph information that has been constituted by the directed graph information constituting unit, stores the trend leader degree in a storage medium, and initializes a trend leader degree vector based on the trend leader degree corresponding to each purchaser identifier;

a trend follower degree calculating unit that calculates, for each piece of purchaser identifying information, a trend follower degree, which is information indicating a degree of following a link origin and a degree of following a trend, from the directed graph information that has been constituted by the directed graph information constituting unit, stores the trend follower degree in a storage medium, and initializes a trend follower degree vector based on the trend follower degree corresponding to each purchaser identifier;

and a purchaser identifying information acquiring unit that acquires purchaser identifying information for identifying a trend leader having a high degree of being the trend source, using the trend leader degree of each piece of purchaser identifying information that has been calculated by the trend leader degree calculating unit and the trend follower degree of each piece of purchaser identifying information that has been calculated by the trend follower degree calculating unit,
from the at least two pieces of purchase history information, and
stores the purchaser identifying information in a storage medium,
wherein the trend leader degree calculating unit:
determines a next trend leader degree vector by using the directed graph information and the trend follower degree vector,
judges whether or not an absolute value of a difference between the next trend leader degree vector and the current trend leader degree vector is smaller than a predetermined threshold, and
stores the elements of the next trend leader degree vector as the current trend leader degree vector when judged smaller;
wherein the trend follower degree calculating unit:
determines a next trend follower degree vector by using the directed graph information and the trend leader degree vector,
judges whether or not an absolute value of a difference between the next trend follower degree vector and the current trend follower degree vector is smaller than a predetermined threshold, and
stores the elements of next trend follower degree vector as the current trend follower degree vector when judged smaller.

4. The server apparatus according to claim 3, further comprising a user identifying information storage portion in which purchaser identifying information for identifying a user of the information output apparatus is stored,
wherein the recommended product acquiring portion reads the purchaser identifying information stored in the user identifying information storage portion, thereby acquiring at least one piece of product identifying information for identifying a product that has not been purchased by the user identified with the purchaser identifying information, among product identifying information for identifying a product that has been purchased by at least one purchaser identified with the at least one piece of purchaser identifying information that has been acquired by the trend leader detecting portion, and stores the product identifying information in a storage medium.

5. The server apparatus according to claim 3, further comprising:
a product information storage portion in which at least two pieces of product information having product identifying information and at least one attribute value of a product identified with the product identifying information are stored;
a purchase information receiving portion that receives purchase information, which is information indicating a purchase of a product by a user of the information output apparatus, and which has purchaser identifying information for identifying the user and product identifying information for identifying the product, from the information output apparatus; and
a purchase history information accumulating portion that constitutes purchase history information, using the purchase information that has been received by the purchase information receiving portion, and accumulates the purchase history information in the purchase history information storage portion,
wherein the recommended product acquiring portion that acquires at least one attribute value paired with the product identifying information contained in the purchase information that has been received by the purchase information receiving portion, and acquires product identifying information of a product having at least one attribute value having a predetermined relationship with the at least one attribute value, the product identifying information being for identifying a product purchased by at least one purchaser identified with the at least one piece of purchaser identifying information that has been acquired by the trend leader detecting portion.

6. The server apparatus according to claim 3, further comprising:
an input information receiving portion that receives at least two pairs of input information, which is information input to the information output apparatus by a purchaser, and purchaser identifying information;
an input information accumulating portion that accumulates the input information and the purchaser identifying information that have been received by the input information receiving portion, in a storage medium; and
a purchaser classifying portion that classifies, using the at least two pieces of input information that have been accumulated by the input information accumulating portion, the purchaser identifying information paired with each piece of input information, and manages the purchaser identifying information in such a manner that a group to which each piece of purchaser identifying information belongs can be identified,
wherein the trend leader detecting portion that acquires purchaser identifying information for identifying a trend leader having a high degree of being the trend source among at least one piece of purchaser identifying information in the group which the purchaser identifying information is belonging to, using the trend leader degree of each piece of purchaser identifying information that has been calculated by the trend leader degree calculating unit and the trend follower degree of each piece of purchaser identifying information that has been calculated by the trend follower degree calculating unit, and stores the purchaser identifying information in a storage medium.

7. The server apparatus according to claim 6, wherein the purchaser classifying portion reads the input information and the purchaser identifying information that have been accumulated by the input information accumulating portion, analyzes preference of each purchaser using the input information and the purchaser identifying information, classifies at least two pieces of purchaser identifying information based on the preference, and manages the purchaser identifying information in such a manner that a group to which each piece of purchaser identifying information belongs can be identified.

8. The server apparatus according to claim 7,
wherein the input information that has been received by the input information receiving portion has product identifying information for identifying a product purchased by a purchaser identified with the purchaser identifying information,
the input information accumulating portion accumulates the purchase history information having the product identifying information that has been received by the input information receiving portion, the purchaser identifying information, and the purchase time information, in the purchase history information storage portion, and
the purchaser classifying portion classifies at least two pieces of purchaser identifying information, using the at least two pieces of purchase history information that have been accumulated by the input information accumulating portion, and manages the purchaser identifying information in such a manner that a group to which each piece of purchaser identifying information belongs can be identified.

9. The server apparatus according to claim 3, further comprising a trend leader output portion that outputs information to the effect that a purchaser identified with the purchaser identifying information that has been acquired by the trend leader detecting portion is the trend leader.

10. An information processing method for recommending a product, using a trend leader detecting portion, a recommended product acquiring portion, and a recommended product transmitting portion, the method performed by a processor and comprising:

a trend leader detecting step using the trend leader detecting portion, of reading at least two pieces of purchase history information from a purchase history information storage portion in which at least two pieces of purchase history information of at least two purchasers are stored, the purchase history information being information indicating purchase history of a product that is a product or service, and having purchaser identifying information for identifying a purchaser, product identifying information for identifying a product, and purchase time information indicating a purchase time of a product, detecting purchaser identifying information for identifying a trend leader who purchased at least one product at an early stage satisfying a predetermined time condition, from the at least two pieces of product identifying information and purchase time information contained in the at least two pieces of purchase history information, acquiring the purchaser identifying information from the at least two pieces of purchase history information, and storing the purchaser identifying information in a storage medium;

a recommended product acquiring step using the recommended product acquiring portion, of acquiring at least one piece of product identifying information for identifying a product purchased by at least one purchaser identified with the at least one piece of purchaser identifying information that has been acquired by the trend leader detecting portion, from the purchase history information storage portion, and storing the product identifying information in a storage medium;

and a recommended product transmitting step using the recommended product transmitting portion, of transmitting the at least one piece of product identifying information that has been acquired by the recommended product acquiring portion, to an information output apparatus;

wherein the trend leader detecting step comprises:

a directed graph information constituting step of reading at least two pieces of purchase history information from the purchase history information storage portion, acquiring the purchaser identifying information and the purchase time information corresponding to the product identifying information indicating each of at least one product, and constituting information of a directed graph in which the at least two pieces of purchaser identifying information are linked in the order of the purchase time according to the at least two pieces of purchase time information that have been acquired;

a trend leader degree calculating step of calculating, for each piece of purchaser identifying information, a trend leader degree, which is information indicating a degree of being a link origin and a degree of being a trend source, from the directed graph information that has been constituted in the directed graph information constituting step, storing the trend leader degree in a storage medium, and initializing a trend leader degree vector based on the trend leader degree corresponding to each purchaser identifier;

a trend follower degree calculating step of calculating, for each piece of purchaser identifying information, a trend follower degree, which is information indicating a degree of following a link origin and a degree of following a trend, from the directed graph information that has been constituted in the directed graph information constituting step, storing the trend follower degree in a storage medium, and initializing a trend follower degree vector based on the trend follower degree corresponding to each purchaser identifier; and a purchaser identifying information acquiring step of acquiring purchaser identifying information for identifying a trend leader having a high degree of being the trend source is acquired using the trend leader degree of each piece of purchaser identifying information that has been calculated in the trend leader degree calculating step and the trend follower degree of each piece of purchaser identifying information that has been calculated in the trend follower degree calculating step, from the at least two pieces of purchase history information, and stored in a storage medium, wherein the trend leader degree step determines a next trend leader degree vector by using the directed graph information and the trend follower degree vector, judges whether or not an absolute value of a difference between the next trend leader degree vector and the current trend leader degree vector is smaller than a predetermined threshold, and stores the elements of the next trend leader degree vector as the current trend leader degree vector when judged smaller;

wherein the trend follower degree calculating step determines a next trend follower degree vector by using the directed graph information and the trend leader degree vector, judges whether or not an absolute value of a difference between the next trend follower degree vector and the current trend follower degree vector is smaller than a predetermined threshold, and stores the elements of next trend follower degree vector as the current trend follower degree vector when judged smaller.

11. An information processing method according to claim 10, purchaser identifying information for identifying a user of the information output apparatus is stored in a user identifying information storage portion, and wherein the recommended product acquiring step of reading the purchaser identifying information stored in the user identifying information storage portion, thereby acquiring at least one piece of product identifying information for identifying a product that has not been purchased by the user identified with the purchaser identifying information, among product identifying information for identifying a product that has been purchased by at least one purchaser identified with the at least one piece of purchaser identifying information that has been acquired by the trend leader detecting portion, and storing the product identifying information in a storage medium.

12. An information processing method according to claim 10, at least two pieces of product information having product identifying information and at least one attribute value of a product identified with the product identifying information are stored in a product information storage portion; and further comprising:

a purchase information receiving step of receiving purchase information, which is information indicating a purchase of a product by a user of the information output apparatus, and which has purchaser identifying information for identifying the user and product identifying information for identifying the product, from the information output apparatus; and a purchase history information accumulating step of constituting purchase history information, using the purchase information that has been received by the purchase information receiving portion, and accumulating the purchase history information in the purchase history information storage portion, wherein the recommended product acquiring step of acquiring at least one attribute value paired with the product, identifying information contained in the purchase information that has been received by the purchase information receiving step, and acquiring product, identifying information of a product, having at least one attribute value having a predetermined relationship with the at least one attribute value, the product, identifying information being for identifying a product purchased by at least one purchaser identified with the at least one piece of purchaser identifying information that has been acquired by the trend leader detecting step.

13. An information processing method according to claim 10, further comprising:

an input information receiving step of receiving at least two pairs of input information, which is information input to the information output apparatus by a purchaser, and purchaser identifying information;

an input information accumulating step of accumulating the input information and the purchaser identifying information that have been received by the input information receiving step, in a storage medium; and a purchaser classifying step of classifying, using the at least two pieces of input information that have been accumulated by the input information accumulating step, the purchaser identifying information paired with each piece of input information, and managing the purchaser identifying information in such a manner that a group to which each piece of purchaser identifying information belongs can be identified, wherein the trend leader detecting step of acquiring purchaser identifying information for identifying a trend leader having a high degree of being the trend source among at least one piece of purchaser identifying information in the group which the purchaser identifying information is belonging to, using the trend leader degree of each piece of purchaser identifying information that has been calculated by the trend leader degree calculating step and the trend follower degree of each piece of purchaser identifying information that has been calculated by the trend follower degree calculating step, and storing the purchaser identifying information in a storage medium.

14. An information processing method according to claim 13, wherein the purchaser classifying step of reading the input information and the purchaser identifying information that have been accumulated by the input information accumulating step, analyzing preference of each purchaser using the input information and the purchaser identifying information, classifying at least two pieces of purchaser identifying information based on the preference, and managing the purchaser identifying information in such a manner that a group to which each piece of purchaser identifying information belongs can be identified.

15. An information processing method according to claim 14, wherein the input information that has been received by the input information receiving step has product identifying information for identifying a product purchased by a purchaser identified with the purchaser identifying information, the input information accumulating step of accumulating the purchase history information having the product identifying information that has been received by the input information receiving step, the purchaser identifying information, and the purchase time information, in the storage portion, and the purchaser classifying step of classifying at least two pieces of purchaser identifying information, using the at least two pieces of purchase history information that have been accumulated by the input information accumulating step, and managing the purchaser identifying information in such a manner that a group to which each piece of purchaser identifying information belongs can be identified.

16. An information processing method according to claim 10, further comprising a trend leader output step of outputting information to the effect that a purchaser identified with the purchaser identifying information that has been acquired by the trend leader detecting step is the trend leader.

17. A non-transitory computer-readable storage media storing a computer-executable instructions that, when executed, cause a processor to perform acts comprising:

providing a purchase history information storage portion in which at least two pieces of purchase history information of at least two purchases are stored, the purchase history information being information indicating purchase history of a product that is a product or service, and having purchaser identifying information for identifying a purchaser, product identifying information for identifying a product, and purchase time information indicating a purchase time of a product;

reading with a trend leader detecting portion at least two pieces of purchase history information from the purchase history information storage portion, detecting purchaser identifying information for identifying a trend leader who purchased at least one product at an early stage satisfying a predetermined time condition, from the at least two pieces of product identifying information and purchase time information contained in the at least two pieces of purchase history information, acquiring the purchaser identifying information from the at least two pieces of purchase history information, and storing the purchaser identifying information in a storage medium;

acquiring with a recommended product acquiring portion at least one piece of product identifying information for identifying a product purchased by at least one purchaser identified with the at least one piece of purchaser identifying information that has been acquired by the trend leader detecting portion, from the purchase history information storage portion, and storing the product identifying information in a storage medium; and transmitting with a recommended product transmitting portion the at least one piece of product identifying information that has been acquired by the recommended product acquiring portion, to an information output apparatus;

wherein the trend leader detecting portion comprises:

a directed graph information constituting unit for reading at least two pieces of purchase history information from the purchase history information storage portion, acquiring the purchaser identifying information and the purchase time information corresponding to the product identifying information indicating each of at least one product, and constituting information of a directed graph in which the at least two pieces of purchaser identifying information are linked in the order of the purchase time according to the at least two pieces of purchase time information that have been acquired;

a trend leader degree calculating unit for calculating, for each piece of purchaser identifying information, a trend leader degree, which is information indicating a degree of being a link origin and a degree of being a trend source, from the directed graph information that has been constituted by the directed graph information constituting unit, storing the trend leader degree in a storage medium, and initializing a trend leader degree vector based on the trend leader degree corresponding to each purchaser identifier;

a trend follower degree calculating unit for calculating, for each piece of purchaser identifying information, a trend follower degree, which is information indicating a degree of following a link origin and a degree of following a trend, from the directed graph information that has been constituted by the directed graph information constituting unit, storing the trend follower degree in a storage medium, and initializing a trend follower degree vector based on the trend follower degree corresponding to each purchaser identifier; and a purchaser identifying information acquiring unit for acquiring purchaser identifying information for identifying a trend leader having a high degree of being the trend source, using the trend leader degree of each piece of purchaser identifying information that has been calculated by the trend leader degree calculating unit and the trend follower degree of each piece of purchaser identifying information that has been calculated by the trend follower degree calculating unit, from the at least two pieces of purchase history information, and storing the purchaser identifying information in a storage medium, wherein the trend leader degree unit determines a next trend leader degree vector by using the directed graph information and the trend follower degree vector, judges whether or not an absolute value of a difference between the next trend leader degree vector and the current trend leader degree vector is smaller than a predetermined threshold, and stores the elements of the next trend leader degree vector as the current trend leader degree vector when judged smaller;

wherein the trend follower degree calculating unit determines a next trend follower degree vector by using the directed graph information and the trend leader degree vector, judges whether or not an absolute value of a difference between the next trend follower degree vector and the current trend follower degree vector is smaller than a predetermined threshold, and stores the elements of next trend follower degree vector as the current trend follower degree vector when judged smaller.

* * * * *